United States Patent
Pouchak et al.

(10) Patent No.: US 8,112,162 B2
(45) Date of Patent: Feb. 7, 2012

(54) SYSTEM LEVEL FUNCTION BLOCK ENGINE

(75) Inventors: Michael A. Pouchak, Saint Anthony, MN (US); Paul Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 555 days.

(21) Appl. No.: 11/670,911

(22) Filed: Feb. 2, 2007

(65) Prior Publication Data

US 2008/0016493 A1    Jan. 17, 2008

Related U.S. Application Data

(63) Continuation-in-part of application No. 11/620,431, filed on Jan. 5, 2007, now Pat. No. 7,653,459, and a continuation-in-part of application No. 11/564,797, filed on Nov. 29, 2006, and a continuation-in-part of application No. 11/427,750, filed on Jun. 29, 2006, now Pat. No. 7,826,929.

(51) Int. Cl.
*G05B 15/00* (2006.01)
*G05B 11/01* (2006.01)
*G06F 9/44* (2006.01)

(52) U.S. Cl. ............ 700/1; 717/106; 717/109; 717/110; 700/18

(58) Field of Classification Search ............. 700/83, 700/1, 276; 717/109, 106, 110
See application file for complete search history.

(56) References Cited

U.S. PATENT DOCUMENTS

| | | | |
|---|---|---|---|
| 4,654,653 A | 3/1987 | Brindle et al. | |
| 4,723,513 A | 2/1988 | Vallett et al. | |
| 4,784,580 A | 11/1988 | Takata et al. | |
| 4,793,800 A | 12/1988 | Vallett et al. | |
| 5,444,664 A * | 8/1995 | Kuroda et al. | 365/226 |
| 5,449,319 A | 9/1995 | Dushane et al. | |
| 5,479,812 A | 1/1996 | Juntunen et al. | |
| 5,605,280 A | 2/1997 | Hartman | |
| 5,778,368 A | 7/1998 | Hogan et al. | |
| 5,989,020 A | 11/1999 | Glass et al. | |
| 6,008,805 A | 12/1999 | Land et al. | |

(Continued)

FOREIGN PATENT DOCUMENTS

EP    1380909 A2 *    1/2004

OTHER PUBLICATIONS

Echelon, "ShortStack Developer's Kit Model 23400," 3 pages, 2002.

(Continued)

*Primary Examiner* — Kakali Chaki
*Assistant Examiner* — Sivalingam Sivanesan
(74) *Attorney, Agent, or Firm* — Seager, Tufte & Wickhem LLC

(57) ABSTRACT

A function block engine, a block execution list and a parameter and/or variable storage space being resident in a memory supporting the engine. The function block engine may execute a program according to a list of function blocks identified in the block execution list to design and construct and circuit or system. Also, the engine may provide simulation of the resultant circuit or system. The circuit or system may be transferred to a memory of another device for implementation and use as, for example, a controller. In some cases, the program may be executed from the memory. The engine may permit field programmability, configuration and simulation of the function blocks and resulting circuit or system.

23 Claims, 56 Drawing Sheets

U.S. PATENT DOCUMENTS

| | | |
|---|---|---|
| 6,272,400 B1 | 8/2001 | Jankins et al. |
| 6,330,806 B1 | 12/2001 | Beaverson et al. |
| 6,428,312 B1 | 8/2002 | Smelcer et al. |
| 6,453,687 B2 | 9/2002 | Sharood et al. |
| 6,536,678 B2 | 3/2003 | Pouchak |
| 6,549,826 B1 | 4/2003 | Pouchak et al. |
| 6,615,404 B1 | 9/2003 | Garfunkel et al. |
| 6,619,951 B2 | 9/2003 | Bodnar et al. |
| 6,694,926 B2 | 2/2004 | Baese et al. |
| 6,745,085 B2 | 6/2004 | Pouchak |
| 6,832,120 B1 | 12/2004 | Frank et al. |
| 6,934,862 B2 | 8/2005 | Sharood et al. |
| 7,117,069 B2 * | 10/2006 | Gagner ................. 700/276 |
| 7,120,908 B1 | 10/2006 | Klimchynski |
| 7,124,163 B2 | 10/2006 | Geofroy et al. |
| 7,689,386 B1 * | 3/2010 | Gates ........................ 703/1 |
| 2003/0158975 A1 | 8/2003 | Frank et al. |
| 2003/0159129 A1 | 8/2003 | Frank et al. |
| 2004/0144849 A1 | 7/2004 | Ahmed |
| 2004/0238653 A1 | 12/2004 | Alles |
| 2004/0267515 A1 * | 12/2004 | McDaniel et al. ............. 703/22 |
| 2005/0230490 A1 | 10/2005 | Pouchak et al. |
| 2006/0036798 A1 * | 2/2006 | Dickey et al. ................ 711/100 |

OTHER PUBLICATIONS

Echelon, "Echelon ShortStack Micro Server Answers to Frequently Asked Questions," pp. 1-5, Apr. 2002.

Echelon, "ShortStack Overview," 12 pages, prior to Nov. 29, 2006.

Echelon, "ShortStack User's Guide, Version 2" 152 pages, Mar. 2002.

Honeywell, "T7770A,B,C,D,E,F,G, Wall Modules, Excel 5000 Open System," pp. 1-4, 1997.

"LonMark Functional Profile: VAV Controller (VAV)," pp. 1-19, 1996.

* cited by examiner

| Linearization Table | | Pressure in Pascals (Not in Table) |
|---|---|---|
| Counts In | Counts Out | |
| 0 | 0 | -15 |
| 144 | 2390 | 0 |
| ••• | ••• | ••• |
| 4095 | 65520 | 400 |

Figure 15

Analog Inputs

| Input Name | Cfg | Range | | Input Value | Description |
| --- | --- | --- | --- | --- | --- |
| | | Low | High | | |
| press | IN_PAR | >=-∞ | <+∞ | Unconnected | Flow & Vel outputs set to invalid |
| | | | | Invalid | Flow & Vel outputs set to invalid |
| | | | | >-0.002425 and <0.002425 inw | Flow & Vel=0 |
| autoSetOffset | IN_PAR | >=-∞ | <+∞ | Unconnected | No effect on output |
| | | | | Invalid | No effect on output |
| | | | | !=0 | Set offset = incoming press |
| ClearOffset | IN_PAR | >=-∞ | <+∞ | unconnected or invalid | No effect on output |
| | | | | !=0 | Set offset = 0 |
| Area | PAR_IN | >=-∞ | <+∞ | Invalid or <=0; Value in ft^2 | Velocity set to invalid |
| KFactor | PAR_IN | >=-∞ | <+∞ | Unconnected | Flow & Vel outputs set to invalid |
| | | | | Invalid | Flow & Vel outputs set to invalid |
| | | | | <=0 | KFactor = 1015 |

Outputs — 103

| Output Name | Cfg | Range Low | Range High | Description |
|---|---|---|---|---|
| flow | OUT_FLT | >=-∞ | <+∞ | Flow value (ft^3/min) |
| offset | OUT_FLT_SAV | >=-∞ | <+∞ | Input press offset correction (inches water column). Not for connection. Stores Flow offset amount |
| vel | OUT_FLT | >=-∞ | <+∞ | Flow velocity (ft/min) |

96 — flow row
97 — offset row
98 — vel row

| NV NAMES (16 CHARACTER LIMIT) |
| --- |
| nviFlowOverride |
| nvoBoxFlowCool |
| nciKFactorCool |
| nciDuctAreaCool |
| nvoCmdCoolDmpPos |
| nciOccMinFlowCSP |
| nciMaxFlowCoolSP |
| nciMeasMinFlowC |
| nciMeasMaxFlowC |
| nviAutoOffsetC |
| nviClearOffsetC |
| nvoVelSenPressC |
| nvoPressOffsetC |
| nvoEffectFlowCSP |

*Figure 20*

Analog Inputs

| Input Name | Cfg | Range | | Input Value | Description |
| --- | --- | --- | --- | --- | --- |
| | | Low | High | | |
| nStagesActive | IN_ONLY | 0 | 255 | unconnected | Stages all off |
| | | | | invalid | Stages all off |
| runtimeReset | IN_ONLY | 0 | 255 | unconnected | No action to reset; runtime can accumulate |
| | | | | invalid | No action; runtime can accumulate |
| | | | | Value=0 | No action; runtime can accumulate |
| | | | | 1<=VAL<=255 | Stage runtime for stage VAL is reset to 0; runtime for this stage will not accumulate-you must reset VAL to 0 to allow accumulation of runtime. |

*Figure 37*

Outputs

| Output Name | Cfg | Range | | Description |
|---|---|---|---|---|
| | | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| stgStatusOut | OUT_FLT | | | Output value to connect to StageDriverAdd block. The floating number must be converted to an integer and then converted to a 2 byte value. The upper byte (value right shifted 8 bits) is the maxStgs info and the lower byte (value AND 0xFF) is the stageStatus offset to reference the starting location in digital memory for the stageStatus bytes. |
| offset | OUT_FLT_SAV | | | Float value has two components - after conversion to a two byte unsigned integer value the upper byte is offset of number of nonvolatile entries to get to the start of the stage runtime storage (used only for leadLag=LL-RUNEQ) and the lower byte is the offset of number of digital memory locations to the start of the stage status bytes (one byte allocated per 8 stages assigned in maxStgs) |

Analog Inputs

| Input Name | Cfg | Range | | Input Value | Description |
|---|---|---|---|---|---|
| | | Low | High | | |
| stgStatusIn | IN_ONLY | 1 | 255 | unconnected | Stages all off |
| | | | | invalid | Stages all off |

*Figure 40*

Outputs — 434

| Output Name | Cfg | Range | | Description |
| --- | --- | --- | --- | --- |
| | | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| Stage6 | OUT_DIG | 0 | 1 | Stage 6 output |
| Stage7 | OUT_DIG | 0 | 1 | Stage 7 output |
| Stage8 | OUT_DIG | 0 | 1 | Stage 8 output |

*Figure 41*

From Figure 44

↓ Yes

517

```
Input = nstgActive
if (input < old num stages)
diff = oldnumstages-input
stg = diff + seqStartptr
seqStart ptr = stq % max Stgs;
oldnumstages = input ; startptrTemp = seqStartptr;
if (input = 0) seqEndptr = seqStartptr
else seqEndptr = (seqStartptr + input -1) % maxStgs;
endptrTemp = seqEndptr;
i = 0;
while (i < max Stgs)
if (i > = start ptr temp & i < endptrtemp)
else cmd = 0;
SetStageStatus (VID_ControlDigitalBase + offset Stage Status,i,cmd)
if (i<5) PutFVAL (stage[i] cmd); i + +
```

*Figure 45*

```
stage Status = Get Stage Status (base Stage Status,i)
// if (stageStatus) // stage is On
runtime copy ++;
number Stages Counted On;++;
Put FVAL (base Stage Runtimer + i, runtime copy)
if (runtime copy > = highest Stage Runtime)
highest Stage Runtime = runtime copy
highest Stage NumRuntime = i;

else // stage is off
if (runtime copy < lowest Stage Runtime)
lowest Stage Runtime = runtime Copy;
Lowest Stage Num Runtime = i;
Stage Runtime = Runtime copy
```

if (input > number Stages Counted On)
Set Stage Status (base Stage Status, lowest Stage Num Runtime, 1)
if (input < number Stages counted On)
Set Stage Status (base Stage Status, highest Stage Num Runtime, 0);
// cmd Stgs.
i = 0;
while (i < 5)

runtime copy = Get FVAL (base Stage Runtimer + i)
Stage Status = Get Stage Status (base Stage Status, i);
put FVAL (stage[i], stage Status)
i ++ if (runtime reset i = 0)
put FVAL (base Stage Runtimer + runtime Reset - 1, 0)
// reset runtime value to 0 for number specified
```

Analog Inputs

| Input Name | Cfg | Range | | Input Value | Description |
|---|---|---|---|---|---|
| | | Low | High | | |
| nStagesActive | IN | 0 | 255 | unconnected | Stages all off |
| | | | | invalid | Stages all off |
| maxStgs | PAR_IN | 1 | 255 | invalid | maxStgs=1 |
| | | | | VAL>255 | maxStgs=255 |
| | | | | VAL<1 | maxStgs=1 |
| leadLag | BYTE_PAR | 0 | 2 | | Enumeration:<br>LL_STD=0-first on last off<br>LL_FOFO=1-first on first off<br>LL_RUNEQ=2-runtime equalization for lowest runtime |
| | | | | VAL>2 or <0 | Stages initialized to off and not commanded. |

*Figure 53*

Analog Inputs

| Input Name | Cfg | Range | | Input Value | Description |
|---|---|---|---|---|---|
| | | Low | High | | |
| stgStatusIn | IN | 0 | 15 | unconnected | Stages all off |
| " | " | " | " | invalid | Stages all off |
| firstStage Num | PAR | 0 | 255 | invalid | firstStageNum=1 |
| " | " | " | " | VAL<0 | firstStageNum=0 |
| " | " | " | " | VAL>255 | firstStageNum=255 |

Figure 55

SYSTEM LEVEL FUNCTION BLOCK ENGINE

This application is a continuation-in-part of U.S. patent application Ser. No. 11/620,431, filed Jan. 5, 2007.

This application is a continuation-in-part of U.S. patent application Ser. No. 11/427,750, filed Jun. 29, 2006.

This application is a continuation-in-part of U.S. patent application Ser. No. 11/564,797, filed Nov. 29, 2006.

BACKGROUND

The present invention pertains to engines for designing systems, and particularly to designing controller systems. More particularly, the invention pertains to designing control systems for buildings, engines, aircraft, and so forth.

The present invention may be related to U.S. Pat. No. 6,549,826, issued Apr. 15, 2003, U.S. Pat. No. 6,536,678, issued Mar. 25, 2003, and U.S. Pat. No. 5,479,812, issued Jan. 2, 1996.

U.S. Pat. No. 6,549,826, issued Apr. 15, 2003, U.S. Pat. No. 6,536,678, issued Mar. 25, 2003, U.S. Pat. No. 5,479,812, issued Jan. 2, 1996, and U.S. patent application Ser. No. 11/427,750, filed Jun. 29, 2006, are hereby incorporated by reference.

U.S. patent application Ser. No. 11/620,431, filed Jan. 5, 2007, is hereby incorporated by reference, U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference.

SUMMARY

The invention is a function block engine system.

BRIEF DESCRIPTION OF THE DRAWING

FIG. 15 reveals a linearization table;

FIGS. 18 and 19 show a table of analog inputs and a table of outputs, respectively, for the VELP function block or module;

FIG. 20 is a list of network variables (NVs) used in the function block engine for balancing;

FIG. 37 is a table of analog inputs for the stage driver;

FIG. 38 is a table of analog outputs of the stage driver;

FIG. 40 is a table of the analog input for the stage driver addition;

FIG. 41 is a table of the analog outputs for the stage driver addition;

FIGS. 43-48 constitute a block diagram of the stage driver;

FIGS. 50-56 relate to stage drivers as discussed herein.

DESCRIPTION

Figure 1:
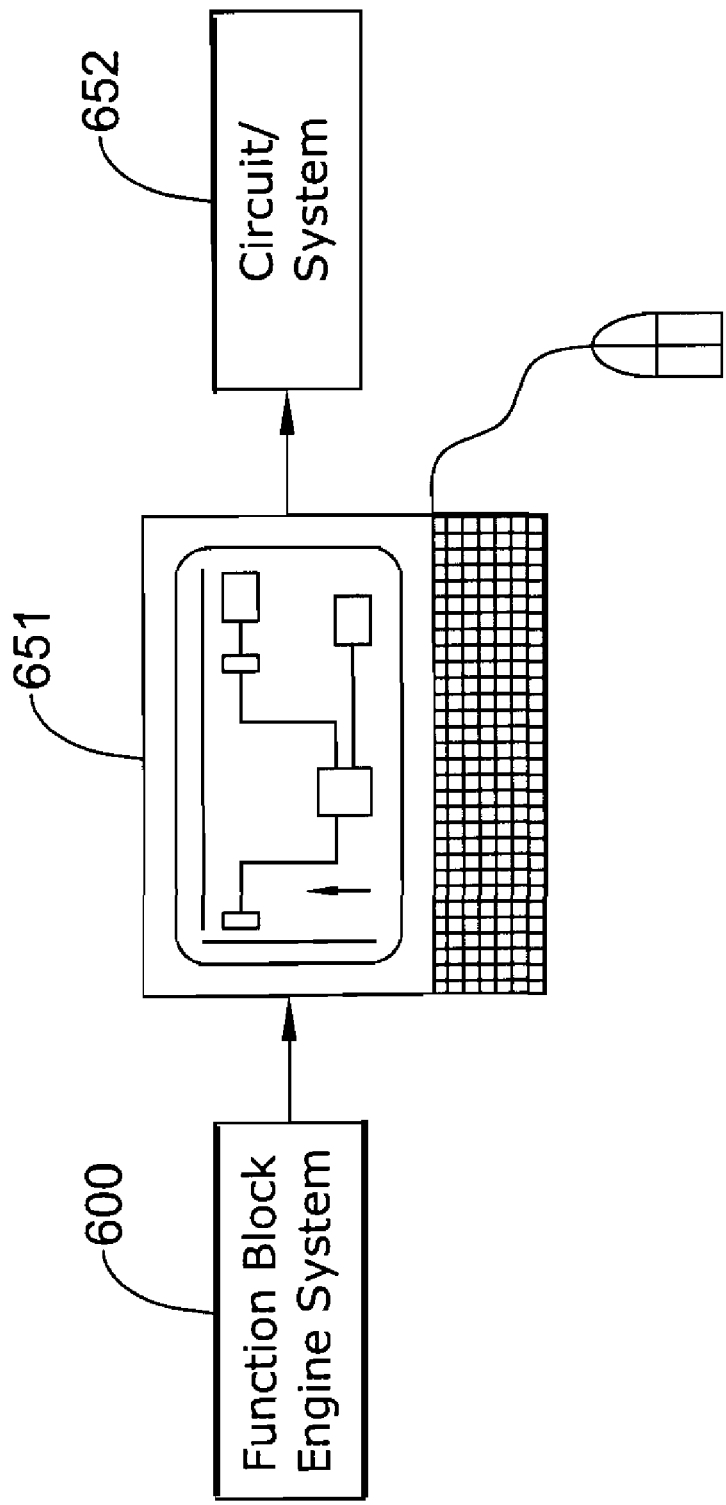
FIG. 1 is a diagram of a relationship of the function block engine system, computer and resulting circuit or system.

With the present invention, one may design and/or implement a system controller or another system having virtually no hardware except for the computer used to design and put the resulting software into a memory, e.g., in a form of microcode or other manner. An ordinary computer may provided the resulting function block engine designed software input to it, i.e., to a memory, and the computer may effectively become the designed controller with function blocks, interconnections, links, inputs, outputs, selections, adjustments, interfaces, a display, visual and/or audio indicators for showing variables, parameters, readings, prescriptions, results, on-station and/or remote monitoring and control whether by keyboard, mouse, touch screen, voice command, eye tracking and blinking control, or other communicative manner, having diagnostics, simulation capabilities within itself and a system to be controlled, plus more, effectively all in conveyable software. For an illustrative instance, one's home computer may loaded with and use the present system level function block engine to design virtually any kind of system controller in a context of software. After design, simulation and testing, as desired, this computer may become the designed system controller for an actual application, or the software may be transferred to another computer or other device to become the system controller. The computer, or some other like-designed processor, programmable personal assistant (PDA), cell phone, device and so on, with the software may become the designed system controller such as, for one among many examples, a programmable thermostat for a building HVAC. Communication between the controller on the computer and the controlled system may be via wireless or non-wireless media.

Additionally, in the commercial HVAC industry, there may be a need to have complex applications that are tested and implemented in controlling devices. These devices should be low cost and be able to meet application needs. There also appears to be a need to have a flexible low cost controller that allows applications to be met as demands change within the low cost controller platform and tools. The function block framework of the present invention may provide a logical application structure that allows a system control application designer (e.g., HVAC) to combine pre-designed blocks featuring powerful control capabilities and thorough connections of libraries and block functions, that may be incorporated the development of sophisticated applications to meet new and advanced customer needs.

The present function block engine system may use relatively little memory in view of its significantly powerful and revolutionary capabilities. Programmable controllers may be implemented as engines that can interpret a meta language that is resident wholly or partially in a random access memory (RAM) as it runs. This means that minimal RAM requirements for a small program may be about 15 K bytes (Kb) and can grow in proportion to the program. An inexpensive microprocessor may typically have a rather small RAM (e.g., 2 K bytes or less) which means that a little amount of RAM (i.e., about 1 Kb) is available after operating system (OS) and communication capabilities are taken into consideration. However, by providing programmability from a function block engine, as described herein, that is resident in FLASH and having the functions use a common pool of RAM to hold minimal static value storage while the rest of the pool is reused by all the blocks for temporary execution space, fairly complex programs can be executed with a fixed memory allocation of about 1K of RAM. The program may simply be a list of "function" calls, as described by the function block definitions herein, which can be downloaded to a small file in FLASH.

FIG. 1 is a diagram showing relationship of the function block engine system 600, computer 651 and a resulting circuit or system 652. One may take the present function block engine system 600, perhaps on a memory medium (e.g., disk, stick or the like) to store and/or load it into a memory of an operating system such as that of a personal computer 651. One may design a circuit or system 652, for example, a controller, with the function block engine system 600. That circuit or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

FIGS. 2-8 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 2. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 203 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The circuit or system design with function blocks in area 603 may continue on to another page as shown in the tool bar 612. The pages may be relabeled, for example, as page 1 was relabeled ad ADD1 at place 626 and page 2 was relabeled as ADD2 at place 627. The circuit or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

Figure 3:
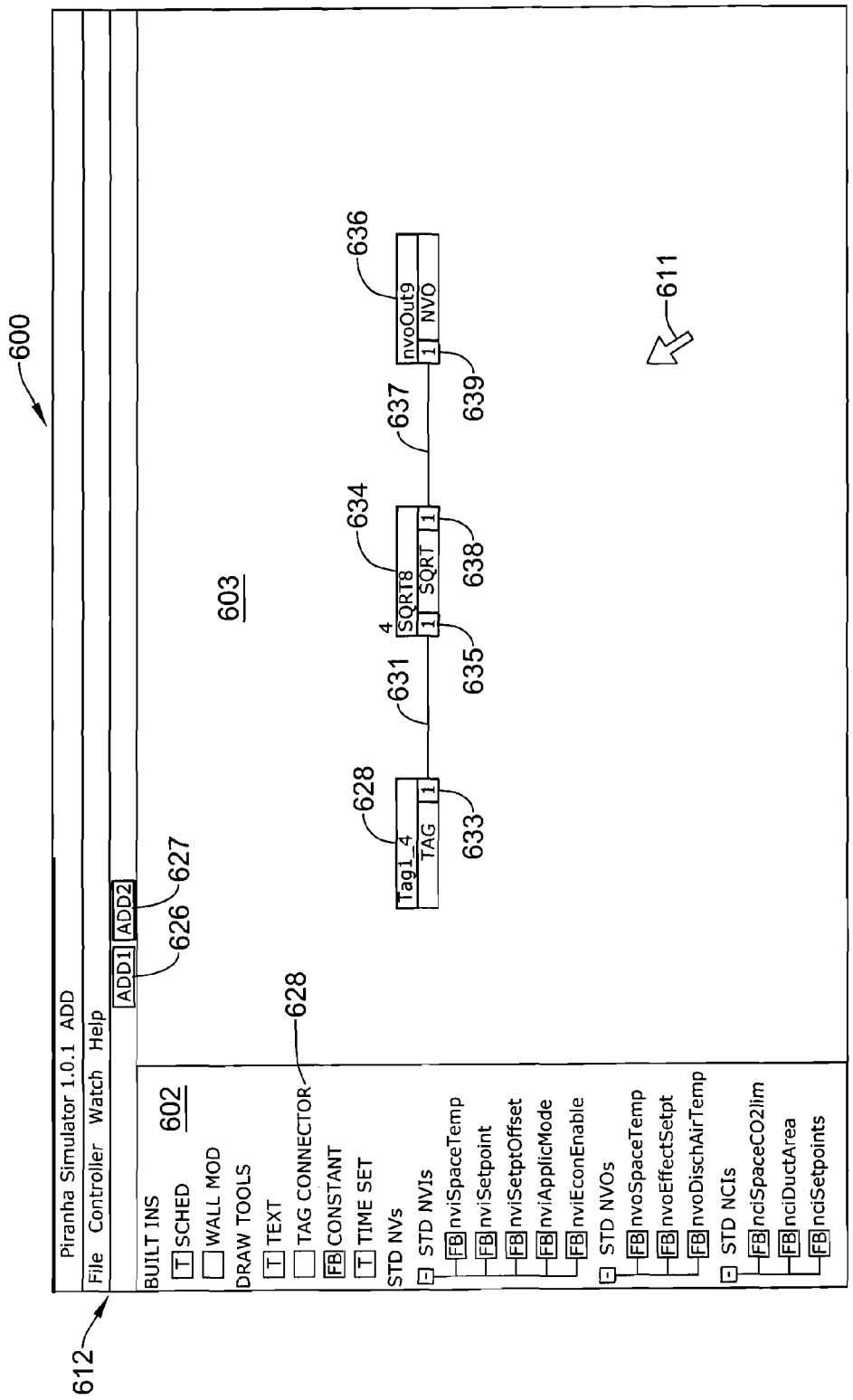
FIG. 3 shows a second page of the screen of FIG. 2.

FIG. 3 shows a continuation of the circuit or system from page ADD1 to page ADD2. Tag 628 may be a continuation of line 631 via input terminal 632 and an output terminal 633 of tag 628 in FIG. 3. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into individual function blocks with their respective inputs and outputs. The block of pages 626 and 627 may be placed into one function block. If there are other function blocks having a number of pages of circuits made from various function blocks, they also may be combined into one function block. These one function blocks might be interconnected and also combined into still another one function block. This hierarchical progression of function blocks being combined may continue until an entire system of a design is in one block, such as an aircraft instrumentation, industrial plant, HVAC or some other kind of controller. The resulting function block might be treated as a black box in some instances.

Figure 4:
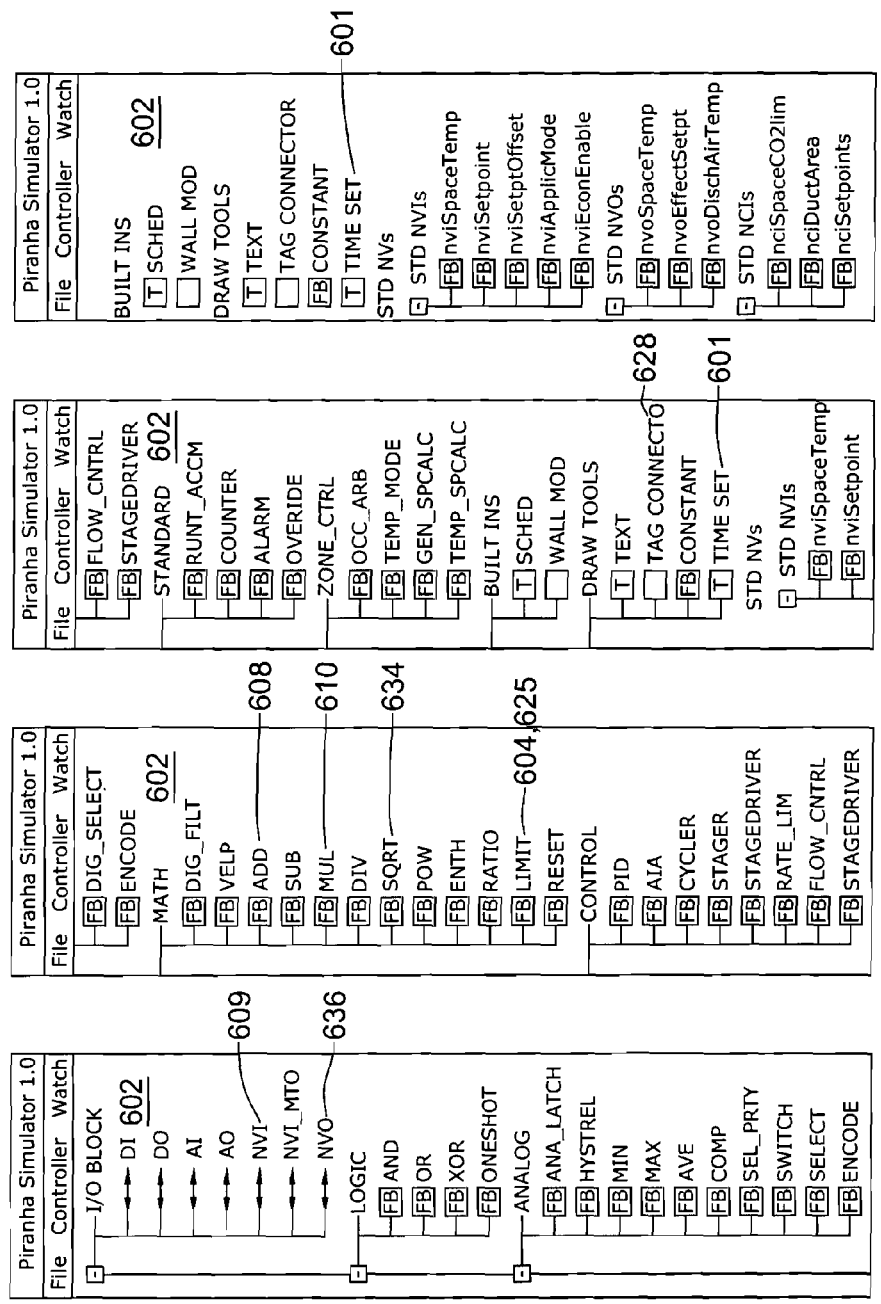
FIG. 4 shows from the screen a partial list of function blocks and other items that may be used in designing a circuit or system.

FIG. 4 shows a list of function blocks and terminals in area 602 of the display that may be selected for developing various kinds of designs. The list is not inclusive in that other function blocks and terminals may be added.

Figure 2:
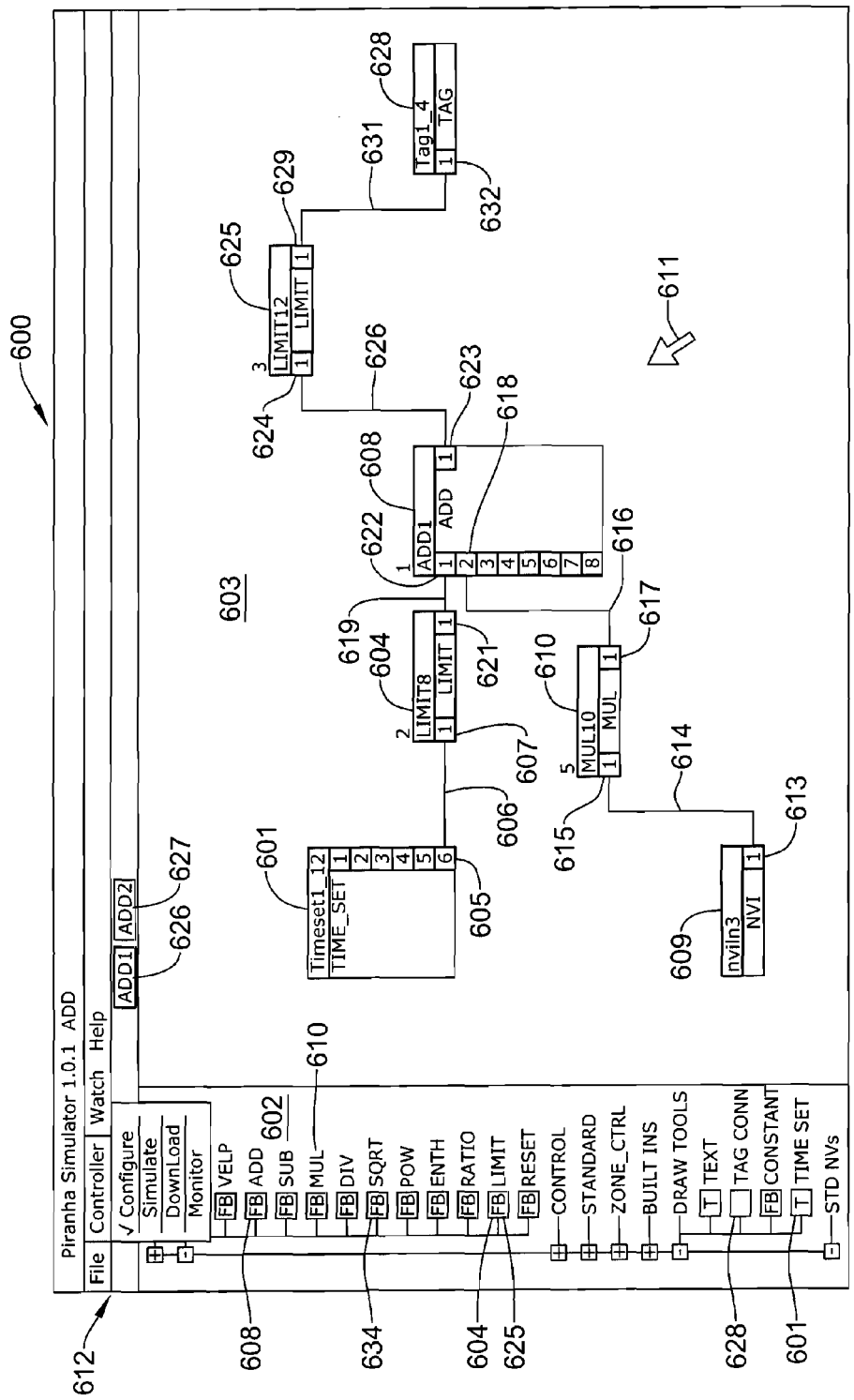
FIG. 2 shows a display screen set up for designing circuits or systems with function blocks.
Figure 5:
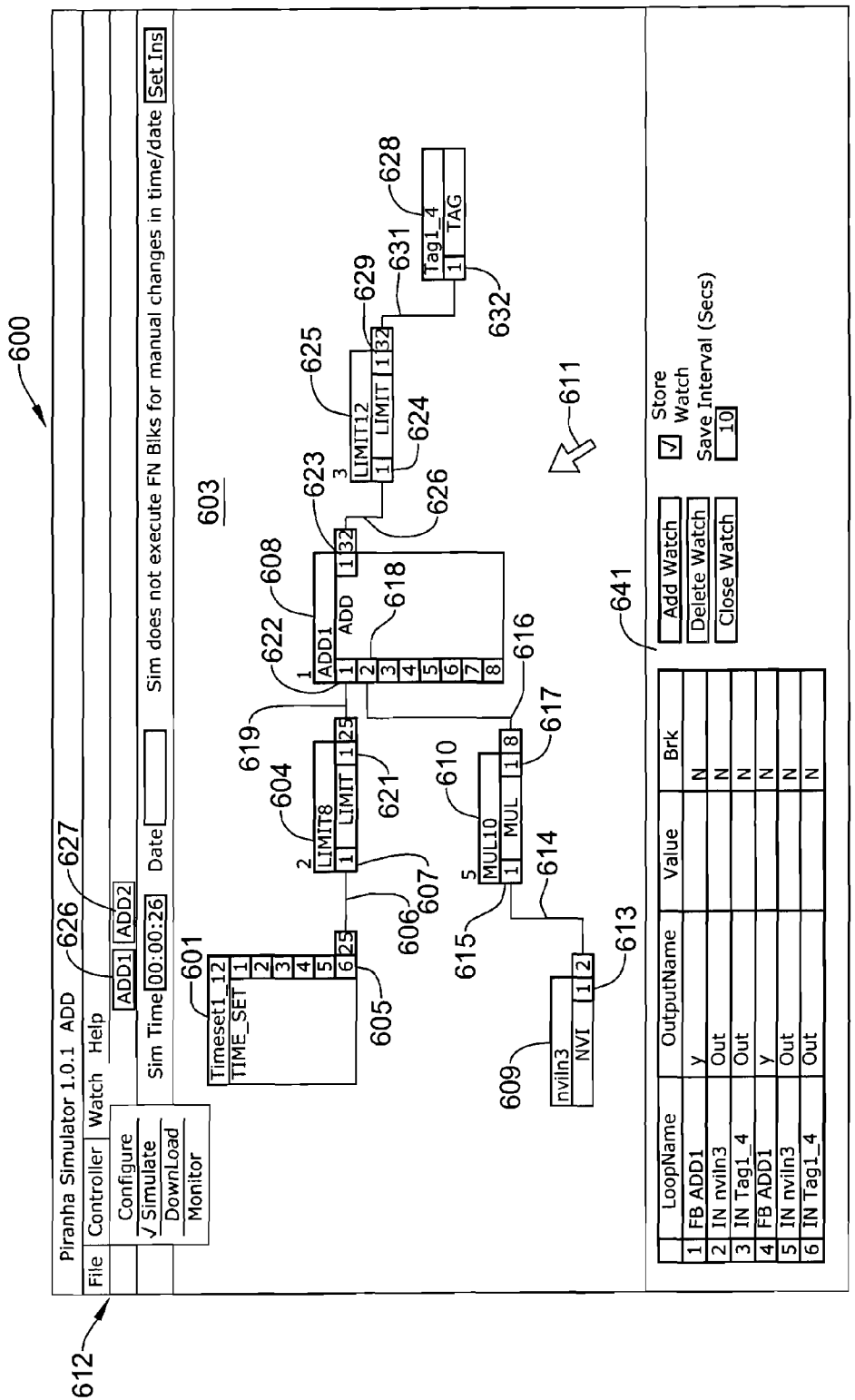
FIG. 5 shows a screen for a simulate mode for the designed circuit or system of FIGS. 3 and 4.
Figure 6:
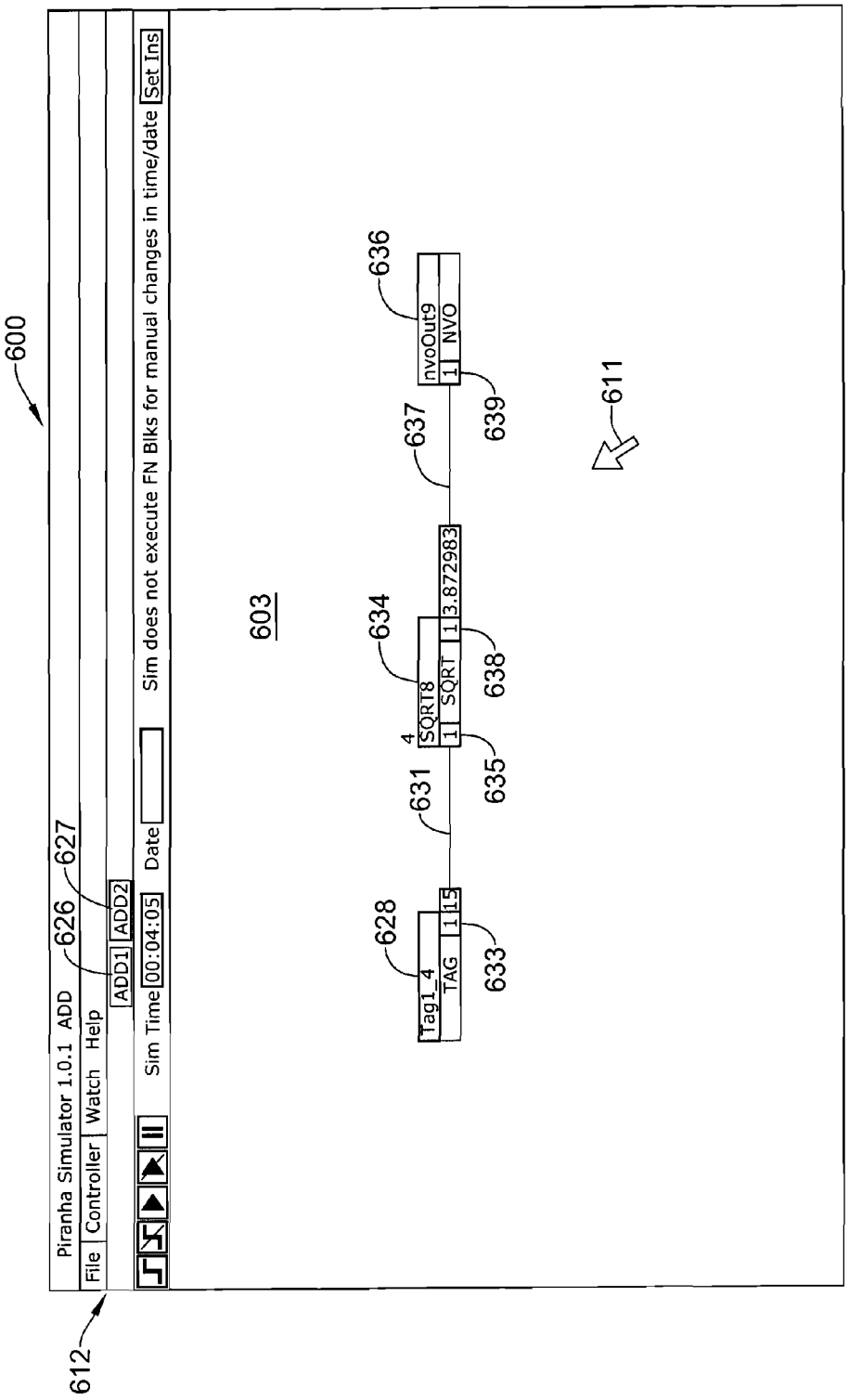
FIG. 6 shows a second page of the screen of FIG. 5.
Figure 7:
FIG. 7 shows a table of data from the simulation of the designed circuit or system of FIGS. 5 and 6.
Figure 8:
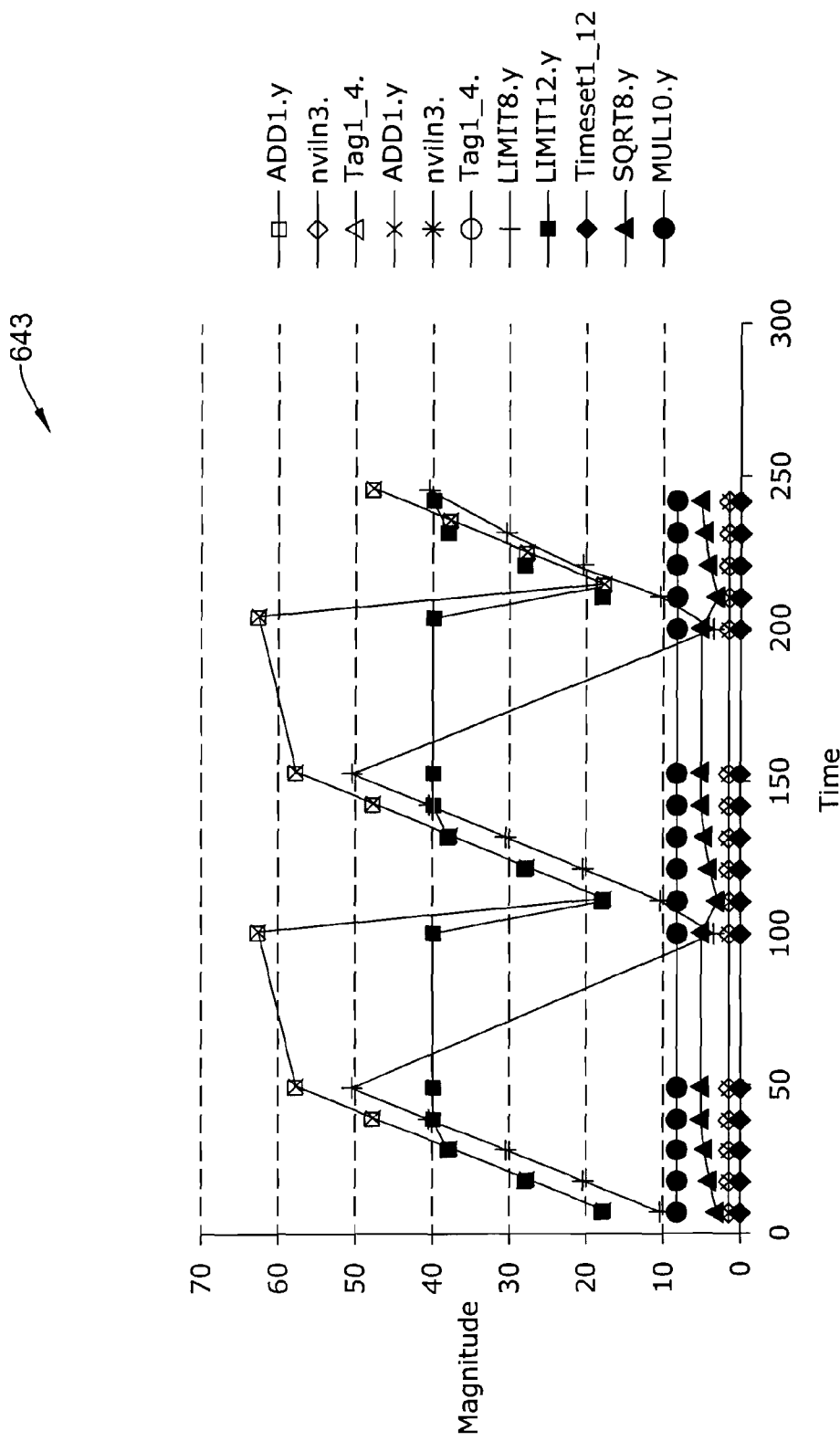
FIG. 8 is a graph of the data in the table in FIG. 7.

FIGS. 5 and 6 show the circuits of FIGS. 2 and 3, respectively, in a simulate mode which may be selected by clicking on "controller" of the tool bar 612 with the mouse arrow 611. Then "simulate" may be clicked on to put the designed circuit into an operational-like scenario. The label "watch" on the tool bar 612 may be clicked on to get the watch dialogue box 641. The loops and outputs along with their respective values may be listed in box 641. Also, values for each increment of time may be provided at the various output terminals of the function blocks. For example, a value of "25" is shown at the output terminal 621 of the limit function block 604. Units may be of time, magnitudes, or some other kind of measurement. The circuit or system, on pages ADD1 626 and ADD2 627 indicated on the tool bar 612, may include analog, digital or a combination of digital and analog function blocks. A simulation may run for various inputs may be recorded in a table 642 as shown in FIG. 7 and plotted as shown in a graph 643 of FIG. 8. Graph 643 shows magnitudes for various outputs versus time.

Figure 9:
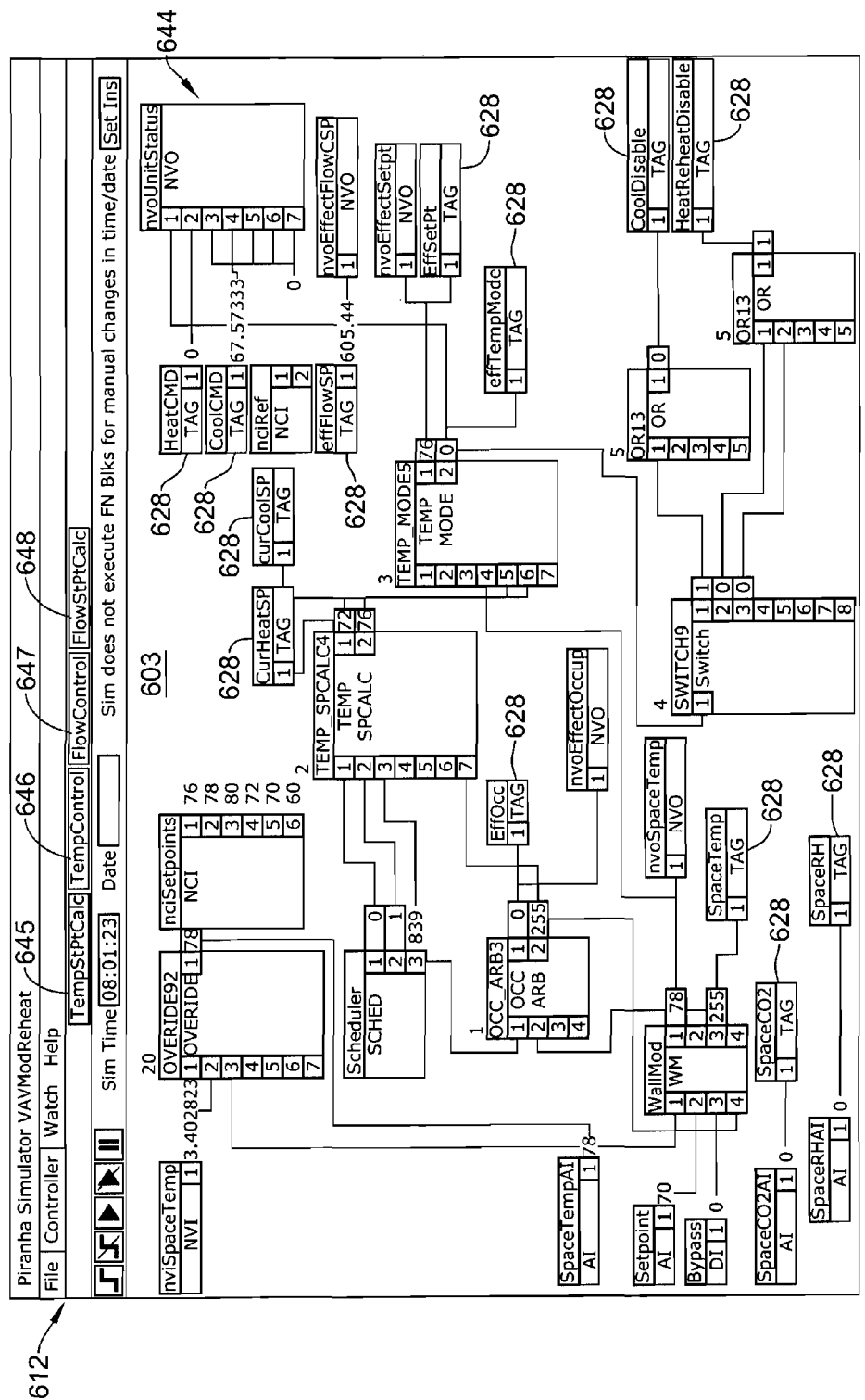
FIG. 9 shows a display screen with one of several pages showing a designed system have somewhat more complexity that the example circuit or system of FIGS. 2 and 3.

FIG. 9 shows a simulation mode of a somewhat intricate circuit 644 of function blocks. Tool bar 612 appears to show that this circuit 644 is one of four pages 645, 646, 647, and 648 of a larger combination of function blocks interconnected via tag connections 628.

Figure 10:
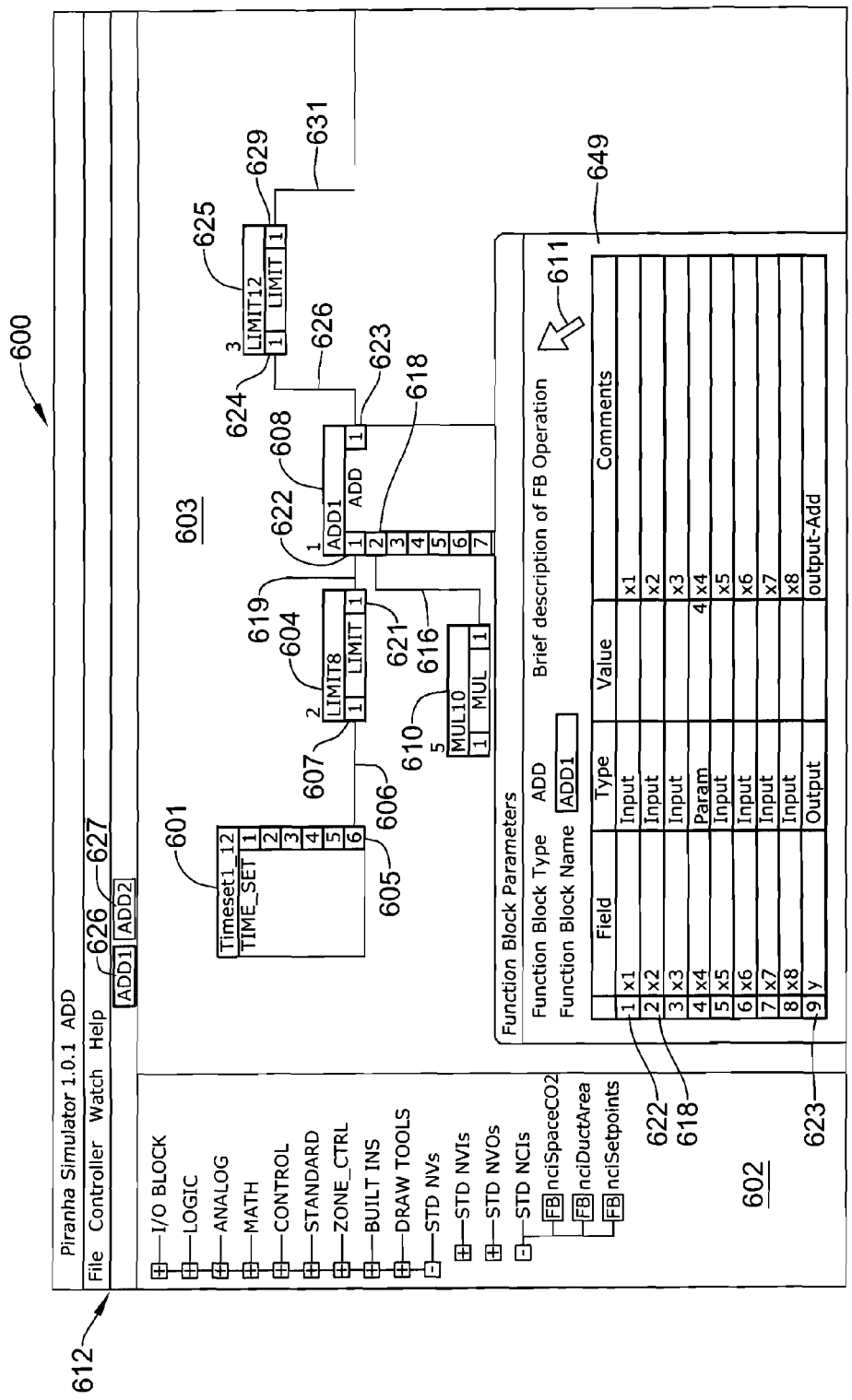
FIG. 10 shows a dialog box with inputs, a parameter and an output.

FIG. 10 shows a portion of the layout of the circuit in FIG. 3, but with a dialogue box 649 showing the inputs and output of the add function block 608, as discussed herein.

An illustrative example resulting from the present function block engine system may be a VAV (variable air volume) system used for reducing the air quantity under periods of limited or no occupancy and saves both energy of air delivery and the energy involved in the heating/cooling the air. The present VAV system has an ability to have high resolution of air flow and the accurate control to an air setpoint, especially at low flow volume. The VAV air flow calibration process or field balancing is a very important part of the product delivery that allows an HVAC balancer to measure the flow very accurately and max flow and min flow and enter an adjustment to the VAV control calibration. At the high end of accuracy and resolution, ten point curves detailing the air pressure (proportional to voltage) in relation to velocity air flow may be customized and developed for the manufacture of flow pickup devices. There appears to be a need to develop an approach that can incorporate the minimum flow and calibration information in addition to the ease required for an HVAC balancer.

Advantages of the system may include the following. Function block architecture allows flexibility to accommodate new architectures, hardware, or changes in HVAC equipment due to improvements in sequences, control strategies, or communication to achieve balancing. A modular system gives ease of understanding. There is efficient use of resources—vastly simpler for balancing algorithm to implement resulting in savings of time and hardware/software resources. It takes advantage of a high point calibration technique in the present assignee's U.S. Pat. Nos. 6,549,826 and 5,479,812. This technique appears as being recognized in industry as leading in flow accuracy and low cost. The present invention facilitates this technique in a much more simple and elegant way.

The system may result in an ability to use multi-platform, multi-purpose programmable controller algorithms that can be adapted to, combined, merged, and/or synthesized with multi-protocols (TCP/IP/Ethernet, BACnet™, LON™ and so on), other applications (RTU, CVAHU, UV, FCU, VAVAHU, and so forth), internet (T7350H, XL15B, webserver) application (HVAC, boiler control per U.S. Pat. No. 6,536,678 owned by the present assignee) and industry (security, test, OEM, and so forth).

The system may address the balancing issues by using software blocks to represent actual control software and connections in an HVAC application control for a VAV application. Blocks used in the description of the balancing process include the VELP or velocity pressure block which converts a velocity pressure value to a velocity, the Comparison block which takes two values and compares them to each other and outputs a true if it is matching, the conjunction block which does a logical AND and a comparison of logical outputs and sets the output to true, and Override function which picks the highest priority input and a ratio box which allows multi-segment performance contouring of the resultant function for flow. The system may solve both the ten point curve calibration issue for very accurate and non-linear flow pick-up equations and also allow for the two point balancing flow capability required for quick and accurate use in the balancing process.

The system has a block of input ten point linearization, zeroing and calibration through coordination of flow velocity and balancing calibration blocks. With respect to air flow detection and measurement, following the flow signal, first, the flow sensor output voltage is amplified by a fixed-gain preamplifier, and then by a programmable scale amplifier. During Factory Test, the gain and offset required to correct the gain and offset of individual sensors may be stored in a hardware adjustable gain circuit. The A/D converter integral with the micro-processor may convert the flow sensor voltage into counts that that are inversely proportional to the flow sensor voltage. During Factory calibration, the reference voltage may be tested and used to store the correct calibration in a separate digital memory or hardware circuit. A ten point curve in memory may be used to adjust the linearization of the velocity pressure based on factory calibration of one or two specific pressures, including zero. The flow sensor may be zero corrected in the HVAC control application before use in the final control circuit. The ZeroFlowCorrection value may be subtracted from the flow pressure in the control application.

The flow sensor voltage may be linearized and converted to feet per minute by applying a linearization curve stored in EEPROM (nciVoltsCal and nciFlowCal). Between stored curve points, linear interpolation may be used. The linearization curve may be loaded into EEPROM using a management tool. The curve may take into account the sensor variations (using measurements made in the factory and stored in EEPROM in nciFactoryCal) and the pickup device curve (unique for each model and duct size).

The flow sensor results may be further corrected by field (job site) measurements. Using a management tool, three actual measured and three apparent values of flow may be entered into EEPROM (nciFld3PtCal). Then the linearized flow may be corrected to the functional flow by the three point curve using linear interpolation between the points.

Figure 11:
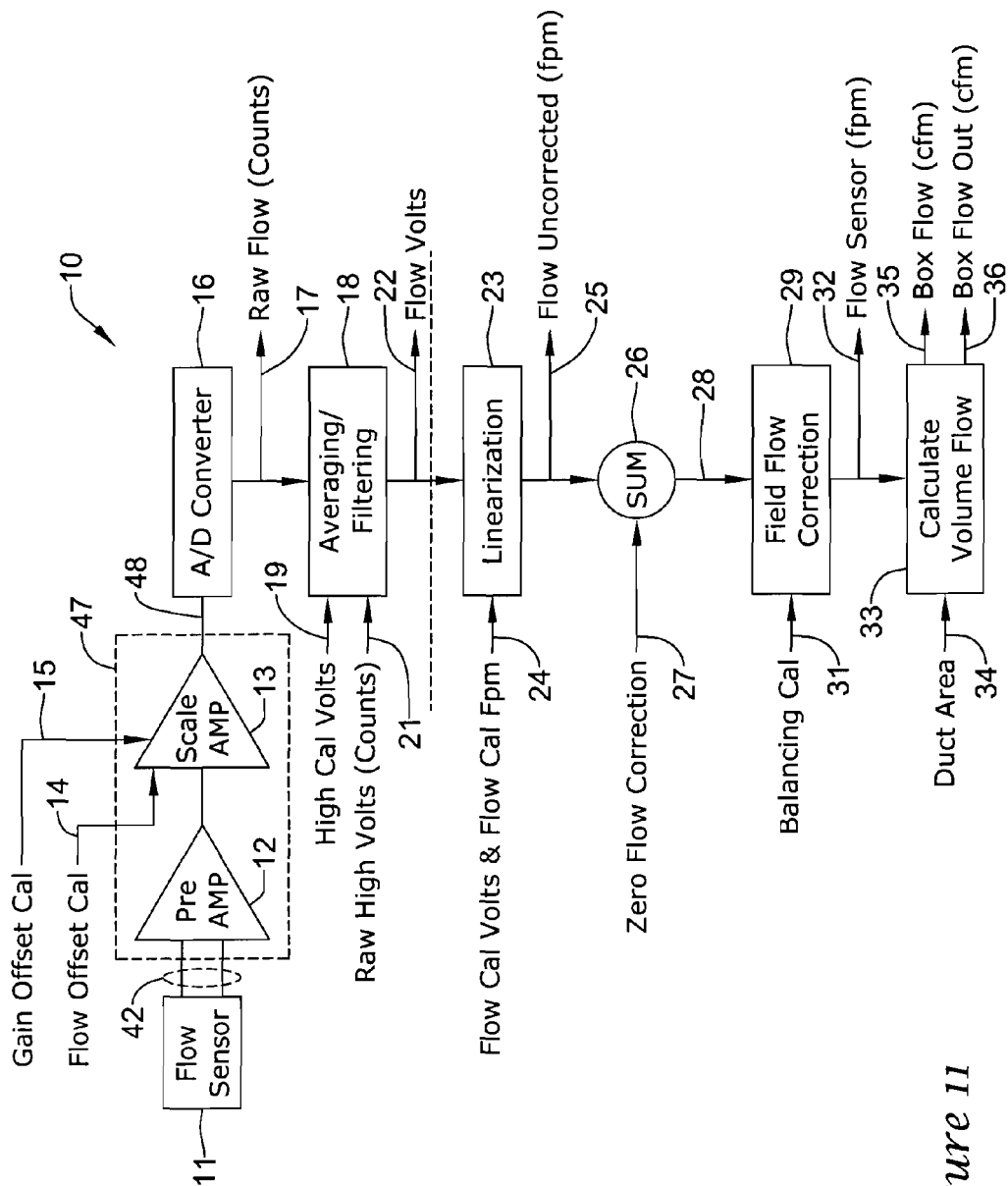
FIG. 11 is a block diagram of a flow velocity calibration and balancing system.

The air flow sensing approach may be noted. Referring to FIG. 11 showing a flow sensor block diagram, first, the flow sensor 11 output voltage may be amplified by a fixed gain preamplifier 12, and then by a programmable scale amplifier 13. During Factory Test, the gain 15 and offset 14 required to correct the gain and offset of individual sensors may be stored in EEPROM (FlowGainCal and FlowOffsetCal). At application restart and once a second when Mode is Factory Test, the scale amplifier hardware register may be loaded with the stored gain and offset from EEPROM. The A/D converter 16 may convert the flow sensor voltage into counts that are inversely proportional to the flow sensor voltage. The A/D converter 16 may also convert a reference voltage into counts. During Factory Test, the reference voltage may be measured and stored in EEPROM (HighCalVolts 19). The two raw counts 17, 21 and HighCalVolts 19 may be combined using a one point reference fixed slope linear equation to calculate the flow sensor voltage (FlowVolts) 22. The latter may occur in the averaging/filtering module 18.

The flow sensor may be zero corrected before linearization. The ZeroFlowCorrection value 27 may be subtracted from the flow sensor before or after the flow sensor linearization 23. The flow sensor voltage 22 may be linearized and converted to feet per minute by applying a linearization curve stored in EEPROM (nciVoltsCal and nciFlowCal). Between stored curve points, linear interpolation may be used. The linearization curve may be loaded into EEPROM using a management tool. The curve may take into account the sensor variations (using measurements made in the factory and stored in EEPROM in nciFactoryCal) and the pickup device curve (unique for each model and duct size).

The flow sensor results may be further corrected by field (job site) measurements. Using a management tool, three actual measured and three apparent values of flow may be entered into EEPROM (nciFld3PtCal)—balancing calibration. Then the linearized flow may be corrected to the functional flow by the three point curve using linear interpolation between the points. There may be more (e.g., 10) or less (e.g., 2) measured and apparent values of flow along with a corresponding multi-point (e.g., 10, 2 or other) curve. It may be noted that FlowOffsetCal and FlowGainCal may be written from the EEPROM to the hardware registers at application_restart, and when Mode is Factory Test.

FIG. 11 is a block diagram of the present flow velocity calibration and balancing system 10. Flow sensor 11 may be of a variable air volume (VAV) module. The sensor 11 may detect flow with a pair of pneumatic tubes in an air flow vent, duct or channel. The output may be a differential pair of signals that go to a preamplifier 12. The output of amplifier 12 may go to a scale amplifier 13, A flow offset signal 14 and a gain offset signal 15 may also be input to amplifier 13 to adjust the flow pressure signal relative to flow and gain offsets, respectively. The adjusted output of the scale amplifier 13 may go to an analog-to-digital converter 16. The output of converter 16 may be a raw flow signal 17 in counts which is input to an averaging and filtering module 18. Module 18 may have a high calibration voltage signal 19 and raw high calibration volts in terms of counts signal 21 input to module 18. The output of module 18 may be a signal 22 in volts indicating an amount of flow. Signal 22 may go to an input of a linearization module 23 which provides an output signal 25 that proportionally represents uncorrected flow in terms of feet per minute (fpm). Input 24 for flow calibration volts and flow calibration in fpm may be input to module 23.

The output 25 of module 23 may go to a summer 26 to be summed with a signal 27 of zero flow correction. The sum of signals 25 and 27 may go as an input signal 28 to a field flow correction module 29. A balancing calibration signal 31 may be input to module 29. A signal 23 from module 29 may be a flow sensor output in terms of fpm. Signal 32 may go to a calculate volume flow module 33. There may be an input signal 34 containing duct area in, for example, square feet (f^2). The calculation of the inputs 32 and 34 may result in output signals 35 and 36 representing box flow and box flow out, respectively, in terms of cfm.

Figure 12:
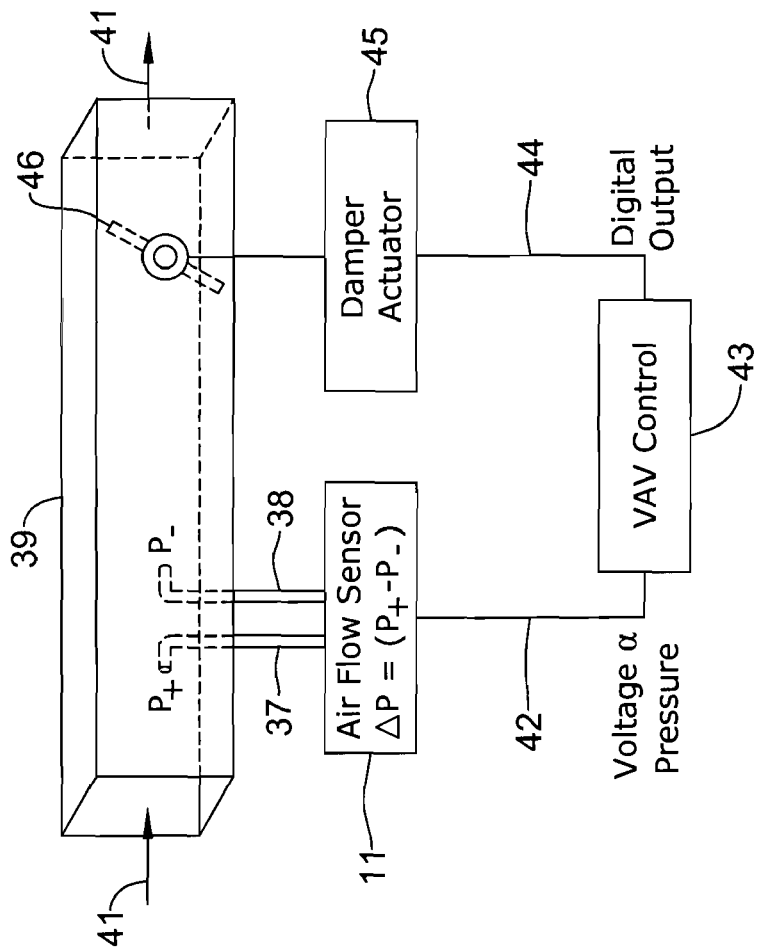
FIG. 12 is a diagram of the air flow sensor.

FIG. 12 shows the air flow sensor 11 with tubes 37 and 38 having ends situated in a duct 39 for measuring a flow of air 41 going through duct 39. Incidentally, the cross-section shape of duct 39 may be square, rectangular, round or another shape. The ends of tubes 37 and 38 may be situated upstream and downstream relative to each other in duct 39. As air 41 is flowing from left to right in the Figure, the end of tube 37 may sense a positive pressure ($P_+$) and the end of tube 38 may sense a negative pressure ($P_-$). A delta pressure ($\Delta P$) which is a difference of a $P_+$ and $P_-$ may be converted into a voltage where the voltage is proportional to the delta pressure. This voltage may be a signal 42 that goes to a variable air volume (VAV) module 43. Signal 42 may be processed between the air flow sensor 11 and VAV control module 43 or within module 43. An output signal 44 may be digital and provided to a damper actuator 45 for controlling a damper 46. Damper 46 may be incrementally closed or opened to regulate the air flow in terms of volume (cfm) through duct 39.

The following is an explanation of a Piranha™ simulator balance chart. The process may be shown in a block diagram. The flow sensor input "Flow Sensor" is a valve that comes from the A/D hardware after it has been linearized to an engineering unit in inches water (inw). In a VAV system, the pressure sensor is converted to a flow valve by use of the following equation.

$$\text{flow} = K(\Delta P - \text{offset})^{1/2}, \text{ and}$$

$$vel = \text{flow}/\text{area};$$

where K=Flow coefficient (K-Factor) representing the actual flow in ft³/min corresponding to a velocity pressure sensor output of 1" w.g., $\Delta P$=flow sensor output pressure in inches water gauge (in W), Offset=a correction pressure (in W) to adjust for zero, Flow=airflow in ft³/min (CFM), vel=flow velocity in ft/min; and
area=duct area in ft². The K-factor is often used in terminal unit controls to calculate actual airflow.

Setting the autoSetOffset to a non-zero number results in the current pressure being stored as an offset that will be subtracted from the current pressure. The Offsetcan be cleared by setting the clear offset to a non-zero number. If the pressure is within 0.002425 in W of zero (approximately 50 fpm) then set the output flow and velocity to zero.

Consistent units should to be used. For example, if p is 1.02 inches water column, and if the offset is 0.02 inches water column, K is 1015, and the area is 0.54 square feet (10 inch diameter), then the flow will be 1015 feet per minute, and the velocity will be 1879 feet per minute.

In the preceding equation, flow is typically measured in cfm (cubic feet per minute) and $\Delta P$ is typically measured in inches water column (inw). The airflow is a pressure typically measured in inches water column. The flow sensor creates a voltage that is proportional to the pressure, V α P or V=(constant)×P.

After the conversion from voltage to engineering units, the input is fed from the flow sensor of the VELP function block. The VELP function block converts the pressure in inw and converts it to a flow rate taking into account the flow zero value "offset". The value may be calculated as flow (in cfm)= $K(\Delta P-\text{offset})^{1/2}$.

Figure 13:
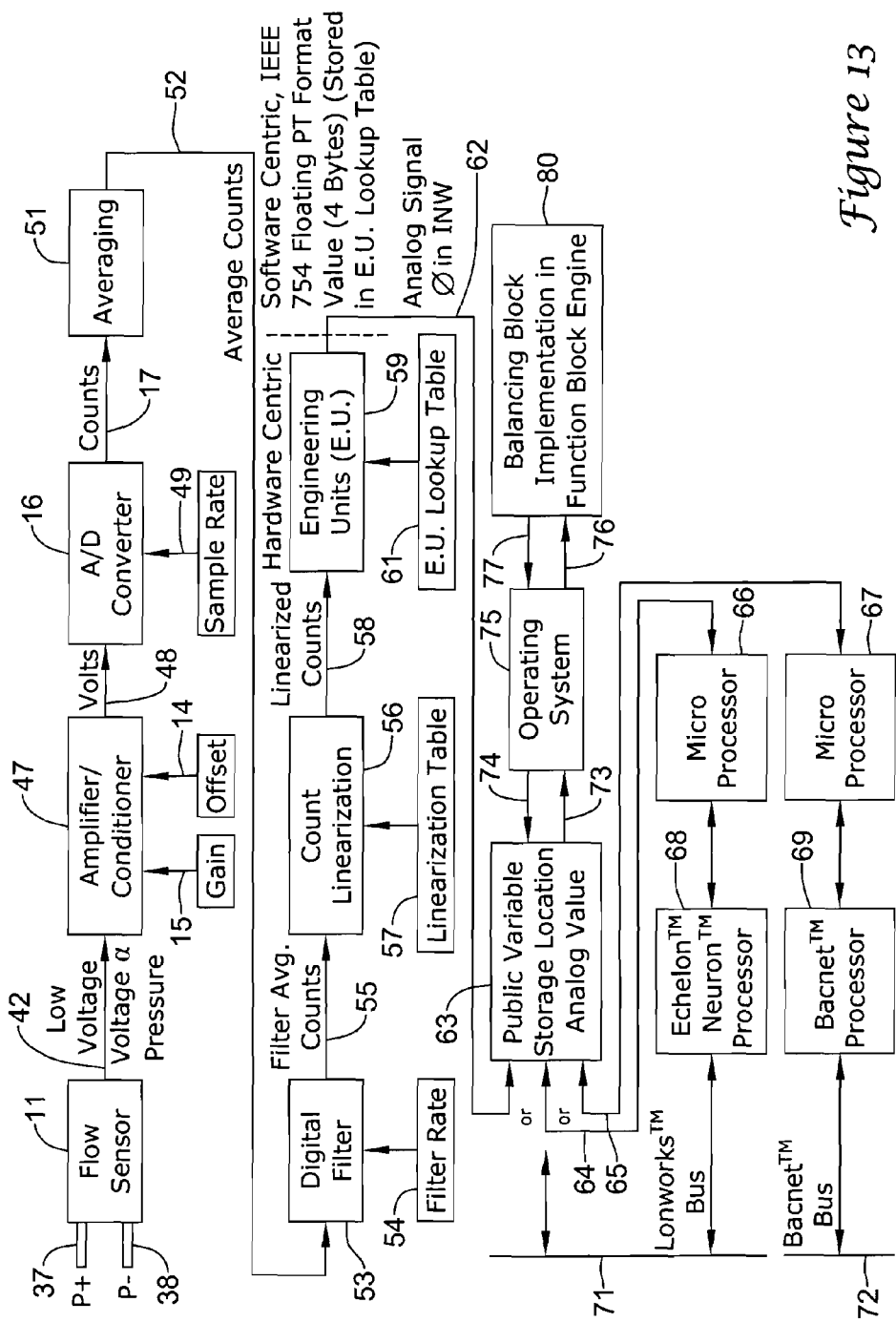
FIG. 13 is an extended block diagram of a system like that of FIG. 11.

FIG. 13 is a more detailed block diagram of the processing of signals for system 10. As in FIGS. 11 and 12, flow sensor 11 may provide a low voltage signal 42 where the voltage is proportional to the difference of sensed pressures from tubes 37 and 38. The output signal 42 may go to an amplifier/conditioner module 47. Module 47 may consist of preamp 12 and scale amp 13. Also, module 47 may have offset and gain signals 14 and 15 as inputs. An output 48 in volts may be provided by module 47 to the A/D converter 16. A sample rate input 49 may be provided to converter 16. An output 17 of counts may go to an averaging module 51 that provides averaging of signal 17. An average counts signal 52 may go to a digital filter module 53. A filter rate 54 may be input to digital filter 53. An output signal 55 of filtered average counts may be input to a count linearization module 56. Linearization by module 56 may be based on a linearization table 57 input to module 56. An output 58 of linearized counts may go to an engineering units (e.u.) module 59. Information for module 59 to provide an analog signal 62 in inw (inches of water) from linearized counts or units may be provided by an e.u. lookup table 61. Signal 61 may go to a public variable storage location analog value module 63. Alternatively, connections 64 or 65 may provide and/or receive signals between module 63 and microprocessor 66 or 67, respectively. Microprocessor 66 may be bidirectionally connected to an Echelon™ Neuron™ processor 68.

Microprocessor 67 may be bidirectionally connected to a BACnet™ processor 69. Processor 68 may be bidirectionally connected to a LonWorks™ bus 71. Processor 69 may be bidirectionally connected to a BACnet™ bus 72. Buses 71 and 72 may provide similar information as that of signal 62 ultimately from other sensors.

Module 63 may provide output signals 73 to an operating system module 75 and receive signals 74 from module 75. Operating system module 75 may provide signals 76 to a balancing block implementation in a function block engine module 80. Module 75 may receive signals 77 from module 80.

Figure 14:
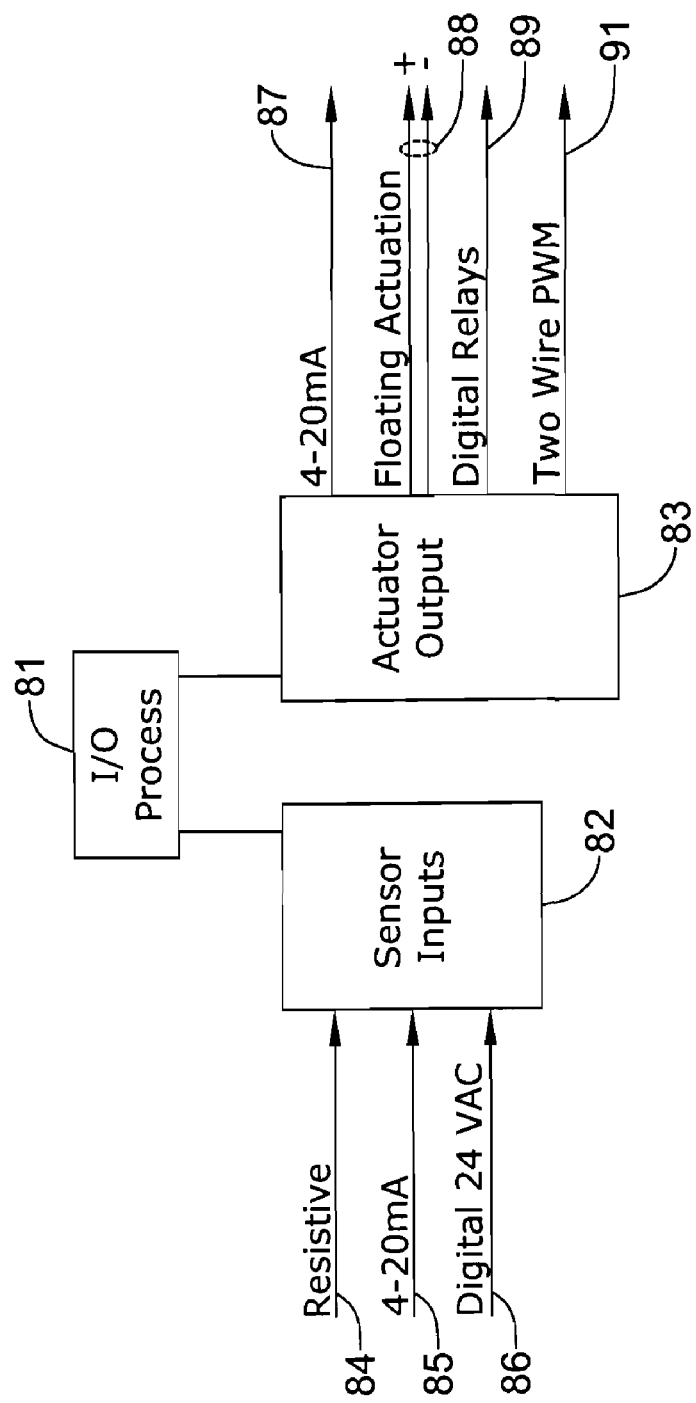
FIG. 14 is an input/output block diagram that may be associated with interacting with an operating system of a system like that in FIG. 13.

Module 63 may include an input/output processor module 81 that receives sensor inputs and provides actuator outputs. A sensor input module 82 may be connected to module 81. An actuator output module 83 may be connected to module 81. Inputs 84, 85 and 86 may receive resistive signals, 4-20 mA signals and digital 24 VAC signals, respectively. Other kinds of signals may be received by the inputs. Outputs 87, 88, 89 and 92 may provide signals for dampers, valves, and so forth. Outputs 87 may provide 4-20 mA signals. Output 88 may be a floating actuation of plus and minus signals of about 24 VAC to provide good resolution positioning of a damper at various angles relative to an air flow. Output 89 may provide digital relay signals and output 91 may be a two-wire PWM (pulse width modulated) signals. FIG. 14 is a diagram of modules 81, 82 and 83.

Figure 16:
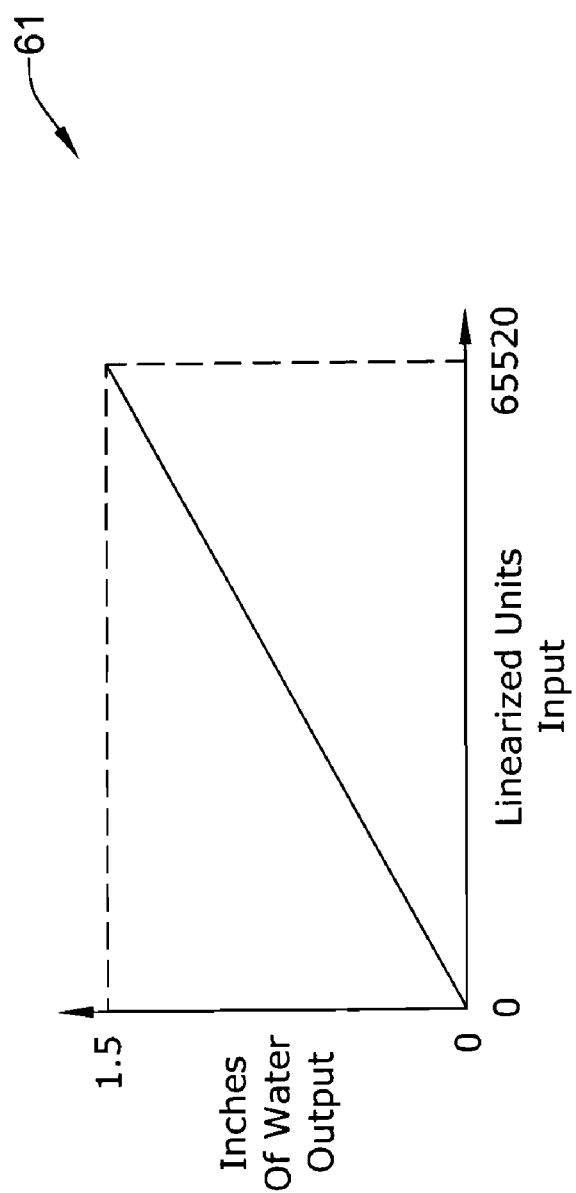
FIG. 16 shows an engineering units lookup table.

FIG. 15 shows a linearization table 57. It shows examples of linearization counts in and counts out for several pressures. The right column shows, for information, the subject pressures in Pascals. The latter information is not necessarily provided in the table. FIG. 16 shows the e.u. lookup table 61. It provides an equivalent inches of water output on the ordinate axis versus the linearized units input on the abscissa axis. The relationship appears to be linear.

Figure 17:
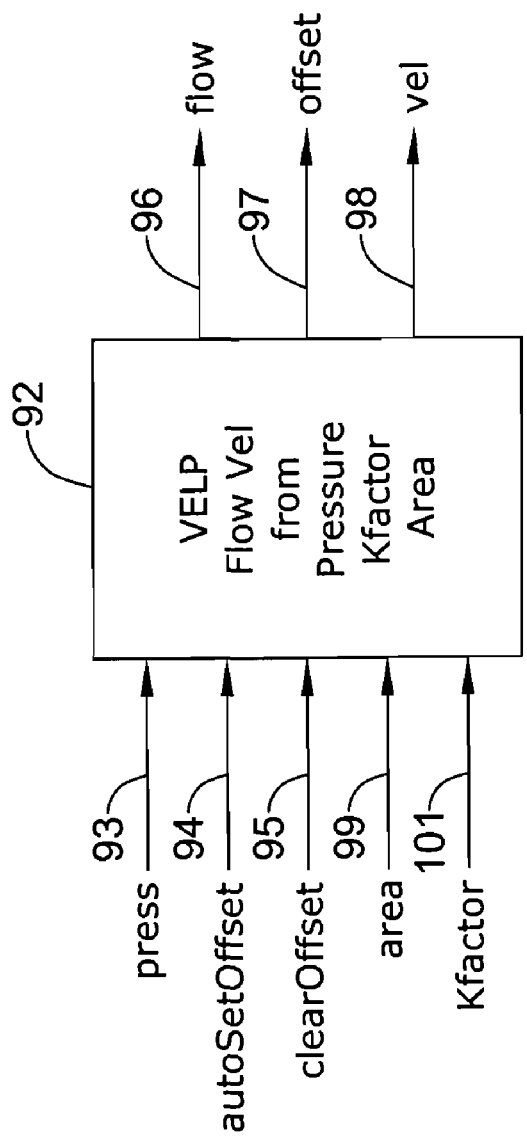
FIG. 17 shows a velocity pressure (VELP) function block.

FIG. 17 shows a velocity pressure (VELP) function block 92. It may provide a flow 96 from pressure kFactor and area. The inputs may include pressure 93, auto set offset and clear offset. The other outputs 97 and 98 may include offset and velocity, respectfully. Other inputs 99 and 100 may include area and kFactor, respectively.

FIGS. 18 and 19 show a table of analog inputs and a table of outputs for the VELP module 92, respectively. Table 102 has columns showing the input name, Cfg, low and high range, input value and description for each of the inputs 93, 94, 95, 99 and 101. Table 103 has columns showing output name, Cfg, low and high range, and description for each of the outputs 96, 97 and 98.

FIG. 20 is a list of network variables (NVs) used in the function block engine for balancing. The regular single duct VAV balancing may use the NV names.

Figure 21:
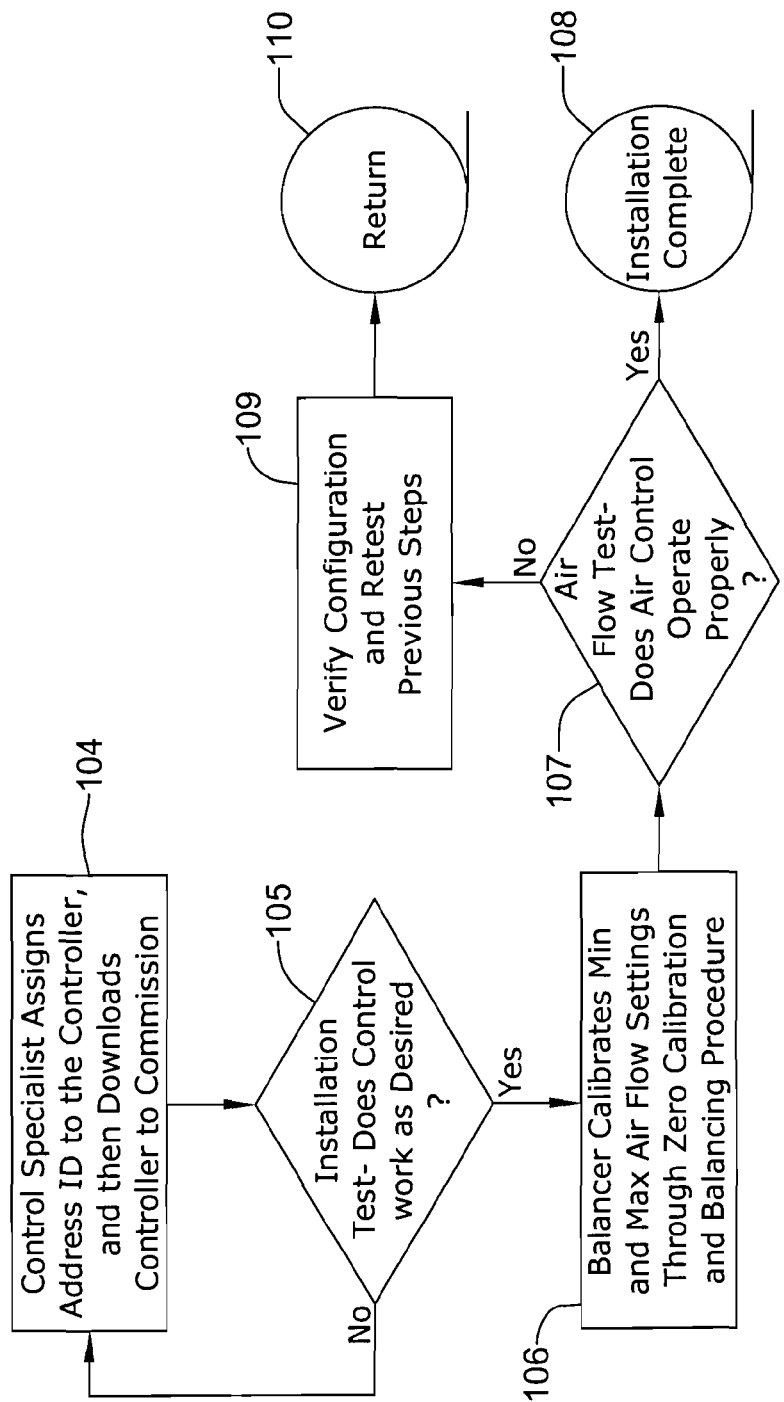
FIG. 21 is a diagram of a variable air volume balancing overview.

FIG. 21 is a diagram of a VAV balancing overview. Block 104 indicates that a control specialist may assign an address identification (ID) to a controller, and then download the controller using Evision™ or LonSpec™ to commission. The next step is an installation test question in diamond 105 of whether the control works as desired. If the answer is "no", then one may return to block 104. If the answer is "yes", then one may go to a block 106 where a balancer calibrates minimum and maximum settings through Evision™ or LonSpec™ zero calibration and balancing procedure. Other products besides Evision™ or LonSpec™ may be used in blocks 104 and 105. One may go to an air flow test question of diamond 107 which asks whether the air control operates properly. If the answer is "yes", then the installation as noted in circle 108 may be complete. If the answer is "no", then one may verify the configuration and retest items of the previous blocks as indicated in block 109. After doing such verification one or more times, without success, then one may return the air control system as indicated in circle 110.

Figure 22:
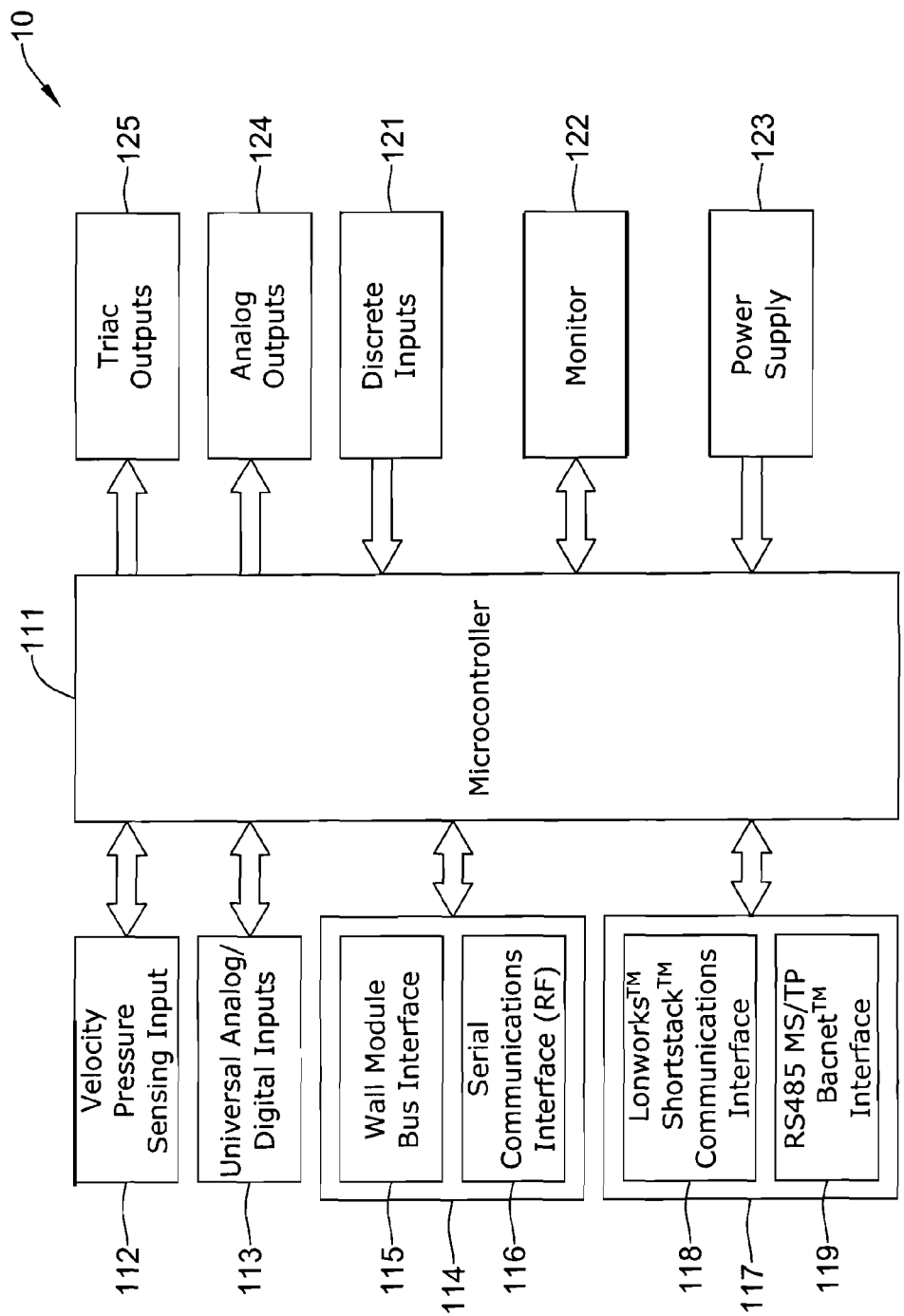
FIG. 22 is an overview block diagram of the present system with its interaction with a microcontroller.

FIG. 22 is an overview block diagram of the present system 10 with its interaction with a microcontroller. A central item may be a micro controller module 111. Microcontroller module 111 may have one or more processors. Velocity pressure sensing input module 112 may be connected to microcontroller 111. Universal analog/digital inputs module 113 may be connected to module 111. An interface module 114, having a wall module interface 115 and a serial communications interface (RF) 116, may be connected to module 111. Another interface module 117, having a LonWorks™ ShortStack™ communications interface 118 and an RS485 MS/TP BACnet™ interface 119 may be connected to module 111. A discrete inputs module 121 may be connected to module 111. A monitor 122 may be connected to module 111. A power supply module 123 may be connected to module 111. An analog outputs module 124 and a triac outputs module 125 may be connected to module 111. Other modules, as desired, may be provided and connected to microcontroller module 111.

Figure 23:
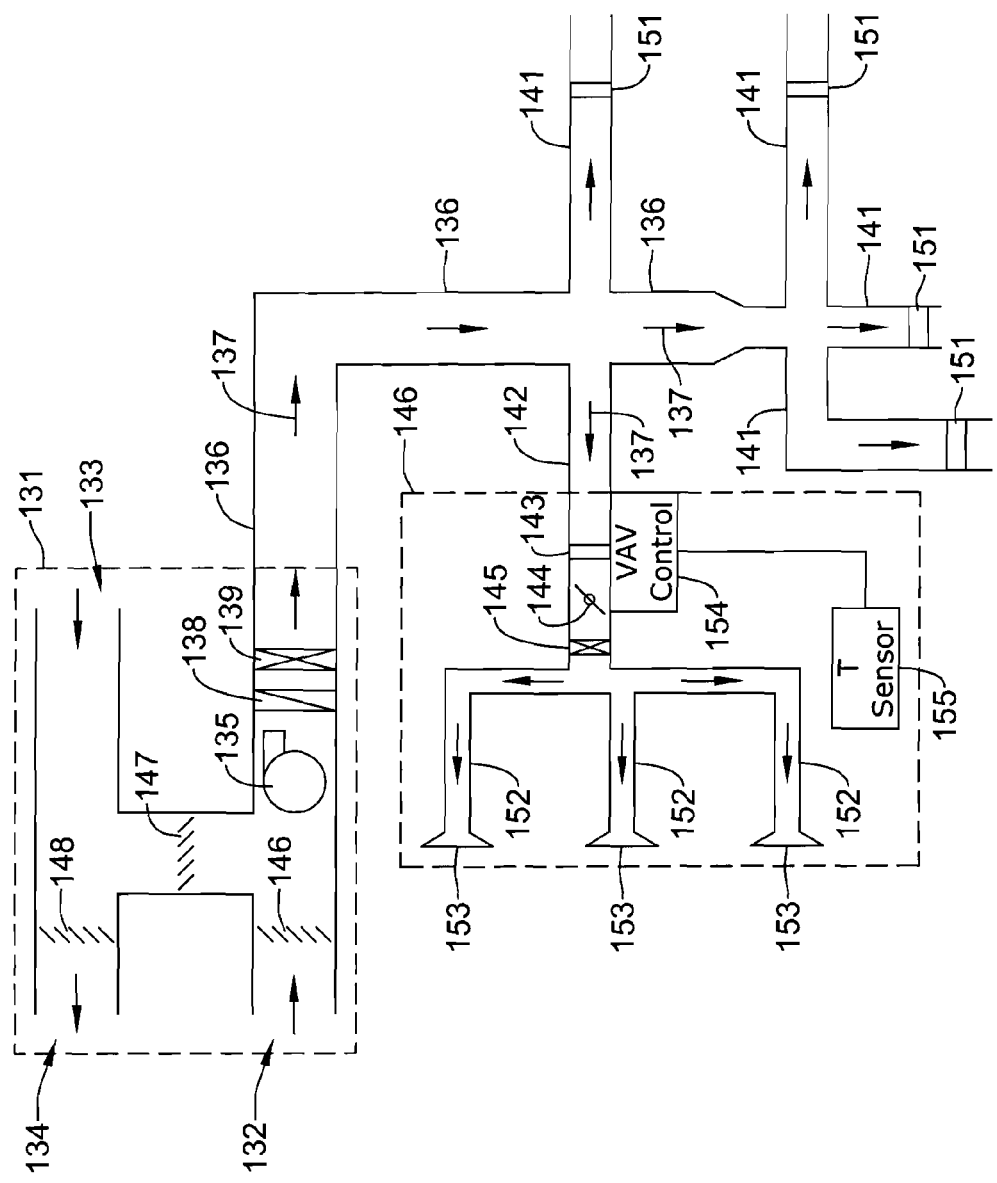
FIG. 23 shows a schematic of illustrative example of a variable air duct system.

FIG. 23 shows a schematic of example portions of a VAV duct system and connection with an air handler system. An air handler unit (AHU) 131 may bring in fresh air at intake 132, system return air at intake 133, and put out exhaust air at outlet 134. A fan 135 may push supply air 137 from AHU 131 into duct 136. Supply air 137 may be set to have a 55 degree temperature. The temperature of the air may be affected by cooler 138 and heater 139. Air 137 may be routed from the primary duct 136 to secondary ducts 141 and 142. Ducts 141 may convey air 137 various zones of a building. Duct 141 may convey air 137 into a zone through a VAV 143, a damper 144 and a heater 145.

In zone 146, air 137 may enter from duct 142 into smaller ducts 152. The air 137 may enter the space of zone 146 through diffusers 153 at the ends of ducts 152, respectively. In zone 14G, there may be return vents and ducts for returning the air 137 back to the AHU 131 at the return opening 133. Similar air delivery and return may apply the other zones of ducts 141. A control 154 for VAV 142 may be connected to one or more temperature sensors 155.

AHU 131 may have a fresh air intake damper 146, a return air damper 147 and an exhaust air damper 148. If the fresh air intake damper is 100 percent open, then the return air damper 147 would 100 percent closed and the exhaust air damper 148 would be 100 percent open. If the fresh air damper 146 is partially closed, then return air damper 147 may be partially open and exhaust air damper 148 may be partially closed. If fresh air damper 132 is completely closed, then damper 147 may be completely open and damper 148 may be completely closed. However, the fresh air damper may be generally open because of certain minimum fresh air requirements. One cannot just add up percentages of openness and closure to determine a relationship among the dampers because the amount of air flow according to the percentage of openness and closure of a damper may be generally nonlinear.

Ducts 141 may have corresponding VAVs 151, controls and sensors for their respective zones. The air 137 just coming out of the AHU 131 may be at 6000 cfm. A 1000 cfm may go to each of the ducts 141 and 2000 cfm to duct 142. Or each duct may receive a different amount of cfm than another duct. However, the 1000 cfm per duct 141 may be used for illustrative simplicity.

Figure 24:
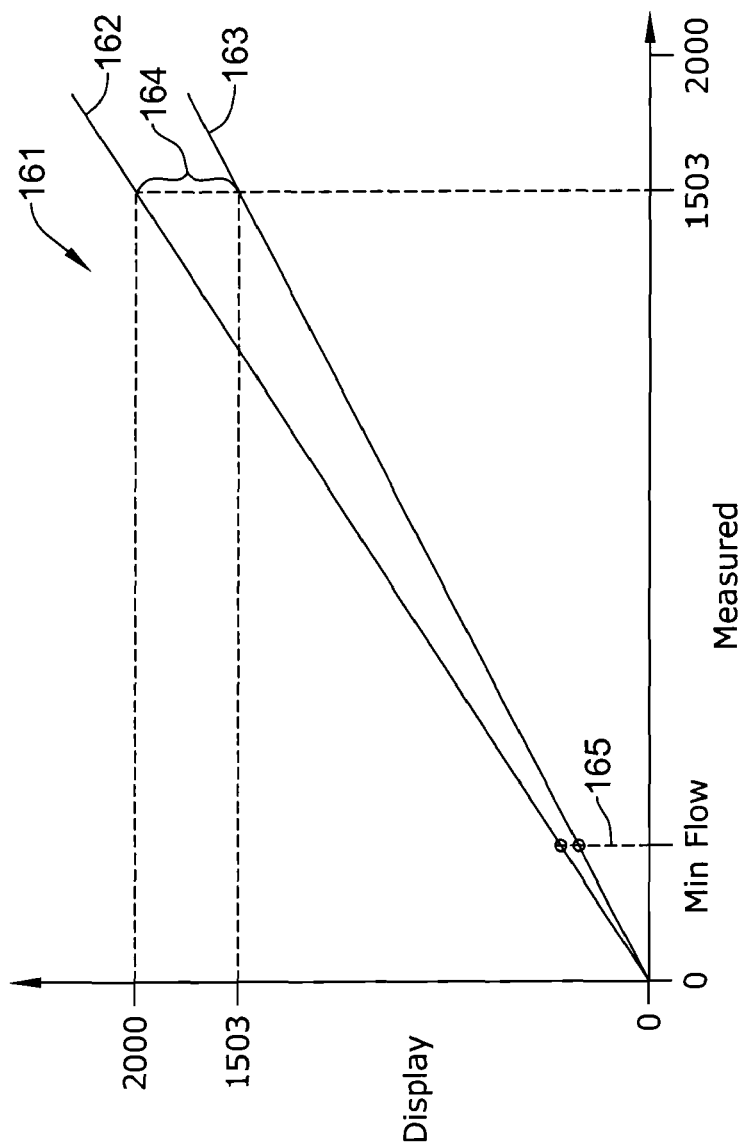
FIG. 24 is a graph of displayed air flow and measured air and a basis for correction.
Figure 25:
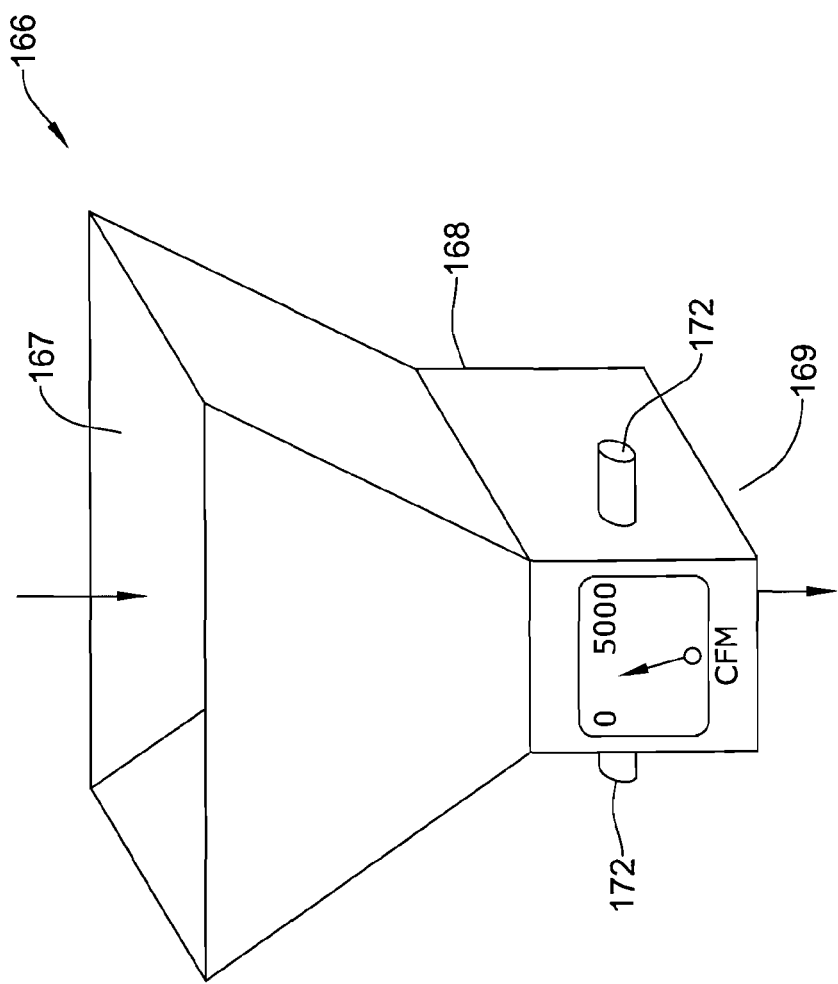
FIG. 25 is a diagram of a hood used for measuring air flow.

A display of the system 10 may indicate a certain amount of flow through a duct or ducts 137 and 152. For example, the display may indicate 2000 cfm. However, the measured amount may, for instance, be 1503 cfm. FIG. 24 shows a graph 161. The ordinate coordinate shows the displayed cfm and the abscissa coordinate shows the measure cfm. Plot 162 represents data before balancing and plot 163 represents data after balancing. The data is supposed data. The difference 164 between the plots 162 and 163 may be characterized by a "K" factor referred to as "kFactor". Line 165 represents the minimum flow. The airflow may be measured at the diffusers 153, for example in FIG. 23, with a hood 166. Opening 167 may be put up against the surface around the diffusers so that all of the air goes through the hood including the cfm sensor portion 168. The air flow may exit out of opening 169. The cfm of the air flow may be read on a meter 171. The hood may be held up against the diffuser vent with handles 172.

Figure 26:
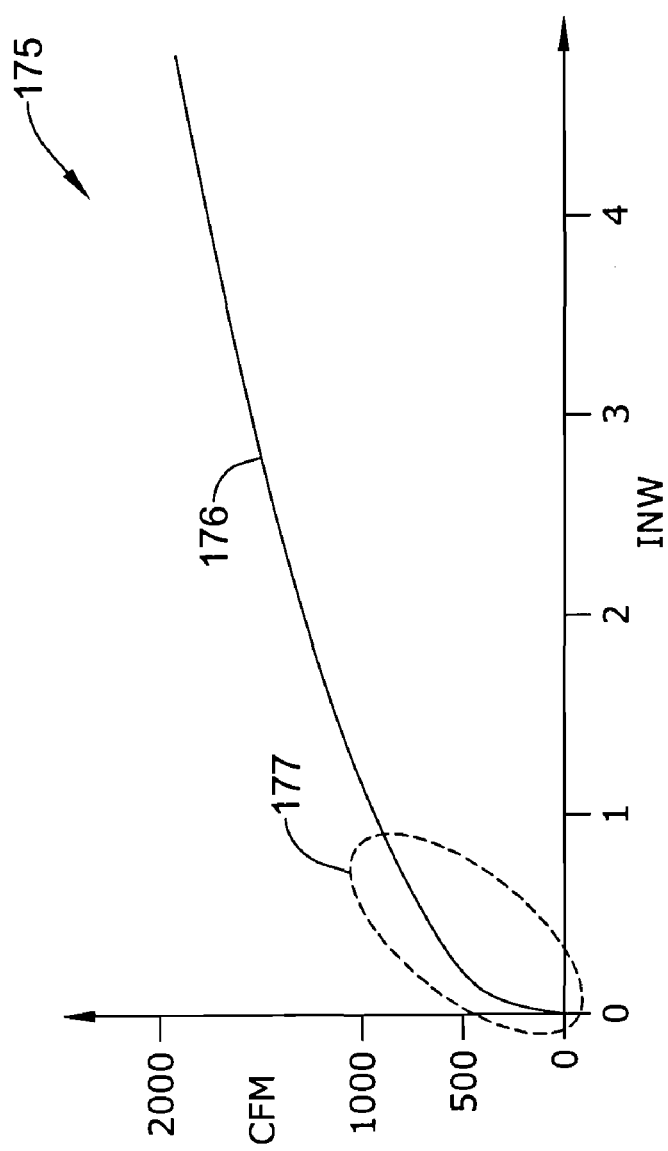
FIG. 26 is a graph showing a relationship between air flow rate and pressure.

Graph 175 of FIG. 26 shows a relationship between cfm of an air flow and the sensed delta pressure in inches of water. The relationship of the flow rate may be represented by "Flow=k(ΔP)^½." The curve 176 represents that relationship. An area 177 of air flow measurement may be difficult to measure and/or monitor by related art systems. The system may provide a good resolution to sensed measurements in area 177 of curve 176.

Figure 27:
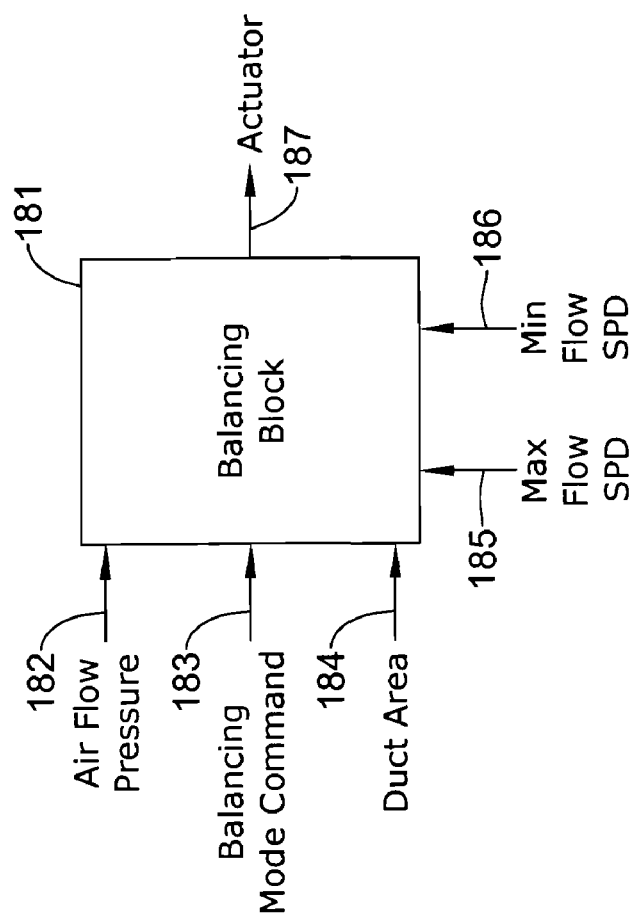
FIG. 27 is an overview diagram of a balancing block showing inputs and outputs.

FIG. 27 is an overview diagram of a balancing block 181. It shows inputs of air flow pressure 182, balancing mode command 183, duct area 184, maximum flow speed 185 and minimum flow speed 186. Block 181 has an actuator output 187.

Figure 28:
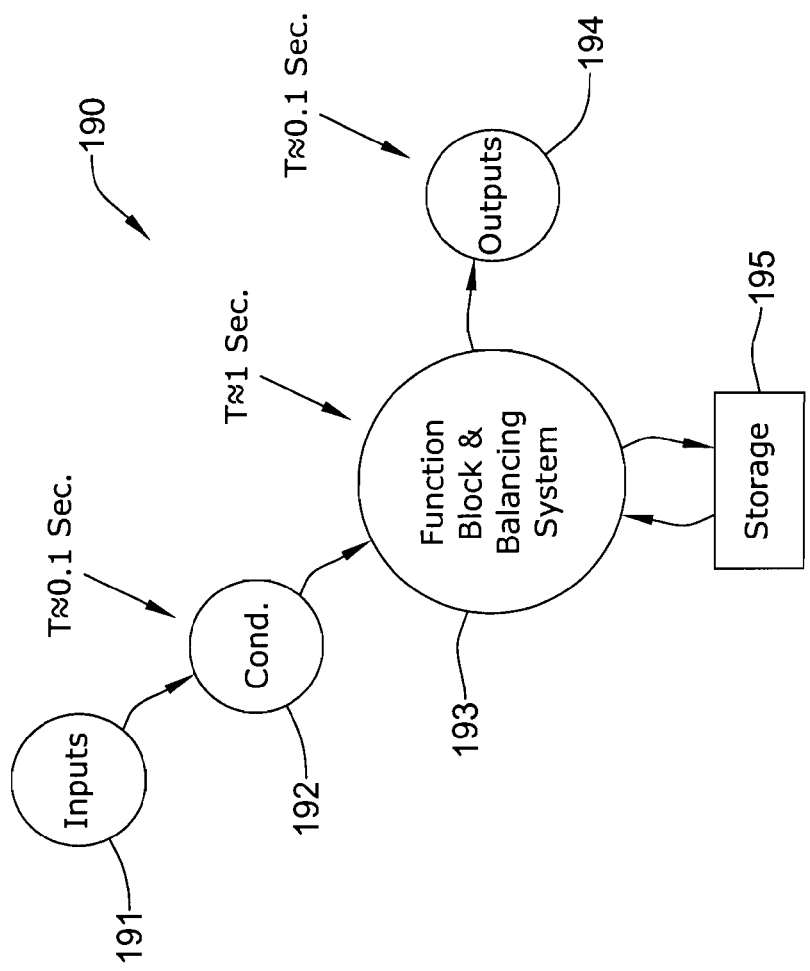
FIG. 28 shows a diagram of a balancing system and times for activity between the system and several other components.

FIG. 28 shows portions of a balancing system 190 and their times for activity among them. For signals at inputs 191 to reach the function block and balancing system 193 via the conditioning 192 of the signals may take about 0.1 second. The time for the block and system 193 to process the received signals may be about one second. To provide signals from the block and system 193 to the outputs 194 may take about 0.1 second. The interaction of the block and system 193 and storage or memory 195 may be significantly faster than 0.1 second.

Figure 29:
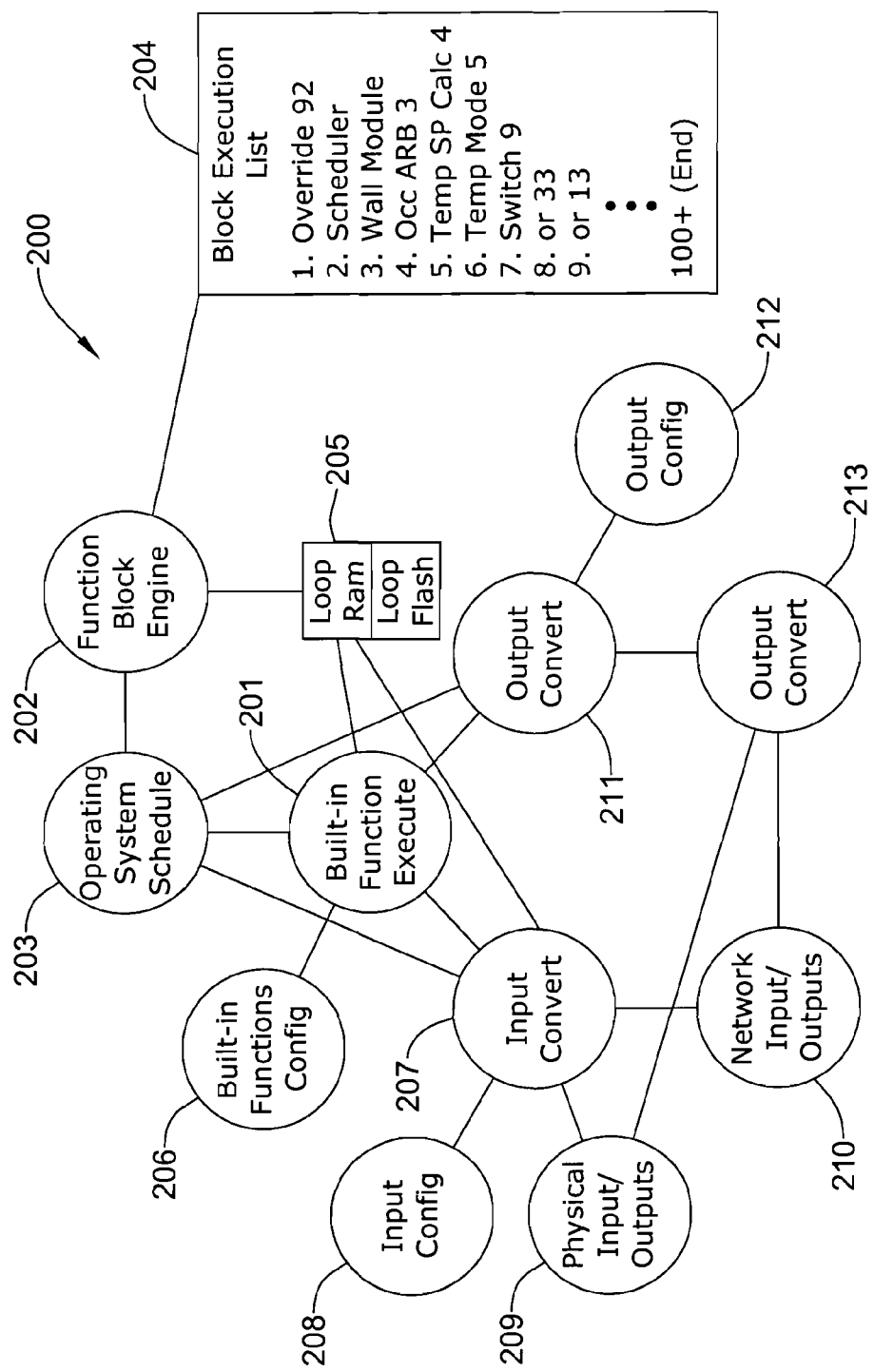
FIG. 29 is a diagram of a function block system.

FIG. 29 is a diagram of a function block system 200 which may have application to the balancing or other system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 30:
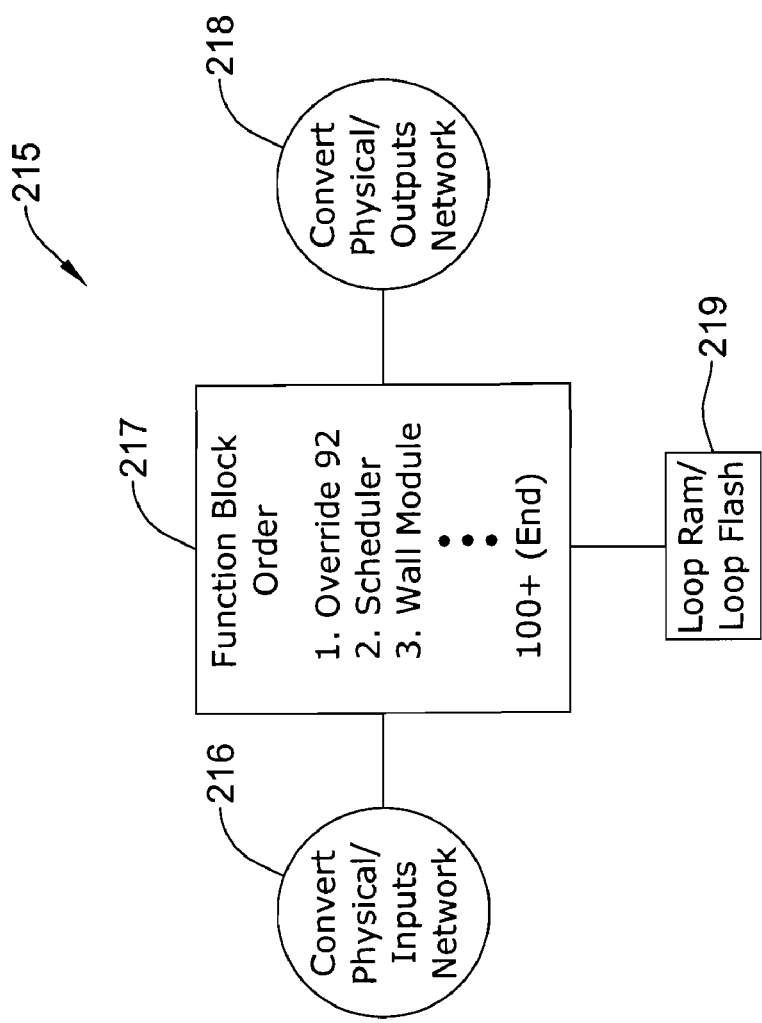
FIG. 30 is a summary variable air volume block flow diagram.

FIG. 30 is a summary VAV block flow diagram 215. A convert physical/inputs network 216 may be connected to a function block order list 217. The function block order list 217 may be connected to a convert physical/outputs network 218 and to a loop RAM/FLASH 219.

Figure 31:
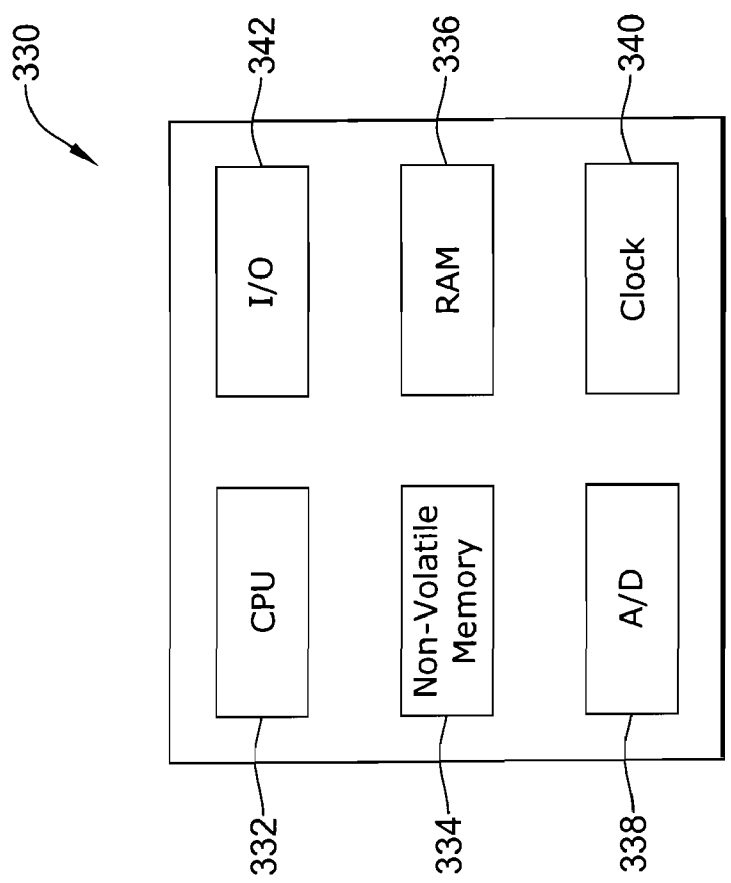
FIG. 31 is a block diagram of an illustrative programmable HVAC controller.

FIG. 31 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g., function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 32:
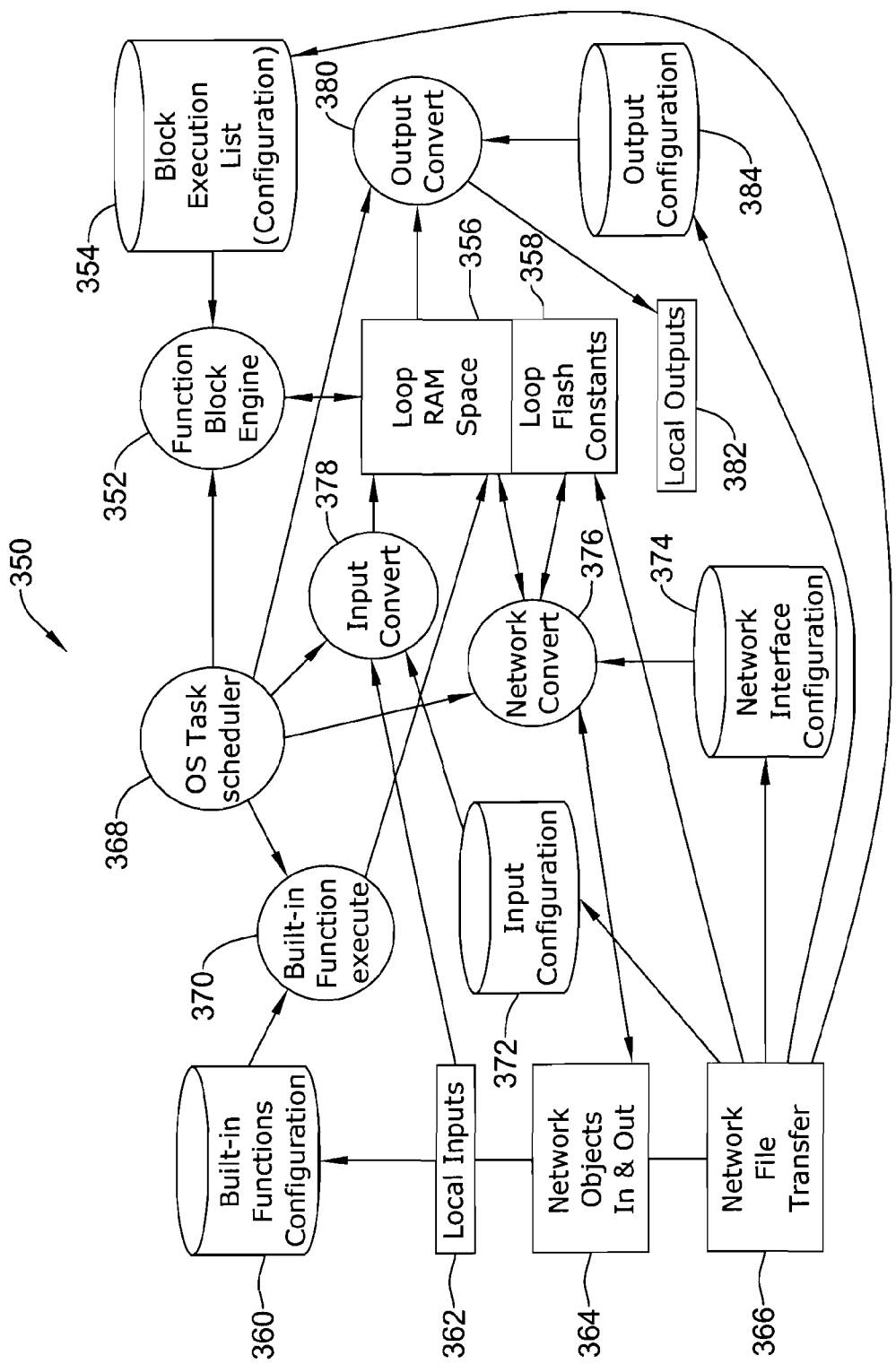
FIG. 32 is a schematic diagram of an illustrative application framework of a programmable controller.

FIG. 32 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 32, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 33:
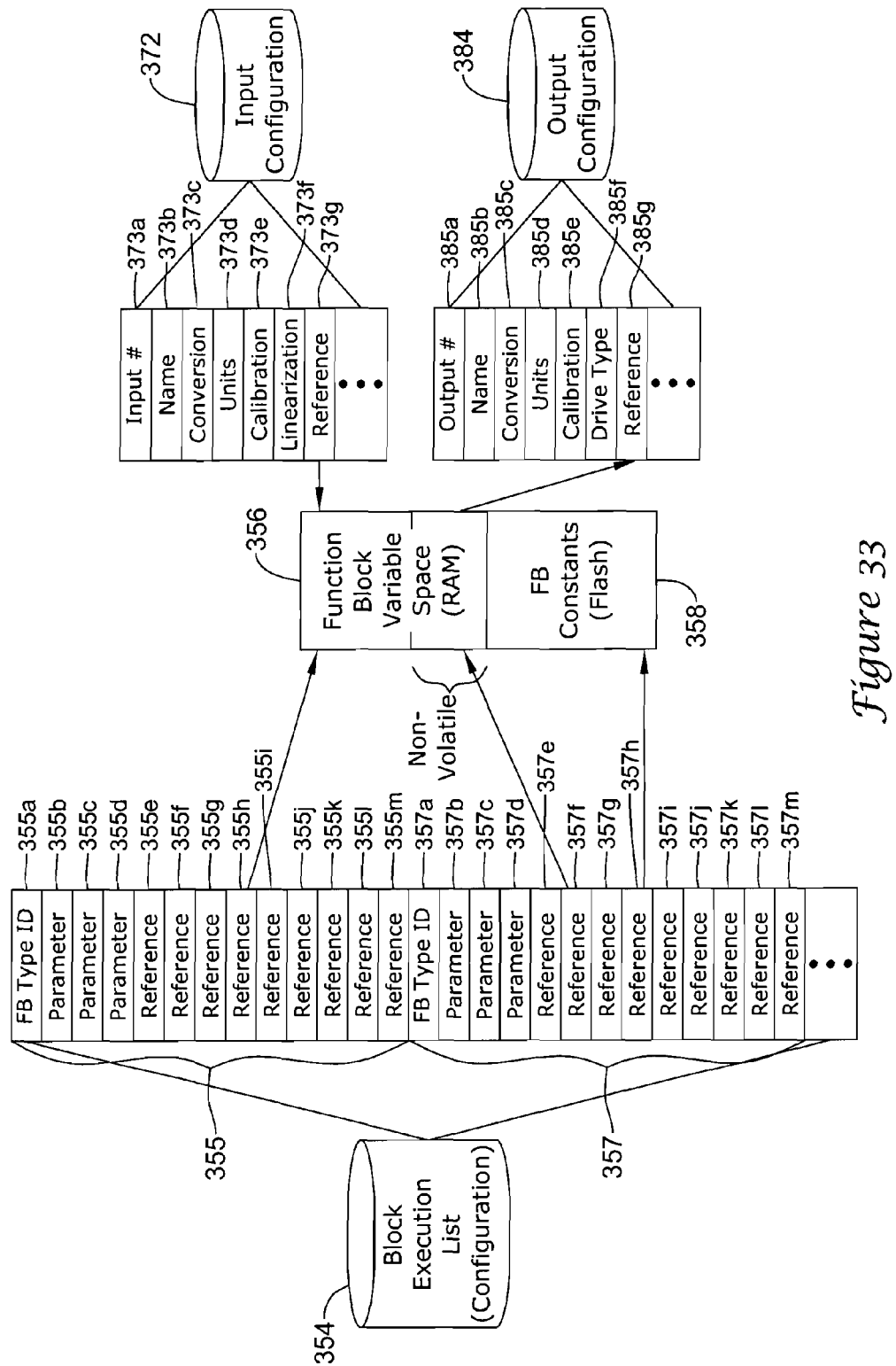
FIG. 33 is a schematic diagram of illustrative application configuration modules of FIG. 22.

FIG. 33 is a schematic diagram of some illustrative application configuration modules of FIG. 32, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values. The function block 355 and 357 can be defined according to the block execution list 354, which can be programmed by the factory, user, installer, or application designer. In the illustrative example, function blocks 355 and 357 may be classified into six categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 33, function blocks 355 and 357 may include a number of function calls or pointers to particular locations in memory. In the illustrative example, each function block 355 and 357 may include a function block type 355a and 357a, and a number of parameter or references 355b-m and 357b-m. The references and parameter 355b-m and 357b-m may point to variables or constants that are stored in the parameter and variable storage space, such as in either the function block variable space 356 or the function block constant space 358. Additionally, in some cases, the reference and parameters 355b-m and 357b-m may relate to other function block outputs, inputs (either local or network), or pointers to any other data, as desired.

In one illustrative example, each function block may be about 22 bytes long. Each function block may include the function block type 355a and 357a, which can be one byte. Each function block can also include nine references or variables 355e-m and 357e-m, each reference or variable being allocated 2 byte WORD increments, totaling 18 bytes. Also, each function block 355 and 357 may include three parameter or configurations 355b-d and 357b-d, each being one byte, totaling 3 bytes. However, these sizes are merely for illustrative purposes and it is not meant to be limiting in any way.

It is contemplated that any size function blocks 355 and 357 may be used, and/or any number or size of function block types 355a and 357a, references or variables 355e-m and 357e-m, and parameters or configurations 355b-d and 357b-d. Furthermore, it is contemplated that the order may be the function block type 355a and 357a, then one parameter 355b and 357b, then the nine references 355e-m and 357e-m, and then the two remaining parameters 355c-d and 357c-d. More generally, it is contemplated that the function blocks 355 and 357 may be configured in any order and have any number of references and parameters, as desired.

The function block type 355a and 357a may be used to specify what function the function block 355 and 357 performs. Examples of functions that function block types 355a and 357a can perform may include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355a and 357a, as desired.

Function block references 355e-m and 357e-m may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 33, there are nine different types of variables: input, parameter, input/parameter, parameter/input, output floating point number, non-volatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this should not be required.

The parameters 355b-d and 357b-d may include design time configuration information needed by the function block 355 and 357 to execute. For example, the parameters 355b-d and 357b-d may instruct a corresponding function block 355 and 357 on how to initialize itself. In the illustrative example, each function block 355 and 357 may have three parameters 355b-d and 357b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355b-d and 357b-d may be configured to apply to just one specific function block type, one specific function block instance, or multiple function blocks, depending on the application. In some cases, the parameters 355b-d and 357b-d may be stored in the function block constants storage space 358, but this should not be required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data may be lost or reset, whereas in the non-volatile PAM, upon a power disruption, the data should be retained. Thus, data that is desirable to maintain upon a power disruption may be stored in the non-volatile RAM, while other data may be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that could be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373a, name 373b, conversion 373c, units 373d, calibration 373e, linearization 373f, and references 373g. The input reference may map the input to the function block variable space 356 resident in the RAM memory. An output configuration 384 may also be provided to configure outputs that may be mapped out of the controller. The output configuration 384 may include an output number 385a, name 385b, conversion 385c, units 385d, calibration 385e, drive type 385f, and references 385g. The output reference may map data from the function block variable space 56 resident in the RAM.

Figure 34:
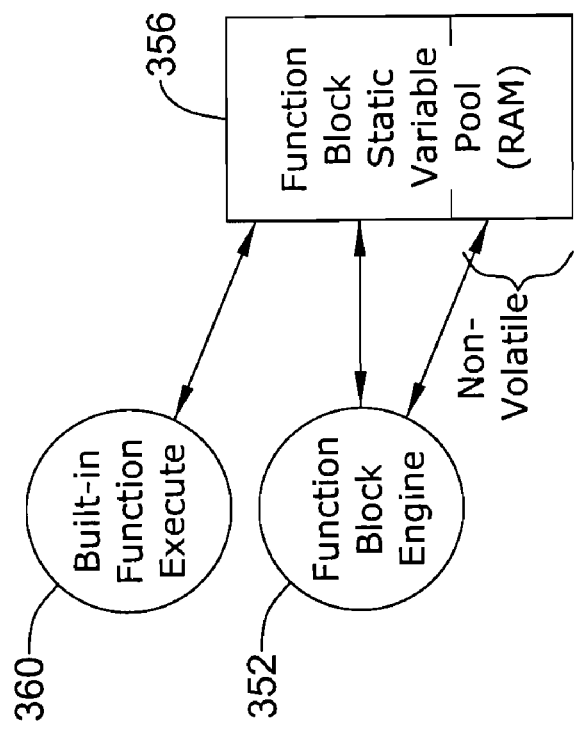
FIG. 34 is a schematic diagram of one or more execution modules of FIG. 32 including a function block engine.

FIG. 34 is a schematic diagram of the illustrative one or more execution modules of FIG. 32 including the function block engine 352. As discussed previously, the function block engine 352 may be resident in the non-volatile memory of the microcontroller, more specifically, in the firmware portion of the non-volatile memory. The function block engine 352 may include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially may execute each function block that the application designer has configured in the block execution list. In some cases, the inputs to the function blocks may be referenced from the function block variable pool 356 that may be resident in RAM. In some cases, there may only be a small stack space in the function block variable pool 356, which could be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks may be unaware that an input to a function block came from a physical input, a network input, a parameter, or as an output from another function block. The input from the built-in function execute block 360 may be stored in the function block variable pool 356, in some cases only temporarily, for use by the function block engine 352.

The following is an approach for a balancing procedure for a configuration tool that may be used. First is a k factor method with the following steps: 1) Set nviFlowoverride from HVO_OFF_NORMAL (0) to HVO_Maximum (7); 2) Read nciMaxFlowCoolSP and nvoBoxFlowCool and compare; wait until the nvoBoxFlowCool is within 0.5% of the nciMaxFlowCoolSP; look at nvoCmdCoolDmpPos and monitor until changes stops for 5 seconds or direction changes; 3) Read nvoBoxFlowCool and nvoCmdCoolDmpPos for stability; average nvoVelSenPressC reading over a 5 sample window after stability is reached; if the Flow is unstable, ask the user, "Would you like to balance anyway?" 4) Display apparent flow (nvoBoxFlowCool) and Display Current K Factor nciKFactorCool; show the new calculated K Factor based on the equation below and ask user to proceed with new calculated K factor; (K Factor) nciKFactorCool=(user entered measured Box Flow)/sqrt([5 sample average of nvoVelSenPressC]− nvoPressOffsetC); and 5) Set nviFlowoverride from HVO_Maximum (7) to HVO_OFF_NORMAL (0); (optional) check minimum flow if desired.

Next is a min/max method with the following steps: 1) Set nviFlowoverride from HVO_OFF_NORMAL (0) to HVO_Maximum (7); 2) Read nciMaxFlowCoolSP and nvoBoxFlowCool and compare; wait until they are within control range of algorithm; look at nvoCmdCoolDmpPos and monitor until changes stops for 5 seconds or direction changes; 3) Read nvoBoxFlowCool and nvoCmdCoolDmpPos for stability; average nvoVelSenPressC readings over a 5 sample window after stability is reached; if the Flow is unstable, ask the user "Would you like to balance anyway?" 4) Display apparent flow (nvoBoxFlowCool) and request input for actual max flow; enter in value in nciMeasMaxFlowC; 5) Set nviFlowoverride from HVO_OFF_NORMAL (0) to HVO_Minimum (7); 6) Read nciOccMinFlowCSP and nvoBoxFlowCool and compare; wait until they are within control range of algorithm; look at nvoCmdCoolDmpPos and monitor until changes stops for 5 seconds or direction changes; if the Flow is unstable, ask the user "Would you like to balance anyway?" 7) Read nvoBoxFlowCool and nvoCmdCoolDmpPos for stability; average readings over a 5 sample window after stability is reached; if the Flow is unstable, ask the user, "Would you like to balance anyway?" 8) Display apparent flow (nvoBoxFlowCool) and request input for actual min flow; enter in value in nciMeasMinFlowC; and 9) Set nviFlowOverride from HVO_Minimum (7) to HVO_OFF_NORMAL (0).

The following presents a simple work bench arrangement of the required hardware and the associated wiring connections to configure Excel™ 10 W775D, F Controllers (by Honeywell International Inc.). One may proceed as in the following: 1) With power disconnected to the housing subbase, insert the controller circuit board (contained in the housing cover) into the subbase unit; 2) Apply power to the controller, and insert the Serial Interface cable into the jack on either the Excel 10 W7751D or F Controllers; 3) Use the CARE/E-Vision™ PC tools to configure the controller (See the CARE E-Vision™ User's Guides, forms 74-5587 and 74-2588, for further details), use the ID number sticker on the controller or press the bypass button on the wall module; 4) When configuration is completed, power down and remove the W7751D, F from the subbase, mark the controller with the Plant name or location reference so the installer knows where to install each controller in the building; 5) Repeat with next W7751D, F to be configured; and 6) The data file used for this configuration should be used at the job site so the commissioning data matches the controllers.

One may do configuring in the field. If the controllers were installed at the site, the procedure to assign the node numbers to the Excel™ 10 VAV Controller may be as in the following: 1) Instruct the installer to remove the ID sticker from each controller during installation and to affix it to either the job blueprint at the appropriate location or to a tabulated list, be sure the installer returns these prints to the application engineer after the controllers are installed; 2) Connect to the E-Bus with the CARE™ PC tool; and 3) Proceed to configure the W7751 (using the job prints for location reference for the controllers) by following the standard CARE™ procedures.

One may configure a Zone Manager.

The Q7750A Excel™ 10 Zone Manager may send out a one-time LonWorks™ message containing its 48-bit Neuron™ ID after any power-up WARMSTART™ or when the Excel™ 10 Zone Manager is reset by pressing the reset button. It may be important to note that pressing the reset button on the Excel™ 10 Zone Manager may cause all application files in the Q7751, including the C-Bus setup, to be lost. The LonWorks™ message is sent out one time and only on the E-Bus, not on the B-Port. The message may be the same as the one generated after pressing the service pin pushbutton available on Excel™ 10 VAV Controllers and also via the wall module bypass pushbutton. The CARE™ commission tool (E-Vision) can use this message to assign the node address.

The Assign ID procedure is the same as for an Excel™ 10 VAV Controller except, instead of pressing the bypass button, the reset button should be pressed or the power must be cycled (down then up) on the Q7750A Excel™ 10 Zone Manager.

The following is pertinent to Sensor Calibration. The space temperature and the optional resistive inputs may be calibrated. The wall module setpoint potentiometer can not necessarily be calibrated. One may perform the sensor calibration by adding an offset value (either positive or negative) to the sensed value using E-Vision™ menus (see E-Vision™ user's guide, form number 74-2588).

The following may be used in Air Flow Balancing for Pressure Independent applications. In addition to the ten point Flow Pickup Calibration Table, the Excel™ 10 VAV Controller may provide for 3-point (Maximum, Minimum, and Zero) Air Flow Calibration. This may allow the box to be adjusted so it can be certified that the box provides the flow rates specified by the consulting engineer. When balancing is complete, the actual flow from a box should be within 5 to 10 percent of the indicated air flow (as shown on the E-Vision™ screen). On may note that there are many sources of error in flow-hood measurements. Flow hood meters may typically attain accuracy to within plus or minus three to five percent of full flow. The error can be due to the device being out of calibration, or that it was last calibrated with a different style of diffuser. Even the operator technique may play a role in obtaining repeatable, accurate flow readings. When working with slotted diffusers, one should not use a hood, but rather use a velocity-probe type of instrument.

One may follow the diffuser manufacturer's recommendation for a procedure of how to best measure the air flow through their products. Prior to air flow balancing for the first time, perform a zero flow calibration procedure. To do so, power the Excel™ 10 VAV Controller for one hour or more before performing the procedure. Select the controller being worked on with E-Vision™ (see the E-Vision™ User's Guide, form 74-2588, for general details on using E-Vision). Due to inconsistencies in VGA display cards and modes, be sure to maximize the E-Vision™ window on the screen (by clicking the up-arrow at the top-right corner of the E-Vision™ window). This assures that all E-Vision activities are user viewable. Refer to the Air Flow balancing section in the E-Vision™ user's Guide form, 74-2588 for the exact procedure. As to resetting Air Flow Calibration to Factory Defaults, one may refer to the Air Flow Balancing section in the E-Vision™ user's Guide form, 74-2588 for the exact procedure.

A VAV Zeroing Procedure may include the following): 1) Manually command Damper to Closed Position; 2) Read nvoCmdCoolDmpPos until it has closed (See step 3 in K factor Balancing Procedure); 3) Command nviAutoOffsetC to true; 4) Command nviAutoOffsetC to false; and 5) Observe nvoPressOC has changed.

Figure 35:
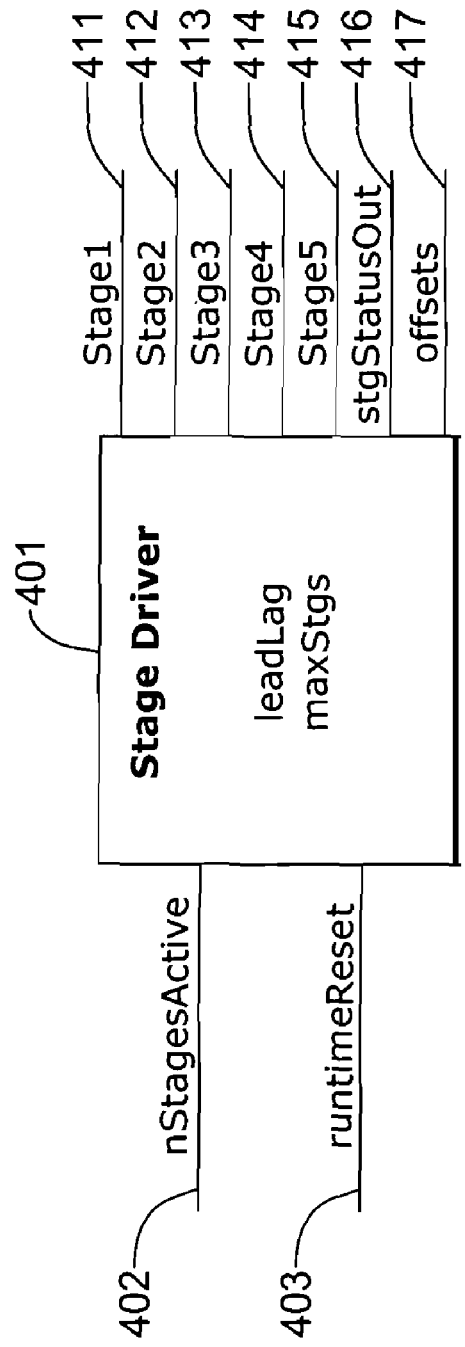
FIG. 35 is a diagram of a stage driver.

The present function block engine may have a stage driver 401 (StageDriver), as shown in FIG. 35. The StageDriverMaster function may take input number of stages active and determine which stages to energize or de-energize based on the lead/lag strategy chosen. StageDriver may work with StageDriverAdd to distribute additional stages above those provided in StageDriver. StageDriver may also maintain a nonvolatile runtime total and digital stage status information for each stage.

The configuration tool may set a runtime and stage stages offset in a single offsets variable. The offsets variable is not necessarily used as a Public Variable ID. The lower byte may store the offset in digital memory to reference the starting stage status memory index, and the upper byte may store the offset in nonvolatile memory to reference the starting runtime memory index. The stgStatusOut may be the offset to digital stage status that is used by connected StageDriverAdd blocks.

As more stages are set up during design, the configuration tool may calculate the starting address for both stage status and runtime and allocate the memory and calculate the offset from the base index that is the starting address for the runtime area and the stage status area in their respective memories.

The runtime area may be stored in non volatile floats (4 bytes). The stage status area may use a digital byte (1 bytes) so 8 bits or 1 byte of information storage is used for each 8 stages assigned. The tool should assign a 1-byte extra buffer to ensure correct stage driver add functionality.

The stage status information may be accessible to drive additional stages. Additional StageDriverAdd function blocks may be use to drive stages above those provided in StageDriver up to 255 stages.

The StageDriver RAM structure may be defined as:

```
IN_ONLY         nStgActive;
IN_ONLY         rantimeReset;
OUT_DIG stage1;OUT_DIG stage2;OUT_DIG stage3;
OUT_DIG stage4;OUT_DIGstage5;
OUT_FLT         stgStatusOut;
OUT_FLT_SAV     offsets;
```

The parameters may include:

```
UBYTE   leadLag;   //lead/lag type
UBYTE   maxStgs;   //maximum number of stages
The StageDriverLoopStatic structure is defined as:
UINT16 old_seconds; UINT16 oldnumstages;
UINT16 seqEndPtr; UINT16 seqStartPtr
```

From iteration to iteration, the Function Block keeps track of theses items. On power up/reset these are cleared. The memory index for Stage Status and Stage runtimer is calculated as follows.

```
//baseStageStatus = VID_ControlDigitalBase + offsetStageStatus;
//baseStageRuntimer= VID_ControlNonVolatileBase +
offsetStageRuntimer;
``` where offsetStageStatus is the lower byte of offsets and offsetStageRuntime is the upper byte of offsets.

The Inputs may include the following. The nStagesActive (IN_ONLY) is the input number of stages to be distributed to on/off values to individual stages.

The runtimeReset (IN_ONLY) is the stage number runtime to be reset to 0 if the lead-lag parameter is set to LL_RUNTIME. 0 or unconnected will result in no reset occurring. This value must be returned to 0 to allow the reset stage number to resume counting. It might only be valid if leadLag set to LL_RUNTIME. The stage runtime values may be only allocated and updated if the leadLag config is set to LL_RUNTIME. The runtime for each stage may be stored as a floating point number in intervals of 1 minute. The stages may be sampled once a minute and if the stage is on, then the stage runtime accumulator number for that stage can be incremented by one minute. The range of values for an integer number stored as a float, may be from −16,777,216 to 16,777,216. If the runtime is stored in minutes starting at 0 to 16,777,216, then the range of runtime may be from 0 to 31.92 years of runtime.

The Outputs may include the following. Stage1, stage2, stage3, stage4, and stage5 (OUT_DIG) can be individual outputs that represent on or off values. These are outputs that may be turned on in different order depending on the leadLag strategy.

The stgStatusOut (OUT_FLT) may be connected from StageDriver to the StageDriverAdd block and give a floating point number combined to hold two pieces of information, which are an offset in the Common Memory to the StageBit-Status values and maximum number of stages available. This information may be used by the StageDriverAdd to find the correct offset to command which stages to turn on or off. The floating value may be converted to an integer and ANDed with 0xFF, and may give the value of the stageStatus Offset. The floating value stgStatusOut converted to an integer and right shifted 8 bits may give the byte value of the maxStages. These values may be needed to allow the StageDriverAdd to work properly. The values in stgStatusOut may be created by the StageDriver stage and no tool calculation is required.

The Offsets (OUT_FLT_SAV) may be noted. One may Store the public Variable ID to a float a value created by the tool to allocate storage memory and reference for stage status in digital memory and stage runtime in nonvolatile memory. There may be two offsets stored inside the float value, one for runtime, and one for stage status. The offset float value right shifted 8 bits may give the number of nonvolatile float values from the beginning nonvolatile index (offset) where the runtime values are stored (one runtime value offset for each stage configured), and the offset ANDED with 0xff may give the number of digital values from the base where the stagestatus is stored (one byte per up to 8 stages configured). Each digital memory location may take up 1 byte storage in calculating the offset.

For example, if 3 nonvolatiles were already assigned and 4 digital outputs were already assigned before adding a stagedriver stage of 9 stages with runtime accumulation, then the offset float value may be 256*3+4=772.0. That means the tool may have 8 nonvolatile runtime locations starting at offset 3 from the base of nonvolatile memory and the tool may allocate digital memory of two bytes for the stage status starting at offset of 4 from the base of digital memory. The tool may set this float value for offsets and allocate the memory, and then stagedriver may use this information to know where to look for stagestatus and stage runtime information. This value should not be displayed to the end user.

The Float value that stores Offsets may be composed of two values. The offsetStageRuntimer (byte) may be float value converted to an integer and shifted 8 bits—specifies the variable quantity offset to be applied to the beginning of nonvolatile memory variable number that indicates the starting variable number used to store the individual stage runtime values. This number may be calculated by the configuration tool and is not necessarily changeable.

The offsetStageStatus (byte) may be float value converted to an integer and ANDed with 0xFF—may specify the variable number offset to be applied to the beginning of digital memory area that indicates the starting variable number used to store the individual stage on/off values. This number may be calculated by the configuration tool and is not necessarily changeable. This value may be exported to other stages through the stageBitStatus output.

The parameters may be the following. The leadLag (Byte param:UBYTE) may specify whether the staging strategy should be first on last off (LL_STD=0—standard), first on first off (LL_FOFO=1—Rotating), run time accumulation where next on is lowest runtime and next off has highest runtime (LL_RUNTEQ=2—Runtime Accumulation). Runtime Accumulation selection may require the tool to allocate Nonvolatile memory and Set the Offsets value. For example, in a boiler control system configured for a maximum number of stages of 4, LL_STD may take the number of stages active and activate the stages in the following order: stage 1 on, then stage1 and stage 2 on, then stage 1 on stage2 on stage3 on, then stage 1 on stage2 on stage3 on and stage 4 on. When one stage is removed then it will be stage 1 on stage 2 on stage 3 on. If one more stage is removed then it may be stage 1 on stage 2 on. If one more stage is removed then stage 1 on, and finally if one more stage is removed then there may be only one stage on. And finally if one more stage is removed then no stages are necessarily on. Stage 1 may always come on first and always be the last stage to turn off. If one takes this same example and implements as a LL_FOFO which is rotating or First on first off, then the boiler may keep track of where the starting stage is from the last cycle. Say, for example, there are no stages on and a stage is added. Then adding one stage will turn on stage1. If another stage is added, then stage1 is on and stage2 is on. If one more stage is added then stage1 is on, stage2 is on and stage 3 is on. Now one may say that the number of stages goes from 3 to 2 so now it is time to remove a stage. Because of LL_FOFO, the first stage one turned on may be the first stage to turn off so stage 1 would go off and only stage 2 and stage 3 would be on. Then, if one were to turn off one more stage, stage 2 would go off and only stage 3 would be on. Now if one added one more stage, stage 4 would turn on in addition to stage 3. If One more stage were added (numstages=3), then stage 3 is on, stage 4 is on, and now stage 1 may turn on too. For a final example, one may take the example of LL_RUNTEQ for a sequence. Each stage may now have a runtime accumulation in minutes. So one may assume that the 4 stages turn on for 12 minutes. Each stage for stage1, stage2, stage3, and stage 4 may be on and accumulate 12 minutes of runtime. Now it may be time to turn off one stage so all the "ON" stages are evaluated for the highest runtime and since they may be all the same; the last stage that is on that is evaluated may have the highest runtime so stage 4 is turned off so stage 1 on stage2 on and stage3=on. Now one may run the boilers for 2 more minutes. Now stage 1 has 14 minutes runtime, stage 2 has 14 minutes runtime, stage 3 has 14 minutes runtime, and stage 4 has 12 minutes runtime. Now the number of stages requested may drop to 2 stages so stage 3 is turned off and now stage 1 on, stage 2 on, stage 3 off, and stage 4 off. So now the boilers may be run for 2 more minutes. The runtimes may now be stage 1 on=16 minutes, stage 2 on=16 minutes, stage 3=off=14 minutes, and stage 4=off=12 minutes. Now one may add one more stage so number of stages goes from 2 to 3. Now all the stages that are off may be evaluated for lowest runtime. Stage 4 may have the lowest runtime of 12 minutes so now stage 4 is turned on.

The maxStages (Byte param:UBYTE) may specify how many total stages nStagesActive can reach. MaxStages can go up to a total of 255 stages.

The Common Memory Resources (not accessible by user but accessible by function block) may include the following. The stageRunTimer may be (STATIC_FL) per individual stage*number of stages. If stagingType=RUNTEQ, then individual stages runtimes values may be stored in nonvolatile memory. This memory may be allocated by the configuration tool. The runtimes for each stage may represent the accumulated ON time in hours and be stored in this separate area of nonvolatile STATIC_FL variable memory. The public variable ID for this block of timers may be designated by the tool. The Parameter runtimeMemOffset may specify the variable number offset to the starting STATIC_FL memory to access this block. The total number of bytes allocated in Common memory may be maxStages time 4 bytes (STATIC_FL), so for 10 stages it would be 10 floats or 40 bytes. Each runtime value may be stored as a FLOAT and is sequentially stored starting with RuntimeStage1.

The stageStatus (UBYTE per 8 stages) may be a set of digital memory variable allocated by the configuration tool. The total number of bytes allocated in this stageStatus memory area may be the rounded up value of maxStages divided by 8, plus 8 bits so 18 stages would require 26 bits or 4 bytes rounded up. The stageStatus memory area may be accessed by both StageDriver and StageDriverFollower to determine if a particular stage should be on.

As noted herein, FIG. 35 is a block diagram of the stage driver (StageDriver) 401 with leadlag maxStgs. It may have inputs nStagesActive 402 and runtimeReset 403. The stage outputs may include Stage1 411, Stage2 412, Stage3 413, Stage4 414 and Stage5 415. Other outputs may include stgStatusOut 416 and offsets 417.

Figure 36:
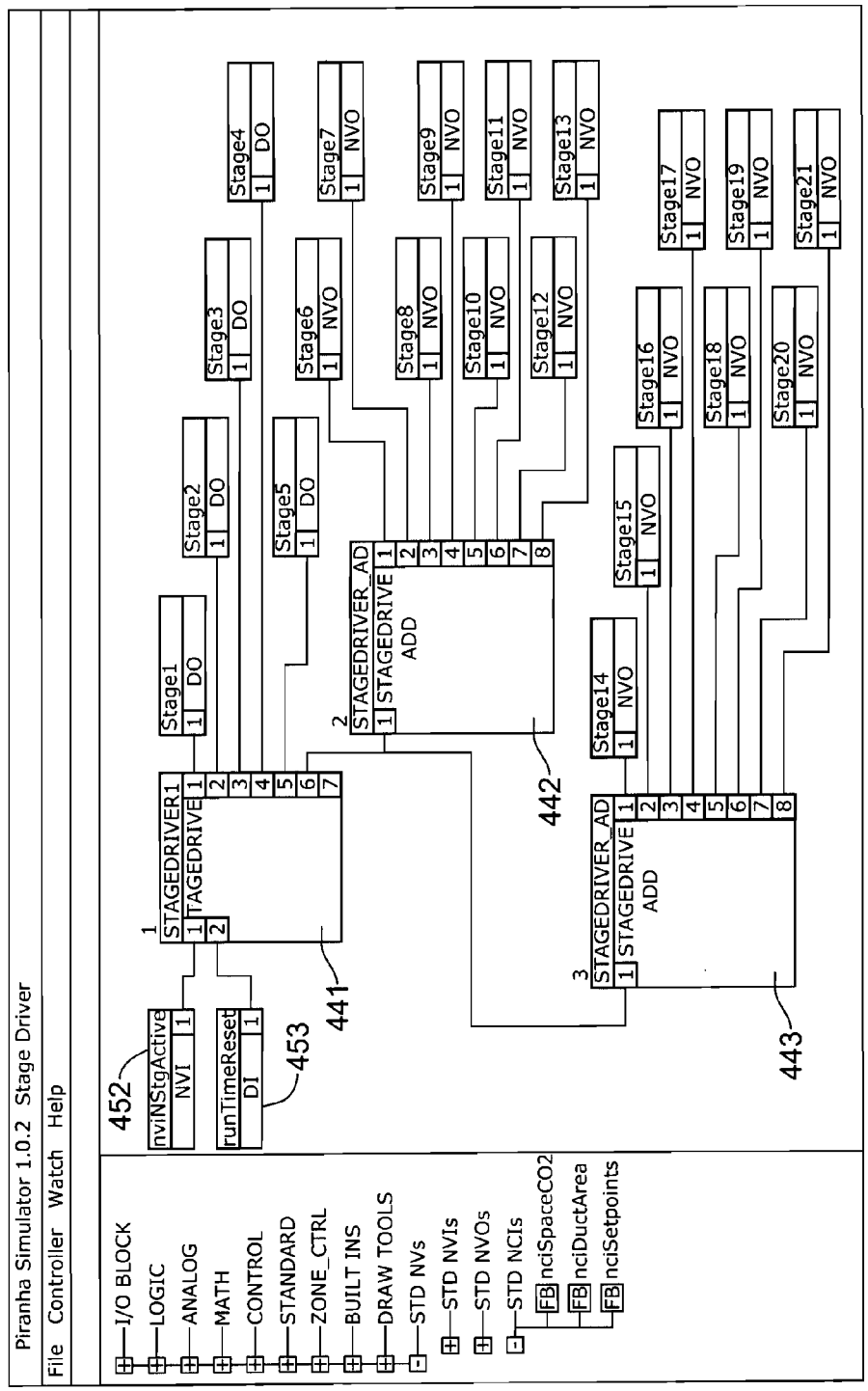
FIG. 36 is a diagram of a function block arrangement for the stage driver.

FIG. 36 is a diagram of a stage driver system 418. In the Stagedriver block 441, nvinStgActive may be an input 452 that requests the number of stages to turn on. nviTimeReset may be an input 453 used to reset the individual stage runtimes. A selection for the Stagedriver algorithm may allow the choice of Standard, First On/First Off (Rotating), and Runtime equalization. StageDriver Block 1 (441) may have individual stages outputs 1-5 on outputs labeled number 1-5. The Maximum stage parameter may be set to 21 stages. Output 6 may be stgStatusOut and be used to communicate the base memory location for the individual stage status (on/off) memory and also the maximum number of stages.

The algorithm for the StageDriver block 441 may determine which stages should be added or deleted based on the Standard, First on/First off, and runtime equalization selection. The StageDriver block may store the results of the individual stages in the stage status memory location, using 1 bit per stage. Individual Stage Driving block such as StageDriver or Stagedriver add may access the individual bit status from the stage status memory location. In the case of Runtime equalization, there may be a separate nonvolatile memory area that is used by the algorithm in the StageDriver block that stores the runtime total. Individual runtimes may be reset by using the reset input.

StageDriverAdd Block 2 (442) may take the StgStatusOut information and the starting stage number for this stage (set to 6 in this example) and give individual outputs for stages 6-13. StageDriverAdd Block 3 (443) may take the StgStatusOut information and the starting stage number for this stage (set to 14 in this example) and give individual outputs for stages 14-21.

FIG. 37 is a table 431 of analog inputs for stage driver 401. It shows the input name, Cfg, a low and high of the range, the input value and the description for each input. FIG. 38 is a table 432 of analog outputs of stage driver 401. It shows the output name, Cfg, a low and high of the range, and the description for each output.

Aspects of the configuration may include the following. The user may specify the maximum number of stages (maxStgs) from 1 to 255. The user may specify the lead lag (leadlag): LL_STD=0—first on last off. LL_FOFO=1—first on first off. LL_RUNEQ=2—runtime equalization for lowest runtime. If the leadlag is outside of the range of 0-2 then Stages may be initialized to off and not commanded.

Figure 39:
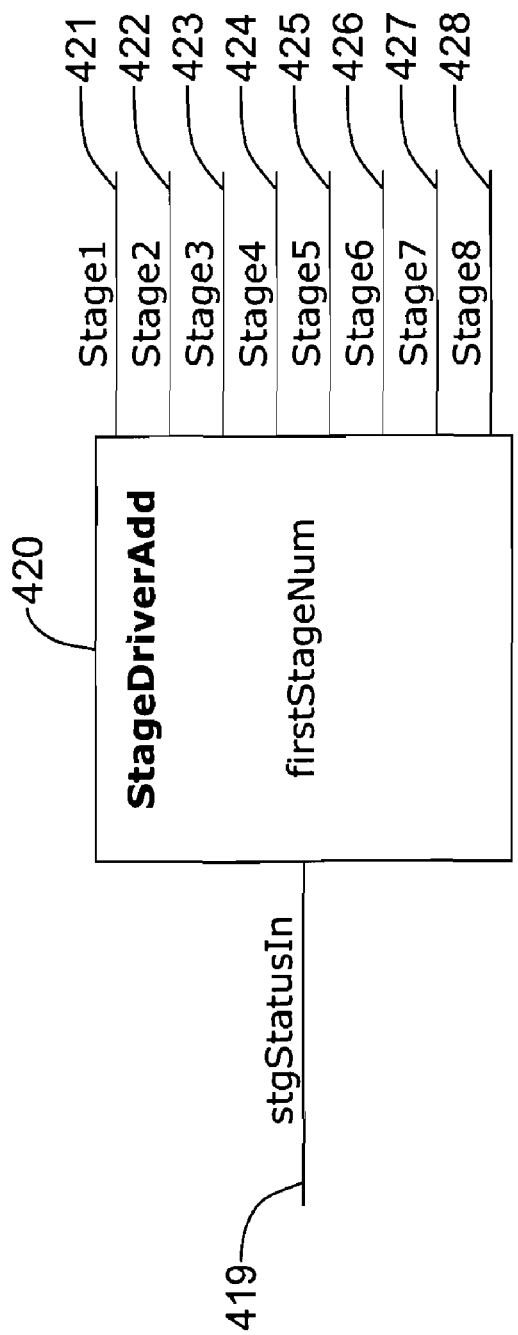
FIG. 39 is a diagram of a stage driver addition.

The stage driver addition (StageDriverAdd) 420 may be noted in FIG. 39. An input (stgStatusIn) 419 may go to the stage driver addition (firstStageNum). The outputs of block 420 may include Stage1 421, Stage2 422, Stage3 423, Stage4 424, Stage5 425, Stage6 426, Stage7 427 and Stage8 428.

The StageDriverAdd function may take input command from StageDriver and determine which stages to energize or de-energize based on the lead/lag strategy chosen. StageDriverAdd may work with StageDriver to distribute stages. For example, if StageDriver controls stage 1-6, then the first connection to StageDriverAdd may be configured to handle stages 7-14 and the second StageDriverAdd may be configured to handle stages 15-22.

Inputs may be noted. The stgStatusIn (IN_ONLY) may be the float value to be distributed to on/off values to individual stages. This input should come from the output of the StageDriver. The float should first be converted to a two byte unsigned integer. The upper byte (value right shifted 8 bits) may give the maximum number of stages used, and the lower byte (value times 0xff) may give the offset of number of digital values to the start of the stage status location.

Parameters may include the following. The firstStageNum (BYTE_PARAM) may be the starting stage number of this block. For example if StageDriverMaster commands stages 1-5, then firstStageNum for the next connected StageDriverFollower would be 6. The default value of the first StageDriveAdd Block's parameter firstStageNum should be 6. It is possible to have the first stage number in the StageDriverAdd overlap the stages controlled by StageDriver. For example, by setting firstStageNum to 1 on A StageDriverAdd may duplicate the stage 1-5 functionality of StageDriver.

Outputs may include the following items. Stage1, stage2, stage3, stage4, stage5, stage6, stage7, and stage8 (OUT_DIG) may be individual outputs that represent on or off values. These may be outputs that are turned on in different order depending on the leadLag strategy. FIG. 40 is a table 433 of the analog input. The table shows the input name, Cfg, the low and high of the range, the input value and description of the input. FIG. 41 is a table 434 of the analog outputs. The table may show the output name, Cfg, the low and high of the range, and a description of the output. An aspect of the configuration (Cfg) may be noted in that the user may specify the First Stage number (firstStageNum) from 1 to 255.

Figure 42:
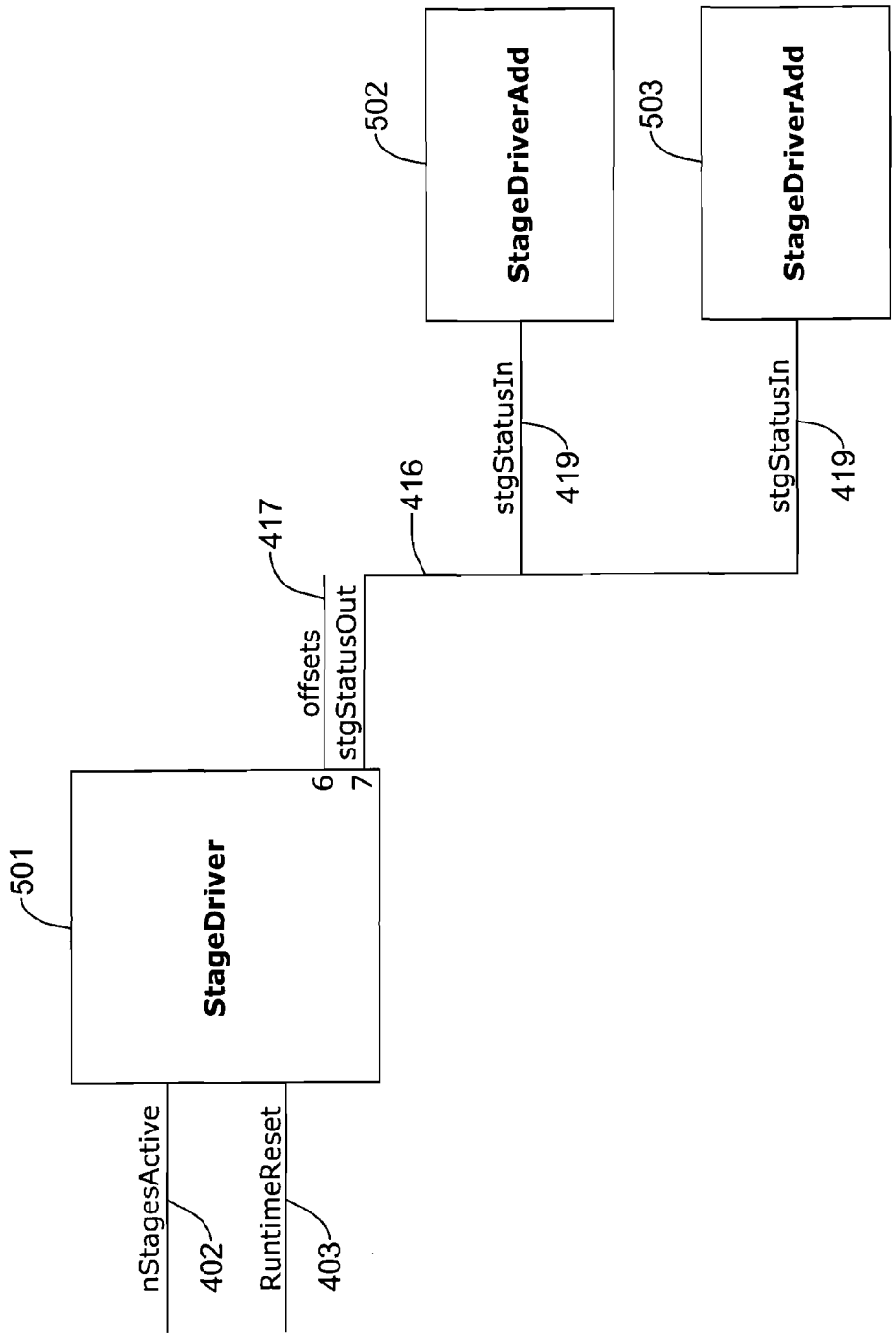
FIG. 42 shows a stage driver with several stage drivers adds.

FIG. 42 shows a stage driver 501 with outputs to at least two stage driver add blocks 502 and 503. Inputs to driver 501 may include n stages active and runtime reset. Driver 501 may include tool sets offsets with offset stage status and offset stage run timer. The outputs may include offsets. Another output may include stgStatusOut which may be inputs to stage driver add blocks 502 and 503. The stgStatusOut may equal maxStgs×256+offset Stage Status.

Figure 49:
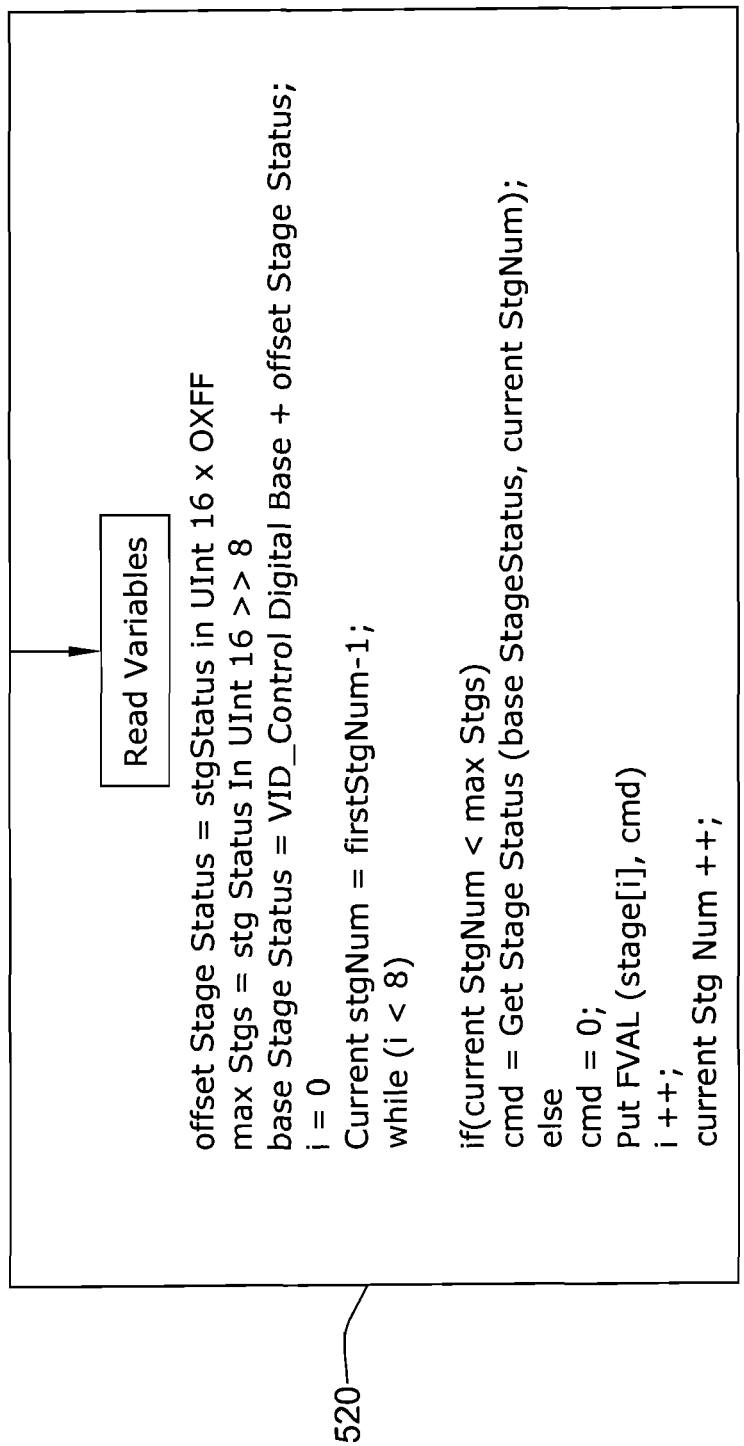
FIG. 49 is a diagram of the stage driver add.
Figure 50:
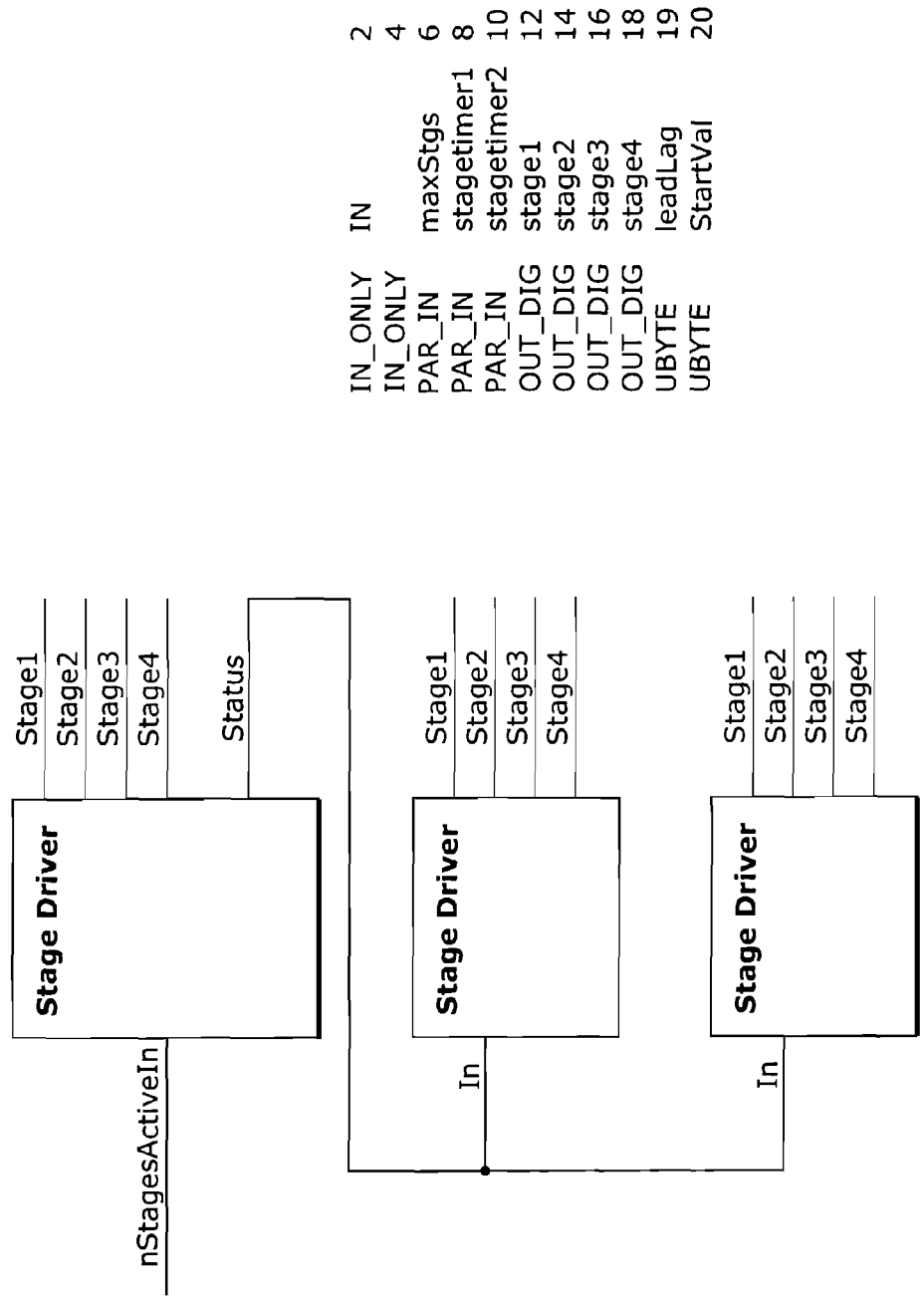
Figure 51:
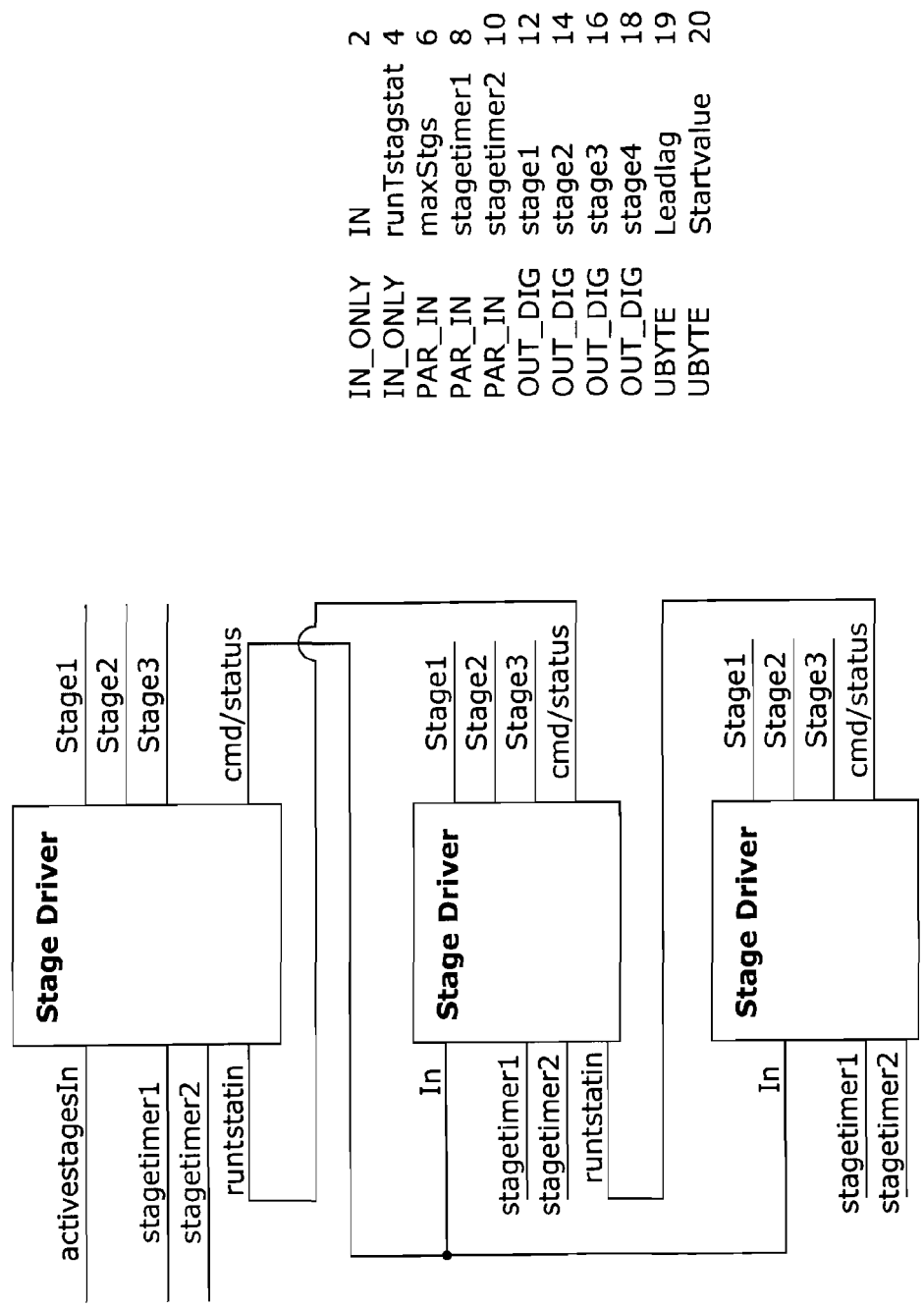

A block diagram of a stage driver is shown in FIGS. 43, 44, 45, 46, 47 and 48, sequentially. These Figures reveal a series of items 511, 512, 513, 514, 515, 516, 517, 518 and 519, in a serial fashion. The "no" line 545 may connect item 514 to item 516. FIG. 49 is a diagram of the stage driver add with an item 520.

FIGS. 43-49 show the components of the Stage Driver and StageDriverAdd algorithm. FIGS. 43-48 show the StageDriver routine, and FIG. 49 shows the StageDriverAdd algorithm.

Figure 43:
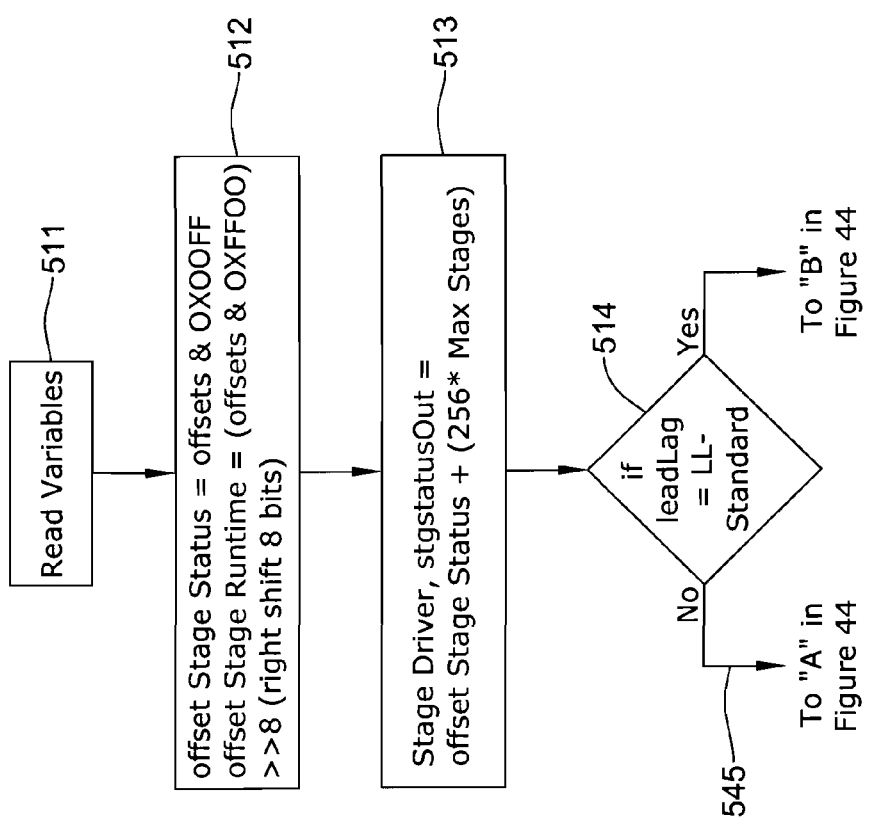

In FIG. 43, the StageDriver algorithm may start with the individual StageStatus and Stage Runtime Information pieces may be extracted from the offsets variable. The value in the offsets variable may be assigned by the configuration tool at design time. The stgStatusOut value used by other StageDriverAddStages may be combined from the MaxStage parameter and the OffsetStageStatus derived from the previous calculation.

Figure 44:
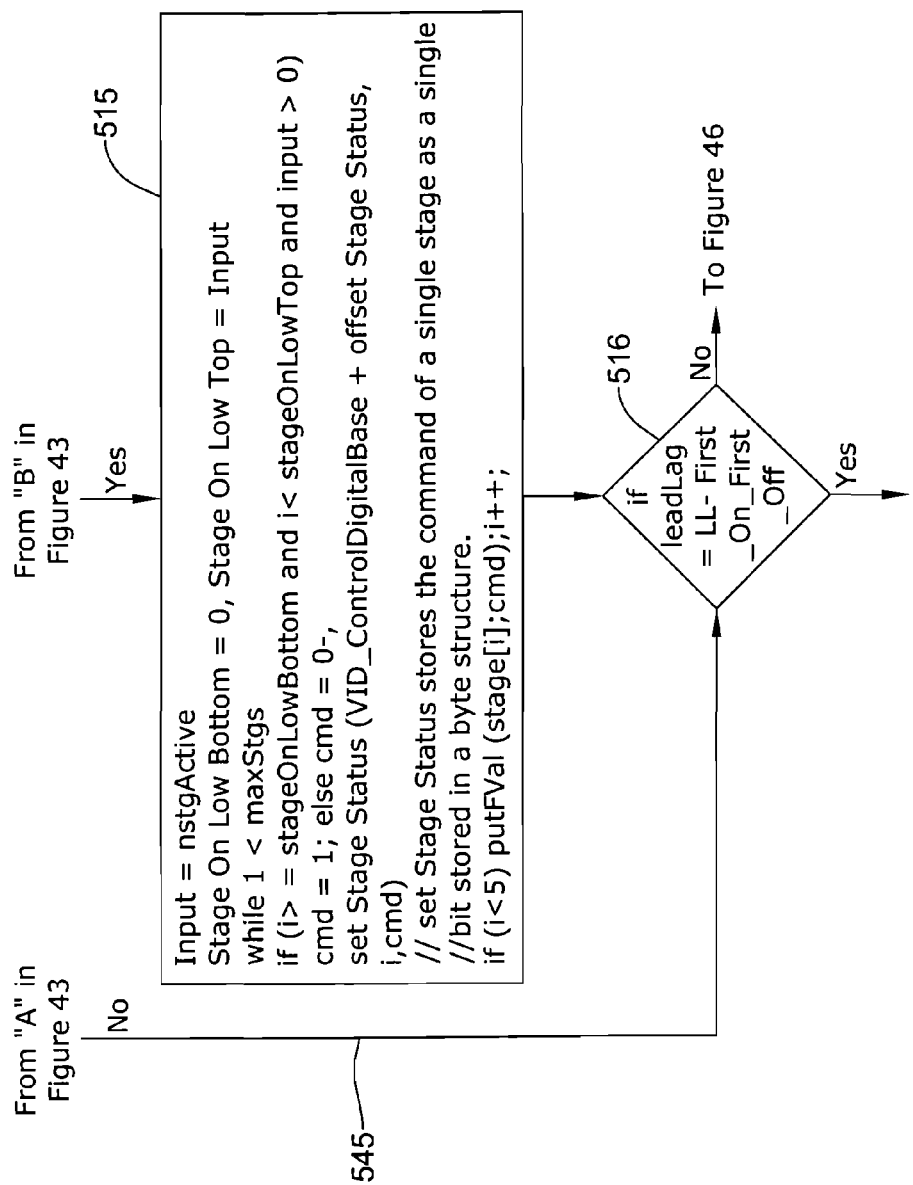

FIG. 44 shows the standard Lead/lag procedure which turns on stages up to the input number of stages and leaves the rest off. The actual on/off commands may be stored in the stage status memory location with one stage stored per bit. The function SetStageStatus may have the offset, stagenumber (i), and command (cmd) called for each stage. Additionally, if the value of the stages is from 1 to 5, the individual stage may be commanded to the command value stored from the previous step.

FIG. 45 shows the First on/first off (rotating) algorithm. An individual Start Pointer (SeqStartPtr) may be used to keep track of the first stage beginning point and as stages are added, the sequence End Pointer (seqEndPtr) may go up and as stages are deleted the SeqStartPtr may go up. The Stages between SeqStartPtr and SeqEndPtr may be on, and there may be wrap around behavior based on the maximum stages requested.

Figure 46:
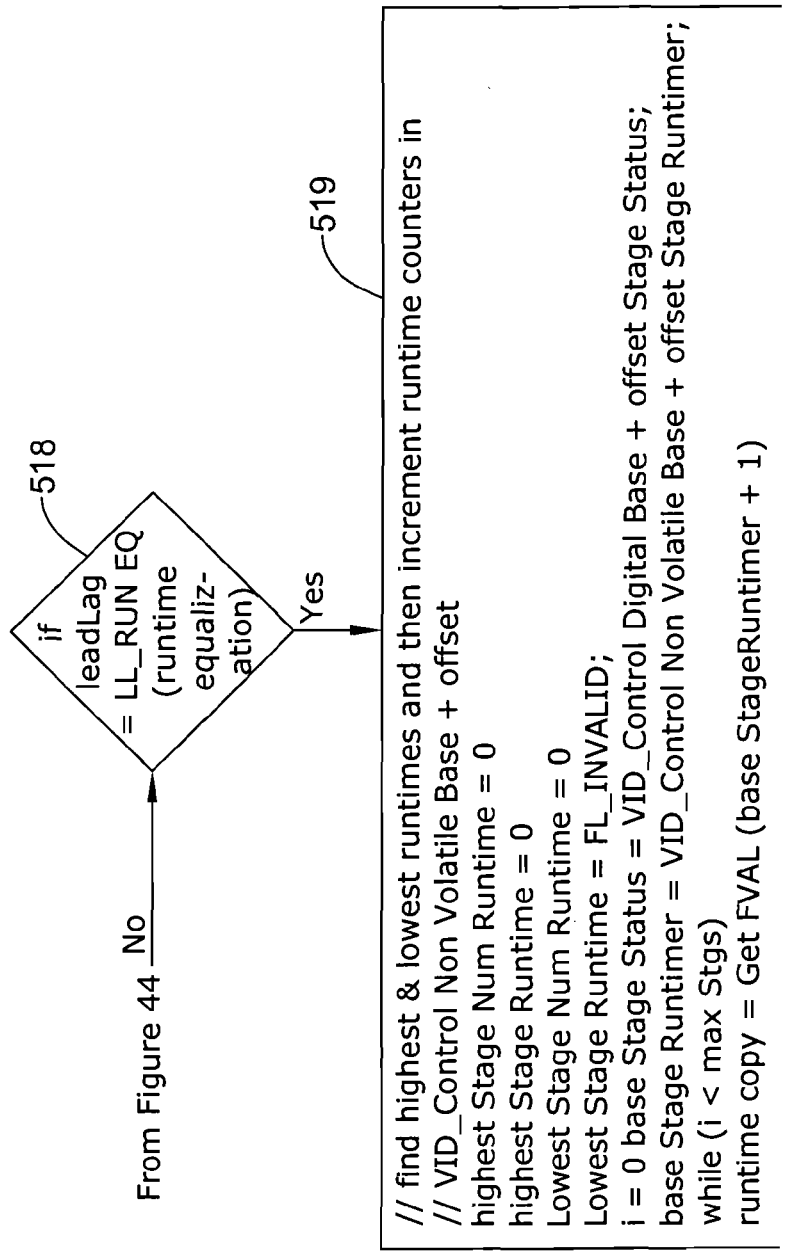

FIGS. 46-48 show the Runtime equalization algorithm. An individual runtime value may be used to store the individual stage runtime value, using one float value per individual stage. As the algorithm goes through each individual stage, the value of each stage runtime may be compared to the highest stage runtime and lowest stage runtime found so far. If the individual stage is on (determined by a function Get StageStatus), then the runtime for that on stage may be compared against the highest stage runtime found so far. After all the stages have been cycled through, the stage with the highest runtime may be the candidate to be turned off. Similarly, all the stages that are off may be cycled through and each individual stage runtime may be compared against the lowest stage runtime found so far. After all the stages have been cycled through, the stage with the lowest runtime may be the candidate to be turned off. One stage per execution can change status with the runtime selection.

A runtime reset routine may allow an individual stage to be set to zero from the function block. Other memory access methods may allow individual setting of the runtime values.

FIG. 49 shows the Stagedriver Add routine. This routine may determine the individual stage status offset values where the stage information is stored and the max stages information from the stgStatusIn which is a connected valued from the StageStatus block. Individual stages on and off information may be determined from the GetStageStatus Function call. Each individual stage value may be commanded through the PutFVal function call.

For a stage driver block setup, one may have a configuration tool. The configuration tool should keep track of resources allocated in the stage driver block design, such as in a present example (i.e., FIG. 36).

Stage driver 1 block may use resources as in the following.

| | |
|---|---|
| # Control Floats = 2 | FVALS = 2 |
| # Control Digitals = 25 | DVALS = 26 |
| # Control NonVolatiles = 1 | SetPoints = 1 |
| # Flash Constants = 0 | CONST 0 |
| # Bytes Loop Static = 8 | |
| # Function Blocks = 3 | LSTAT = 8 |
| # User NVIs = 1 | |
| # UserNVOs = 16 | # FB = 3 |

The following information may consist of a project summary for the stage driver.

| Device Name StageDriver |
|---|
| Resource Useage |
| # Control Floats = 2
Control Digitals = 25
Control NonVolatiles = 23
Flash Constants = 0
Bytes RAM pool Used = 116
Bytes Loop Static = 8
Function Blocks = 3
User NVIs = 1
User NVOs = 16 |
| Function Block Data |

| Type | | Name | | |
|---|---|---|---|---|
| STAGEDRIVER | | STAGEDRIVER1 | | |
| Wrd | Name | PVID (hex) | PVID (dec) | Value |
| 0 | nStgActive | 8000 | 32768 | 0 |
| 1 | runtimeReset | 8203 | 33283 | 0 |
| 2 | stage1 | 8204 | 33284 | 0 |
| 3 | stage2 | 8205 | 33285 | 0 |
| 4 | stage3 | 8206 | 33286 | 0 |
| 5 | stage4 | 8207 | 33287 | 0 |
| 6 | stage5 | 8208 | 33288 | 0 |
| 7 | stgStatusOut | 8001 | 32769 | 0 |
| 8 | offsets | 8116 | 33046 | 0 |
| Byt | Name | Value | | |
| 0 | leadLag | 2 | | |
| 1 | maxStgs | 22 | | |
| 2 | spare | 0 | | |

| Type | | Name | | |
|---|---|---|---|---|
| STAGEDRIVER_ADD | | STAGEDRIVER_ADD2 | | |
| Wrd | Name | PVID (hex) | PVID (dec) | Value |
| 0 | stgStatusIn | 8001 | 32769 | 0 |
| 1 | stage1 | 8209 | 33289 | 0 |
| 2 | stage2 | 820A | 33290 | 0 |
| 3 | stage3 | 820B | 33291 | 0 |
| 4 | stage4 | 820C | 33292 | 0 |
| 5 | stage5 | 820D | 33293 | 0 |
| 6 | stage6 | 820E | 33294 | 0 |
| 7 | stage7 | 820F | 33295 | 0 |
| 8 | stage8 | 8210 | 33296 | 0 |
| Byt | Name | Value | | |
| 0 | firstStgNum | 6 | | |
| 1 | | 0 | | |
| 2 | spare | 0 | | |

| Type | | Name | | |
|---|---|---|---|---|
| STAGEDRIVER_ADD | | STAGEDRIVER_ADD3 | | |
| Wrd | Name | PVID (hex) | PVTID (dec) | Value |
| 0 | stgStatusIn | 8001 | 32769 | 0 |
| 1 | stage1 | 8211 | 33297 | 0 |
| 2 | stage2 | 8212 | 33298 | 0 |
| 3 | stage3 | 8213 | 33299 | 0 |
| 4 | stage4 | 8214 | 33300 | 0 |
| 5 | stage5 | 8215 | 33301 | 0 |
| 6 | stage6 | 8216 | 33302 | 0 |

-continued

Device Name StageDriver

| 7 | stage7 | 8217 | 33303 | 0 |
|---|--------|------|-------|---|
| 8 | stage8 | 8218 | 33304 | 0 |

| Byt | Name | Value |
|-----|------|-------|
| 0 | firststgNum | 14 |
| 1 |  | 0 |
| 2 | spare | 0 |

User NV Configuration Data

| NV Name | Field Name | PVID (hex) | PVID (dec) | Value |
|---------|-----------|------------|------------|-------|
| nviNStgActive | Field1 | 8000 | 32768 | 0 |
| Stage6 | Field1 | 8209 | 33289 | N/A |
| Stage7 | Field1 | 820A | 33290 | N/A |
| Stage8 | Field1 | 820B | 33291 | N/A |
| Stage9 | Field1 | 820C | 33292 | N/A |
| Stage10 | Field1 | 820D | 33293 | N/A |
| Stage11 | Field1 | 820E | 33294 | N/A |
| Stage12 | Field1 | 820F | 33295 | N/A |
| Stage13 | Field1 | 8210 | 33296 | N/A |
| Stage14 |  | 8211 | 33297 | N/A |
| Stage15 | Field1 | 8212 | 33298 | N/A |
| Stage16 | Field1 | 8213 | 33299 | N/A |
| Stage17 | Field1 | 8214 | 33300 | N/A |
| Stage18 | Field1 | 8215 | 33301 | N/A |
| Stage19 | Field1 | 8216 | 33302 | N/A |
| Stage20 | Field1 | 8217 | 33303 | N/A |
| Stage21 | Field1 | 8218 | 33304 | N/A |

Control Constants

| PVID(Hex) | PVID(Dec) | Value |
|-----------|-----------|-------|

FIGS. 50-56 relate to stage drivers discussed herein.

One may note a "flexible resource stage rotation linking appliance". In the design of programmable controls in the commercial HVAC industry, there may appear a need to dynamically assign stage outputs from a single input such as number of stages requested. Traditional block approaches and memory resources may require a fixed area that is an integer multiple of the maximum size of the block, for example, if 16 outputs are required, then a block of 16 or an elaborate scheme to share the information of staging and memory resources are required. There appears a need to dynamically allocate resource and stages in a resource efficient manner that is tied in with a flexible block architecture.

The system may solve the design and implementation issue through the efficient use of two function blocks that work with HVAC systems such as CVAHU, VAV, and other stage utilization algorithms.

As more stages are set up during design, the configuration tool may calculate the starting address for both stage status and runtime and allocate the memory and calculate the offset from the base index that is the starting address for the runtime area and the stage status area in their respective memories.

A system may be also regarded as an "incremental stager linking with dynamic resource adaptation". In the design of programmable controls in the commercial HVAC industry, there appears a need to assign individual on/off stage outputs from a single input such as number of stages requested. The actual stages that turn on are dependent on the configuration of the stager such as first on/first off, first on last off (rotating), and runtime accumulation switching. Other configuration information may include the number of total stages maximum allowed. Furthermore, there appears the need to optimize this stage driver to use low cost microprocessor controls that have a small amount of memory and processor resources. Traditional block approaches and memory resources may require a fixed area that is an integer multiple of the maximum size of the block, for example, if 16 outputs are required, then a block of 16 or an elaborate scheme to share the information of staging and memory resources are required. The issue that this invention may address may be the ability to configure a single or multiple stages in a modular function fashion that optimizes the use of memory resources.

This invention may solve this problem though the use of connection between the source stage block and the additional stage blocks plus the use of a common memory area allocated by an intelligent tool. Furthermore, this invention may use a memory allocation scheme that dynamically assigned needed memory resources so that very little footprint beyond the minimum required is necessary. Additional stage blocks may have little knowledge or dependence on the original primary source stage block and have additional flexibility to start or duplicate stage coverage.

The StageDriver Master function takes input number of stages active and determines which stages to energize or de-energize based on the lead/lag strategy chosen. StageDriver works with StageDriverAdd to distribute additional stages above 7 stages. StageDriver drives digital output stages 1-6. It also maintains a nonvolatile runtime total and digital stage status information for each stage.

The configuration tool may set a runtime and stage stages offset in a single offsets variable. The offsets variable is not necessarily a Public Variable ID. The lower byte may store the offset in digital memory to reference the starting stage status memory index, and the upper byte may store the offset in nonvolatile memory to reference the starting runtime memory index. stgStatusOut is the offset to digital stage status that is used by connected StageDriverAdd blocks.

As more stages are set up during design, the configuration tool may calculate the starting address for both stage status and runtime and allocate the memory and calculate the offset from the base index that is the starting address for the runtime area and the stage status area in their respective memories.

Inputs may include the following.

nStagesActive (IN_ONLY) is the input number of stages to be distributed to on/off values to individual stages.

Outputs may include the following.

Stage1, stage2, stage3, stage4, stage5, and stage6 (OUT_DIG) are individual outputs that represent on or off values. These are outputs that are turned on in different order depending on the leadLag strategy.

stageStatusOut (OUT_FLT) is connected from StageDriver to the StageDriverFollower block and gives offset in the Common Memory to the StageBitStatus values. This information is used by the StageDriverAdd to find the correct offset to command which stages to turn on or off.

Offsets (OUT_FLT) is used directly as a offset the Public variable ID to store two offsets, one for runtime, and one for stage status. The Actual OUT_FLT value is not necessarily used, just the two byte value stored in the Public Variable ID space. This value does not appear to refer to a Public Variable ID.

The Structure content of the 2 byte offset references for Offsets may be included the following.

offsetStageRuntimer (byte) specifies the variable quantitative offset to be applied to the beginning of nonvolatile memory variable number that indicates the starting variable number used to store the individual stage runtime values. This number may be calculated by the configuration tool and is not necessarily changeable.

offsetStageStatus (byte) specifies the variable number offset to be applied to the beginning of digital memory area that indicates the starting variable number used to store the individual stage on/off values. This number may be calculated by the configuration tool and is not necessarily changeable. This value is exported to other stages through the stageBitStatus output.

Parameters may include the following.

leadlag (Byte param:UBYTE) specifies whether the staging strategy should be first on last off (LL_STD=0—standard), first on first off (LL_FOFO=1—Rotating), run time accumulation where next on is lowest runtime and next off has highest runtime (LL_RUNTEQ=2—Runtime Accumulation).

maxStages (Byte param:UBYTE) specifies how many total stages nStagesActive can reach. MaxStages can go up to a total of 255 stages.

Common Memory Resources (not accessible by user but accessible by function block)

stageRunTimer (STATIC_FL per individual stage*number of stages–If stagingType=RUNTEQ, then individual stages runtimes values are stored in nonvolatile memory. This memory may be allocated by the configuration tool. The runtimes for each stage represent the accumulated ON time in hours and are stored in this separate area of nonvolatile STATIC_FL variable memory. The public variable ID for this block of timers is designated by the tool. The Parameter runtimeMemOffset specifies the variable number offset to the starting STATIC_FL memory to access this block. The total number of bytes allocated in Common memory is maxStages time 4 bytes (STATIC_FL), so for 10 stages it would be 10 floats or 40 bytes. Each runtime value may be stored as a FLOAT and be sequentially stored starting with RuntimeStage1.

stageStatus (UBYTE per 8 stages) is a set of digital memory variable allocated by the configuration tool. The total number of bytes allocated in this stageStatus memory area may be the rounded up value of maxStages divided by 8, plus 8 bits so 18 stages would require 26 bits or 4 bytes rounded up. The stageStatus memory area may be accessed by both StageDriver and StageDriverFollower to determine if a particular stage should be on.

The StageDriverAdd function may take input command from StageDriver and determine which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

Inputs may include the following. stgStatusIn (IN_ONLY) is the offset value to the to be distributed to on/off values to individual stages. This input must come from the output of the StageDriver.

Parameters may include the following. firstStageNum (BYTE_PARAM) is the starting stage number of this block. For example if StageDriverMaster commands stages 1-6, then firstStageNum for the next connected StageDriverFollower would be 7. It is possible to have the first stage number in the StageDriverAdd overlap the stages controlled by StageDriver. For example by setting firstStageNum to 1 on A StageDriverAdd would duplicate the stage 1-6 functionality of StageDriver.

Outputs may include the following. Stage1, stage2, stage3, stage4, stage5, stage6, stage7, and stage8 (OUT_DIG) are individual outputs that represent on or off values. These are outputs that are turned on in different order depending on the leadLag strategy.

Stage driver—The StageDriver Master function takes input number of stages active and determines which stages to energize or de-energize based on the lead/lag strategy chosen. StageDriver works with StageDriverAdd to distribute additional stages above 7 stages. StageDriver drives digital output stages 1-6. It also maintains a nonvolatile runtime total and digital stage status information for each stage.

The configuration tool will set a runtime and stage stages offset in a single offsets variable. The offsets variable is not a Public Variable ID. The lower byte will store the offset in digital memory to reference the starting stage status memory index, and the upper byte will store the offset in nonvolatile memory to reference the starting runtime memory index. stgStatusOut is the offset to digital stage status that is used by connected StageDriverAdd blocks.

As more stages are set up during design, the configuration tool will calculate the starting address for both stage status and runtime and allocate the memory and calculate the offset from the base index that is the starting address for the runtime area and the stage status area in their respective memories.

The runtime area is stored in non volatile floats (4 bytes). The stage status area uses a digital byte (1 bytes) so 8 bits or 1 byte of information storage is used for each 8 stages assigned. The tool must assign a 1 byte extra buffer to ensure correct stage driver add functionality.

The stage status information is accessible to drive additional stages.

Additional StageDriverAdd function blocks are use to drive stages 7 up to 255.

The StageDriver ram structure is defined as:

| | | |
|---|---|---|
| IN_ONLY | nStgActive; | |
| OUT_DIG stage1;OUT_DIG Stage2;OUT_DIG stage3;OUT_DIG stage4;OUT_DIG stage5;OUT_DIG stage6; | | |
| OUT_DIG | stgStatusOut; | |
| OUT_FLT | offsets; | |
| UBYTE | leadLag; | //lead/lag type |
| UBYTE | maxStgs; | //maximum number of stages |

The StageDriverLoopStatic structure may be defined in the following.

UINT16 oldnumstages; UINT16 seqEndPtr; UINT16 seqStartPtr;

The memory index for Stage Status and Stage runtimer is calculated in the following.

//baseStageStatus = VID_ControlDigitalBase + offsetStageStatus;
//baseStageRuntimer=VID_ControlNonVolatileBase + offsetStageRuntimer;

where offsetStageStatus is the lower byte of offsets and offsetStageRuntime is the upper byte of offsets.

Inputs may include the following.

nStagesActive (IN_ONLY) is the input number of stages to be distributed to on/off values to individual stages.

Outputs may include the following.

Stage1, stage2, stage3, stage4, stage5, and stage6 (OUT_DIG) are individual outputs that represent on or off values. These are outputs that are turned on in different order depending on the leadlag strategy.

stageStatusOut (OUT_FLT) is connected from StageDriver to the StageDriverFollower block and gives offset in the Common Memory to the StageBitStatus values. This information is used by the StageDriverAdd to find the correct offset to command which stages to turn on or off.

Offsets (OUT_FLT) is used directly as a offset the Public variable ID to store two offsets, one for runtime, and one for stage status. The Actual OUT_FLT value is not used, just the two byte value stored in the Public Variable ID space. This value does not refer to a Public Variable ID.

The Structure content of the 2 byte offset references for Offsets may include the following.

offsetStageRuntimer (byte) specifies the variable quantitative offset to be applied to the beginning of nonvolatile memory variable number that indicates the starting variable number used to store the individual stage runtime values. This number is calculated by the configuration tool and is not changeable.

offsetStageStatus (byte) specifies the variable number offset to be applied to the beginning of digital memory area that indicates the starting variable number used to store the individual stage on/off values. This number is calculated by the configuration tool and is not changeable. This value is exported to other stages through the stageBitStatus output.

Parameters may include the following.

leadlag (Byte param:UBYTE) specifies whether the staging strategy should be first on last off (LL_STD=0—standard), first on first off (LL_FOFO=1—Rotating), run time accumulation where next on is lowest runtime and next off has highest runtime (LL_RUNTEQ=2—Runtime Accumulation).

maxStages (Byte param:UBYTE) specifies how many total stages nStagesActive can reach. MaxStages can go up to a total of 255 stages.

Common Memory Resources (not necessarily accessible by user but may be accessible by function block)

stageRunTimer (STATIC_FL per individual stage*number of stages–If stagingType=RUNTEQ, then individual stages runtimes values are stored in nonvolatile memory. This memory is allocated by the configuration tool. The runtimes for each stage represent the accumulated ON time in hours and are stored in this separate area of nonvolatile STATIC_FL variable memory. The public variable ID for this block of timers is designated by the tool. The Parameter runtimeMemOffset specifies the variable number offset to the starting STATIC_FL memory to access this block. The total number of bytes allocated in Common memory is maxStages time 4 bytes (STATIC_FL), so for 10 stages it would be 10 floats or 40 bytes. Each runtime value is stored as a FLOAT and is sequentially stored starting with RuntimeStage1.

stageStatus (UBYTE per 8 stages) is a set of digital memory variable allocated by the configuration tool. The total number of bytes allocated in this stageStatus memory area is the rounded up value of maxStages divided by 8, plus 8 bits so 18 stages would require 26 bits or 4 bytes rounded up. The stageStatus memory area is accessed by both StageDriver and StageDriverFollower to determine if a particular stage should be on.

Figure 52:
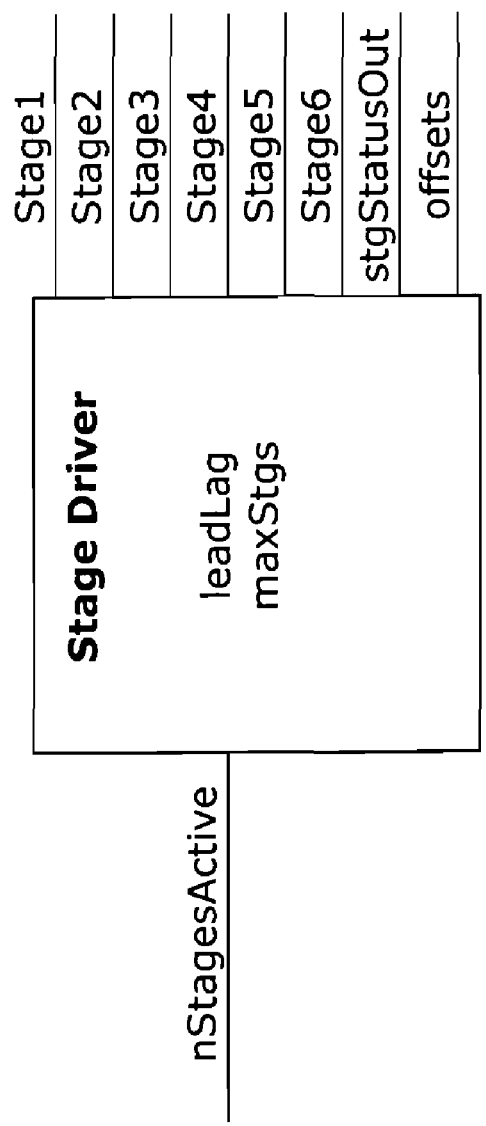

Note FIGS. 52 and 53.

Stage driver add—The StageDriverAdd function takes input command from StageDriver and determines which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

Inputs may include the following.

stgStatusIn (IN_ONLY) is the offset value to the to be distributed to on/off values to individual stages. This input must come from the output of the StageDriver.

Parameters may include the following.

firstStageNum (BYTE_PARAM) is the starting stage number of this block. For example if StageDriverMaster commands stages 1-6, then firstStageNum for the next connected StageDriverFollower would be 7. It is possible to have the first stage number in the StageDriverAdd overlap the stages controlled by StageDriver. For example by setting firstStageNum to 1 on A StageDriverAdd would duplicate the stage 1-6 functionality of StageDriver.

Outputs may include the following.

Stage1, stage2, stage3, stage4, stage5, stage6, stage7, and stage8 (OUT_DIG) are individual outputs that represent on or off values. These are outputs that are turned on in different order depending on the leadLag strategy.

Figure 54:
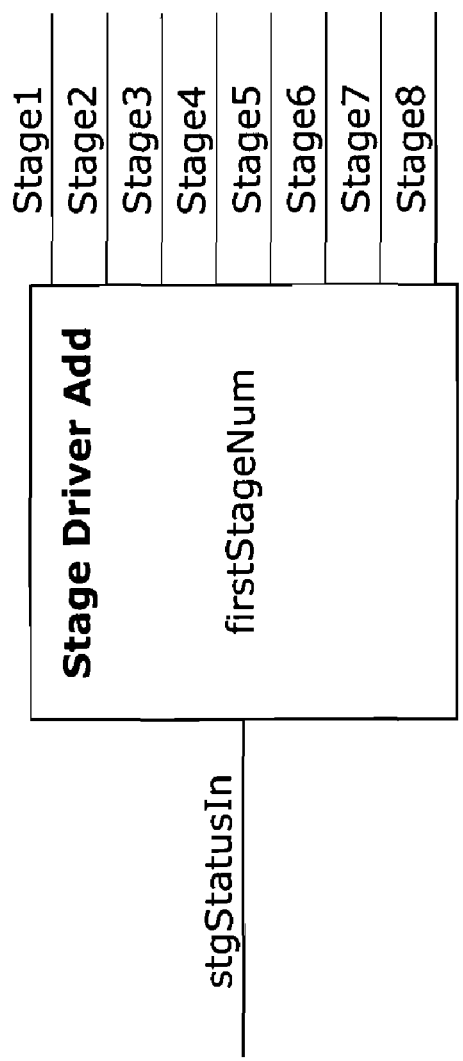
Figure 56:
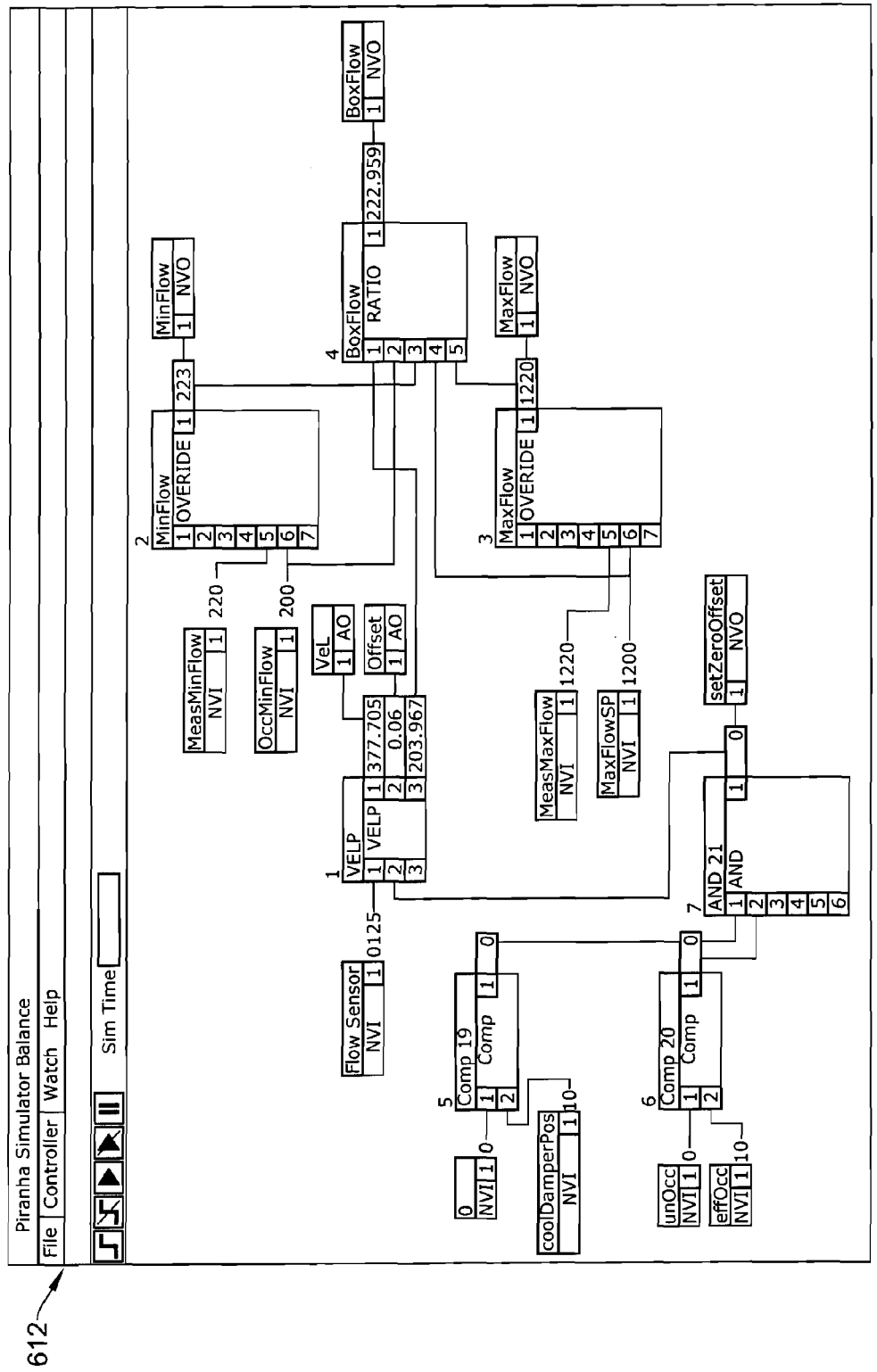

Note FIGS. 54, 55 and 56.

An Appendix A herein provides further support of the description of the systems herein.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

Appendix A
H0011970; 1161.1287101
Inventors: Michael Pouchak; Paul Wacker

Function block design example.

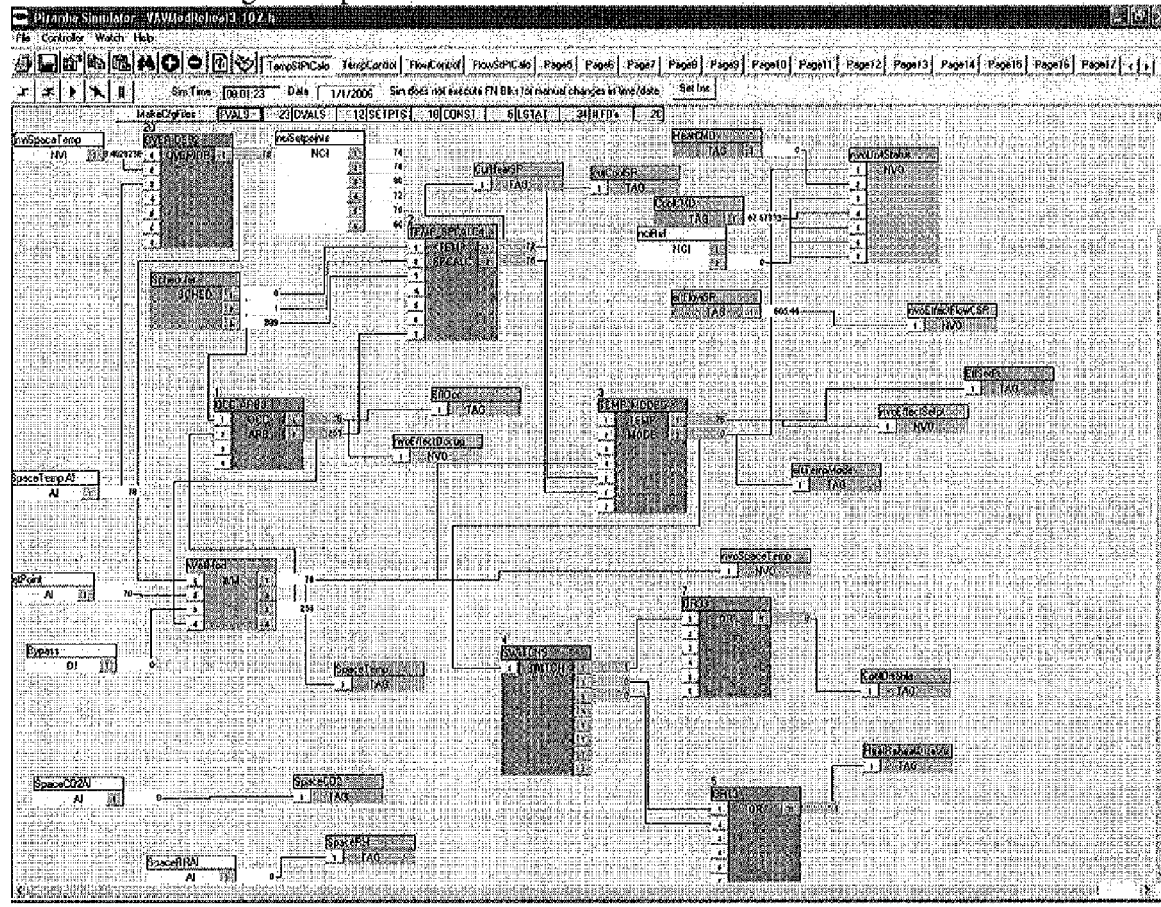

TempControlP2 Descriptive Function Blocks:

*Override*

This function sets the output to the highest priority input that is not invalid. The Highest priority input is priority1Value and the Lowest priority input is cntrlInput. If All inputs are invalid or Unconnected, then the output is set to defaultValue. This function block corresponds to the BACnet priority array implementation with the replacement of the BACnet "NULL" state with "invalid".

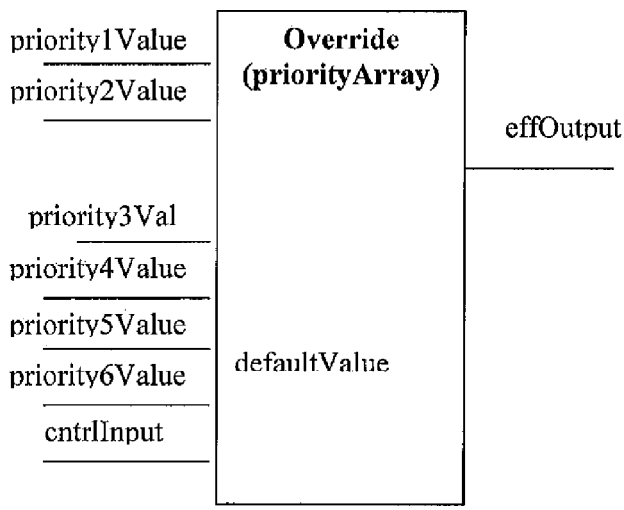

Configuration:
1) None

| | | | |
|---|---|---|---|
| In1 | priority1val | IN_PAR | priority 1 value |
| In2 | priority2val | IN_PAR | priority 2 value |
| In3 | priority3val | IN_PAR | priority 3 value |
| In4 | priority4val | IN_PAR | priority 4 value |
| In5 | priority5val | IN_PAR | priority 5 value |
| In6 | priority6val | IN_PAR | priority 6 value |
| In7 | cntrlInput | IN_PAR | controller input |
| Paramter1 | defaultValue | PAR_IN | default value |
| Out1 | effOutput | OUT_FLT | output-Override |

Explanation:
In this Example VAV application, two inputs are connected to the Override 92 function block. Input 2 (piority2val) is the nviSpaceTemp network value that is set to invalid (3.402823E+38 = invalid) so that does not propagate to the effoutput. The SpaceTemp AI (Analog input space temp) value of 78 degrees is connected to input 3 (piority3val) and since that is the highest priority value that is available, then 78 degrees is propagated to the effoutput output1. In this system, a valid value of nviSpaceTemp has priority over the physical SpaceTempAI.

Scheduler

*Scheduler*

This function calculates the current occupancy state, next state and time until next state (TUNCOS) based on the date/time and the schedule. It makes them available as public variables.

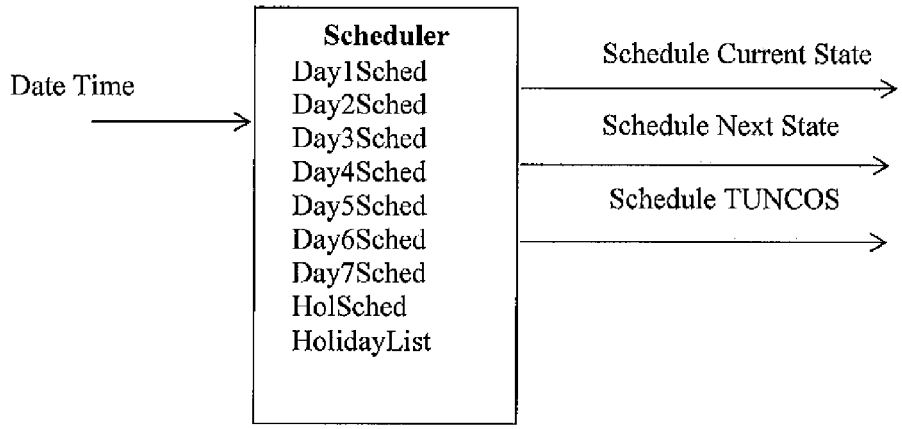

Inputs:
Date and Time from the operating system.

Outputs:
*Schedule Current State* is the occupancy state the controller should be in at this minute.
> OCC means use the occupied set point.
> UNOCC means use the unoccupied set point.
> STANDBY means use the standby set point.

*Schedule Next State* is the occupancy state the controller will go to after the current state is complete.
> OCC means the next state is occupied.
> UNOCC means the next state is unoccupied.
> STANDBY means the next state is standby.
> OCCNUL means the next state unknown.

*Schedule TUNCOS* is the time (in minutes) until the next change of state. The Piranha controller uses this to do setpoint recovery.
> Range: 0 to 11520 minutes (8 days). 11520 minutes means the time until next change of state is unknown or further in the future.

The enumeration values for all occupancy states are: Occ = 0, Unocc=1, Bypass =2, Standby = 3, Null = 255.

Configuration:
1) The user specifies up to 4 events per day for each of the 7 days a week plus a holiday. Each event has a state of OCC, STANDBY, UNOCC, or OCCNUL (not programmed). And a time of day 0-1439 minutes. Zero (0) is the first minute of the day which is midnight. 1439 is the last minute of the day, 11:59PM.
2) The user specifies up to ten (10) holidays. Each scheduled holiday has a valid start month, day and duration. Holidays are every year by definition.

Operation:
There can be one scheduler per controller. The scheduler calculates the occupancy state of the controller. It computes the current state, next state and Time until Next Change of State (TUNCOS). This built-in function is called once per second by the task scheduler. The user can create logic to select between this schedule and a schedule command coming in from the network. The user can use the Effective Occupancy Arbitrator Function Block to combine this result with other inputs to calculate effective occupancy current state.

Explanation:
The Scheduler is configured as follows: occupied 8am on Sun,Mon,Tue,Wed,Thurs,Frid,Sat and unoccupied at 10 pm on Sun,Mon,Tue,Wed,Thurs,Frid,Sat. In this example, the current time is 8:01 am and the Sched block output1 (currentOcc) state is 0=Occupied.
The enumeration values for all occupancy states are: Occ = 0, Unocc=1, Bypass =2, Standby = 3, Null = 255.
The output 2 (nextOcc) state is 1= Unoccupied and the output3 (TUNCOS or time until next change of state) is 839 minutes. These values are passed from the scheduler block to the Temp setpoint calc to assist in calculation of the current setpoint and temperature ramping.

WallModule

*Wall Module Interface*

This function automatically handles the wall module interface with the T7770. It takes the sensor, setpoint and override information from the universal and digital inputs and makes them available as public variables. It provides a feedback signal to the LED on an analog output for override indication.

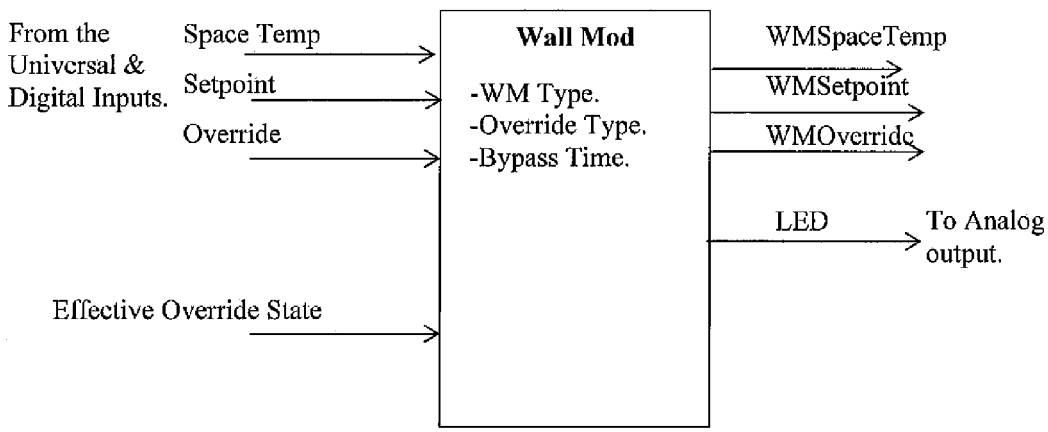

Logic Inputs:

The wall module override input must go into a digital input of the Piranha controller for proper operation.

Configuration:
1) The user specifies the override type. This mode can be "Normal (0)", "Bypass only (1)", or "Disabled (2)". Values other than these are treated as "Normal".
3) The user specifies the bypass time as a parameter or connects this input to a network output such as nciBypassTime.

Explanation:
The Wall module take the space temp input 1 as 78 degrees, the setpoint input 2 as 70 degrees, the bypass button input 3 as 0 (off). Wall module input 4 is Effective override which comes from the OCC ARB function block. 255 is Null or not used. The output 1 is space temp out equals 75 degrees and WMOverride = 255 (null).

| | | | |
|---|---|---|---|
| In1 | spaceTempIn | IN_ONLY | space temperature |
| In2 | setPointIn | IN_ONLY | setpoint |
| In3 | overide | IN_ONLY | override |
| In4 | EffOverride | IN_ONLY | effective override state |
| Out1 | spaceTempOut | OUT_FLT | output-Space temperature |
| Out2 | setPointout | OUT_FLT | output-Setpoint |
| Out3 | WMOverride | OUT_DIG | output-Wall module override |
| Out4 | LED | OUT_DIG | output-LED |

OccArb

*Occupancy Arbitrator*

This function computes the current Effective Occupancy Current State and the Manual Override State.

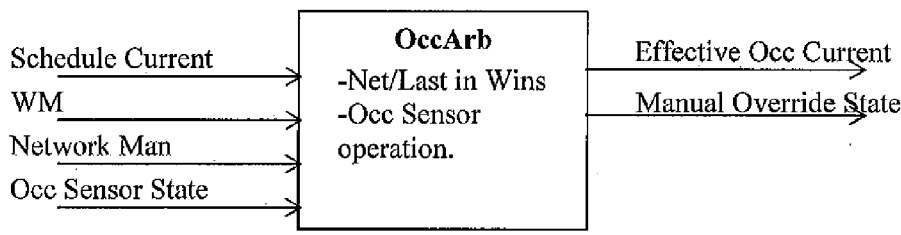

Occ = 0, Unocc=1, Bypass =2, Standby = 3, Null = 255.

| | | | |
|---|---|---|---|
| In1 | schedCurrentState | schedule current state | IN_ONLY |
| In2 | wmOverride | wall module override | IN_ONLY |
| In3 | networkManOcc | network manual occ command | IN_ONLY |
| In4 | occSensorState | occ sensor | IN_ONLY |
| Out1 | effOccCurrentState | output-Effective current occ state | OUT_DIG |
| Out2 | manOverrideState | output-Man Override | OUT_FLT_SAV |
| Param1 | netLastInWins | 0=net wins; 1=last in wins | |
| Param2 | occSensorOper | 0=cr; 1=cc; 2=tenant | |

Configuration:
1) The user specifies Net wins (0) or Last in wins (1).
2) The user specifies the occupancy sensor operation. There are 3 choices: Conference room (0), Unoccupied Cleaning Crew (1), and Unoccupied Tenant (2).

Explanation:
The Occupancy arb takes input1 schedcurrentstate from sched which is 0 = occupied and takes the input 2 wallmod override input 2 from the Wall mod output 3 wall mod override and arbitrates the current occupancy mode which is output 1 Effective Occ Current State which is 0= occupied. Occ Arb also determines if there is a manual override on output 2 = 255 = null used.

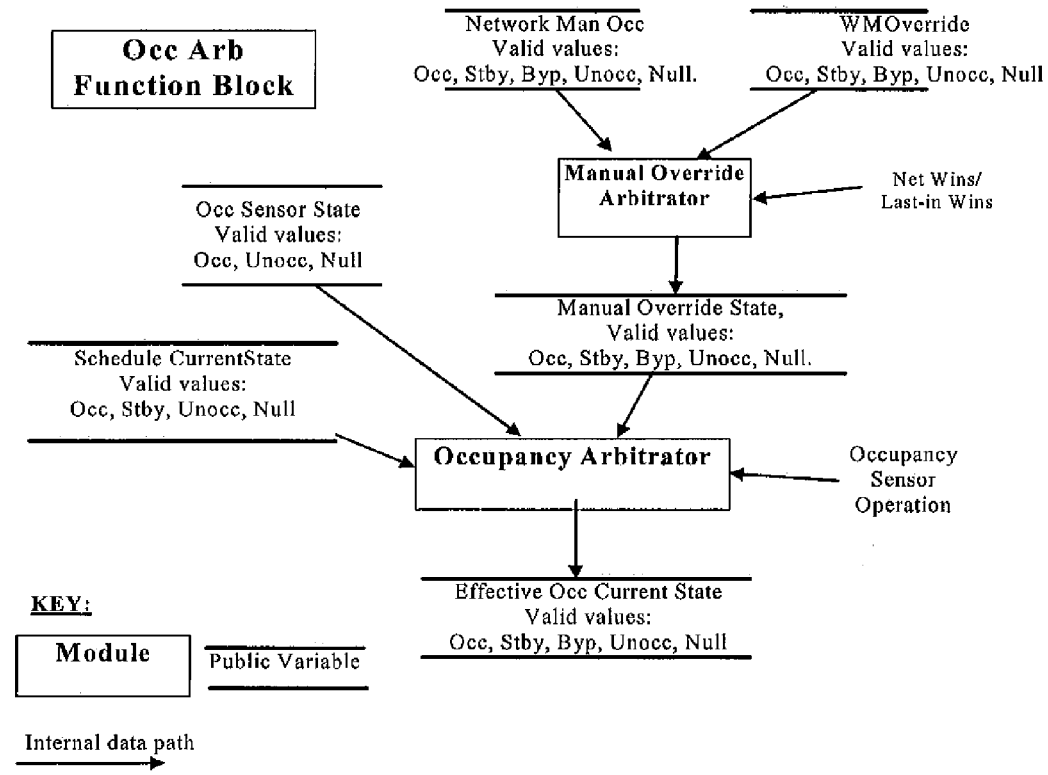

TempSpCalc

Temperature Setpoint Calculator

This function calculates the current Effective Heat setpoint and Effective Cool setpoint based on the current schedule information, occupancy override, and intelligent recovery information.

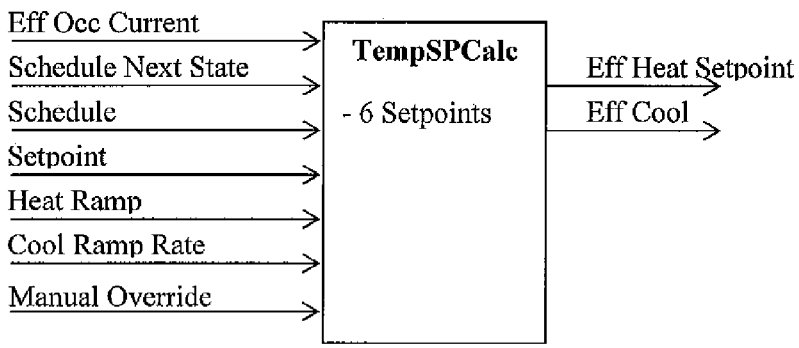

| | | | |
|---|---|---|---|
| In1 | effOccCurrentState | IN_ONLY | effective occ current state |
| In2 | schedNextState | IN_ONLY | sched next state |
| In3 | schedTuncos | IN_ONLY | sched Time until next change of state |
| In4 | setpoint | IN_ONLY | setpoint (<10 = offset) |
| In5 | heatRampRate | IN_PAR | heat ramp rate |
| In6 | coolRampRate | IN_PAR | cool ramp rate |
| In7 | manOverrideState | IN_ONLY | man override state |
| Out1 | effHeatSP | OUT_FLT | output-effective heat setpoint |
| Out2 | effCoolSP | OUT_FLT | output-effective cool setpoint |

Configuration:
1) The user specifies the 6 setpoints. When the TempSPCalc Function Block is used, nciTempSetpoints (SNVT_temp_setpt) is added by the Management Tool. nciTempSetpoints is mapped by the Tool to the first 6 Public variables under Control non-volatile. The order is Occupied Cool, Standby Cool, Unoccupied Cool Occupied Heat, Standby Heat, and Unoccupied Heat. The user may have more than one TempSPCalc Function Block, however all blocks will use the same nciTempSetpoints network variable and map to the same 6 Public variables. See below for more information.

Explanation:
The Temperature setpoint calculator takes the input1 effective occ current state (0 = occupied) and input 2 sched next state (1= unoccupied) and input 3 sched Time until next change of state (839 minutes) from the Scheduler and also input 7 man override from Occ arb (255 = null) and uses the 6 setpoints (nciSetpoints) to calculate output 1 current effective heat Setpoint = 72 and output 2 effective cool setpoint = 76. The Six setpoint are Occupied Cool=76, Standby Cool=78, Unoccupied Cool-80 Occupied Heat=72, Standby Heat=70, and Unoccupied Heat=60.

TempMode

Set Temperature Mode

This function automatically calculates the effective temperature control mode based on the control type, system switch setting, network mode command, temperature set points, supply temperature and space temperature. From iteration to iteration, the Function Block keeps track of the previous command mode and the effective temperature mode. On power up/reset these are clearedsysSwitch

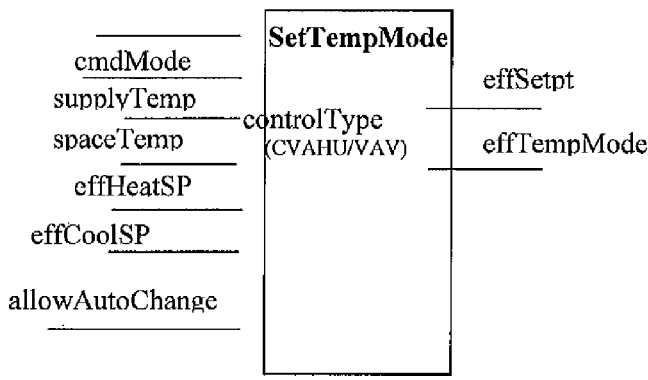

effTempMode indicates the current Mode determined by input states and arbitrated by control logic. SetTempMode does not generate all the possible Modes available. The valid enumerated values have the following meanings:

| effTempMode | Meaning |
|---|---|
| COOL_MODE=0 | Cool air is being supplied to the node via the central air supply and cooling energy is being supplied to the controlled space. |
| REHEAT_MODE=1 | Cool air is being supplied to the node via the central air supply. The air is being reheated by a local Heat source. |
| HEAT_MODE=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

Input Enumerations:
sysSwitch
SS_AUTO         =   0
SS_COOL         =   1
SS_HEAT         =   2
SS_EMERG_HEAT   =   3
SS_OFF          =   255 cmdMode
CMD_AUTO_MODE = 0
CMD_HEAT_MODE = 1
CMD_COOL_MODE = 2
CMD_OFF_MODE = 3
CMD_EMERG_HEAT_MODE = 4
CMD_NUL_MODE = 255

The VAV Mode arbitration logic for controlType = 1 (VAV) is summarized by the tables below:

| Space Temp | sysSwitch | Supply Temp | cmdMode | effTempMode |
|---|---|---|---|---|
| X | X | X | CMD_OFF_MODE(3) | OFF_MODE(255) |
| X | X | X | CMD_EMERG_HEAT_MODE(4) | HEAT_MODE(2) |
| X | X | X | ENUMERATION (5) through ENUMERATION (254) | COOL_MODE(0) |
| Valid | X | <70.0 | CMD_AUTO_MODE (0), CMD_HEAT_MODE (1), CMD_NUL_MODE (255) | COOL_MODE (0) or REHEAT_MODE (1) (see note 1) |
| Valid | X | <70.0 | CMD_COOL_MODE(2) | COOL_MODE (0) |
| Valid | X | 70.0 TO 75.0 | CMD_AUTO_MODE (0), CMD_HEAT_MODE (1), CMD_COOL_MODE (2), CMD_NUL_MODE (255) | COOL_MODE (0), REHEAT_MODE (1), HEAT_MODE (2) (see note 1 for transition between cool mode and reheat mode) |
| Valid | X | >75 | CMD_AUTO_MODE (0), CMD_HEAT_MODE (1), CMD_NUL_MODE (255) | HEAT_MODE(2) |
| Valid | X | Invalid or unconnected | CMD_HEAT_MODE (1) | HEAT_MODE (2) |

| Valid | X | Invalid or unconnected | CMD_COOL_MODE (2) | COOL_MODE (0) |
|---|---|---|---|---|
| Valid | SS_COOL(1) | Invalid or unconnected | CMD_AUTO_MODE (0) | COOL_MODE(0) |
| Valid | SS_HEAT(2) | Invalid or unconnected | CMD_AUTO_MODE (0) | HEAT_MODE(2) |
| Valid | SS_EMERGENCY HEAT(3) | Invalid or unconnected | CMD_AUTO_MODE (0) | HEAT_MODE(2) |
| Valid | SS_OFF(255) | Invalid or unconnected | CMD_AUTO_MODE (0) | OFF_MODE(255) |
| Valid | SS_AUTO(0), invalid, unconnected, or a non-listed enumeration. | Invalid or unconnected | CMD_AUTO_MODE (0), CMD_NUL_MODE (255), | COOL_MODE(0) or REHEAT_MODE(1) (see note 1) |
| InValid | SS_AUTO(0), invalid, unconnected, or a non-listed enumeration. | Invalid or unconnected | CMD_AUTO_MODE (0), CMD_NUL_MODE (255), | COOL_MODE(0) |

X means Don't Care

Note 1:If allowAutoChange = 1 then allow to switch between REHEAT_MODE and COOL_MODE. Must have valid effHeatSP and effCoolSP.

If in cool mode and spacetemp < effheat setpt and space temp < effcoolsetpt – 1.0 then go to reheat mode. If in reheat mode and spacetemp > effCoolSetpt and spacetemp > effHeatsetpt + 1.0 then go to cool mode.

Configuration:
1) The user specifies the control Type (controlType). 0 – CVAHU; 1 – VAV

| | | | |
|---|---|---|---|
| In1 | sysSwitch | IN_ONLY | system switch |
| In2 | cmdMode | IN_ONLY | command mode |
| In3 | supplyTemp | IN_ONLY | supply temp |
| In4 | spaceTemp | IN_ONLY | space temp |
| In5 | effHeatSP | IN_ONLY | effective heating setpoint |
| In6 | effCoolSP | IN_ONLY | effective cooling setpoint |
| In7 | allowAutoChange | IN_PAR | Auto changeover enable/disable |
| Out1 | effSetpt | OUT_FLT | output-Current effective setpoint |
| Out2 | effTempMode | OUT_FLT_SAV | output-Effective temperature mode |
| param | controlType | ubyte | control type (0=CVAHU; 1=VAV) |

Explanation:
The temp mode takes the input 4 space temp = 75, in5 effective heat setpoint = 72, in6 effcoolSP=76 and control type = 1 = vav and arbitrates the current command mode for the controller which is out1 effective setpoint = 76 and out 2 effective temp mode = 0 = cool nvoUnitStatus

Explanation:
novUnitStatus is a aggregation of values under one grouping called nvoUnitStatus. The contents of nvoUnitStatus is as follows;

Edit Output Network Variable Configuration nvoName: nvoUnitStatus

Guaranteed Periodic Refresh: ⦿ TRUE ◯ FALSE

Output Refresh: ◯ Polled ⦿ Unpolled

Message Service: UNACKD

Number of Data Fields in NV: 7    Select structured SNVT: SNVT_hvac_statu

| | Field Name | Category | Internal Data Type | Network Data Type | SEN Delta |
|---|---|---|---|---|---|
| 1 | mode | Unit - less | VAL-ubyte | SNVT_hvac_mode | 1 |
| 2 | heat_output_primary | Percentage | % | SNVT_lev_percent | 1 |
| 3 | heat_ouptu_second | Percentage | % | SNVT_lev_percent | 1 |
| 4 | cool_output | Percentage | % | SNVT_lev_percent | 1 |
| 5 | econ_output | Percentage | % | SNVT_lev_percent | 1 |
| 6 | fan_output | Percentage | % | SNVT_lev_percent | 1 |
| 7 | in_alarm | Unit - less | VAL-ubyte | VAL-ubyte | 1 |

[OK]

nciSetpoints

Explanation:
The Six Setpoints are Occupied Cool=76, Standby Cool=78, Unoccupied Cool-80 Occupied Heat=72, Standby Heat=70, and Unoccupied Heat=60. For details, see below:

Edit Input Network Variable Configuration

NV Name: nciSetpoints

Network Variable Class:
- ○ nvi (Dynamic Data)
- ● nci (Static Data)

Fail Detect:
- ○ True
- ● False

Number of Data Fields in NV: 6    Select structured SNVT: SNVT_temp_setpt

| # | Field Name | Data Category | Network Data Type | Internal Data Type | Value |
|---|---|---|---|---|---|
| 1 | occupied_cool | Temperature | SNVT_temp_p | F | 76 |
| 2 | standby_cool | Temperature | SNVT_temp_p | F | 78 |
| 3 | unoccupied_cool | Temperature | SNVT_temp_p | F | 80 |
| 4 | occupied_heat | Temperature | SNVT_temp_p | F | 72 |
| 5 | standby_heat | Temperature | SNVT_temp_p | F | 70 |
| 6 | unoccupied_heat | Temperature | SNVT_temp_p | F | 60 |

Switch

This function takes an enumerated type input and subtracts a user defined offset to determine which output to set TRUE, holding all others FALSE. The valid range of the input minus the offset is 0-7. The output [0-7] is TRUE if input − offset = X, otherwise it is FALSE. Where X is the output number 0-7.

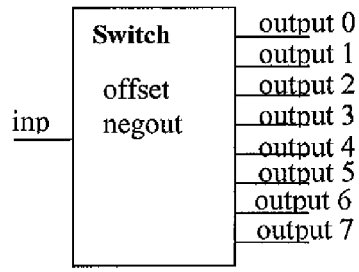

Note 1: If the output is negated, then it will be ON. Individual Outputs can be negated using the negout parameter. The output [0-7] is TRUE if input − offset = X, otherwise it is FALSE.

Configuration
1. The user specifies the negation of each output.

2. The user specifies the offset from 0 to 255.

| | | | |
|---|---|---|---|
| In1 | sensor | IN_ONLY | input |
| Out1 | out0 | OUT_DIG | output 1 |
| Out2 | out1 | OUT_DIG | output 2 |
| Out3 | out2 | OUT_DIG | output 3 |
| Out4 | out3 | OUT_DIG | output 4 |
| Out5 | out4 | OUT_DIG | output 5 |
| Out6 | out5 | OUT_DIG | output 6 |
| Out7 | out6 | OUT_DIG | output 7 |
| Out8 | out7 | OUT_DIG | output 8 |
| Param1 | offset | Ubyte | offset |
| Param2 | negout | NETBITOUT | individual output bit negation |

Explanation:
Switch input 1 takes output 2 from the temp mode which is the effective temp mode = 0 = cool and converts it to a single output per mode. As you will recall from the temp mode discussion the following enumerations are :

| effTempMode | Meaning |
|---|---|
| COOL_MODE=0 | Cool air is being supplied to the node via the central air supply and cooling energy is being supplied to the controlled space. |
| REHEAT_MODE=1 | Cool air is being supplied to the node via the central air supply. The air is being reheated by a local Heat source. |
| HEAT_MODE=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

So therefore Switch output 1 = 1 is true (cooling mode true) if the in1 sensor is 0=cool. Output 2 = 0 (reheat mode= false) and output3 =0 (heat mode = false) as a result of input 1 = 1.

Function Block Parameters

Function Block Type     SWITCH     Brief description of FB Operation

Function Block Name [SWITCH9]

| | Field | Type | Value | NOT | Comments |
|---|---|---|---|---|---|
| 1 | sensor | INPUT | | | input |
| 2 | out0 | OUTPUT | | | output 1 |
| 3 | out1 | OUTPUT | | | output 2 |
| 4 | out2 | OUTPUT | | | output 3 |
| 5 | out3 | OUTPUT | | | output 4 |
| 6 | out4 | OUTPUT | | | output 5 |
| 7 | out5 | OUTPUT | | | output 6 |
| 8 | out6 | OUTPUT | | | output 7 |
| 9 | out7 | OUTPUT | | | output 8 |
| 10 | offset | SETPT | 0 | | offset |

Help    OK

Or

*OR/NOR*

This function is a 6 input OR or NOR. Each input may be individually inverted (NOT)). Unconnected or invalid inputs default to FALSE, without negation, so as to have no effect on the result. From iteration to iteration, the Function Block keeps track of the last computed output value and the current true or false delay time. On power up/reset these are cleared.

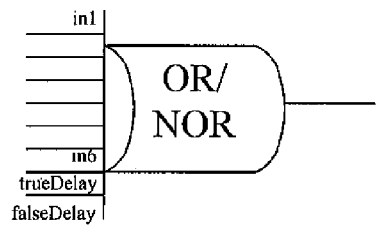

Configuration
1. The user specifies the negation of each input. Negation does not affect the invalid logic value.
2. The user specifies the negation of the output. If the output is negated, the Function Block acts like a NOR.

Explanation:
OR13 logic – if input 1 = 1 or input 2 = 1 (either reheat or heat mode) then (negate ) output = 1 so heat disable is true. OR33 logic – if input 1 is true then negate output = 0 so cool disable = 0 (false) which enables the cool controls.

TempControl P2

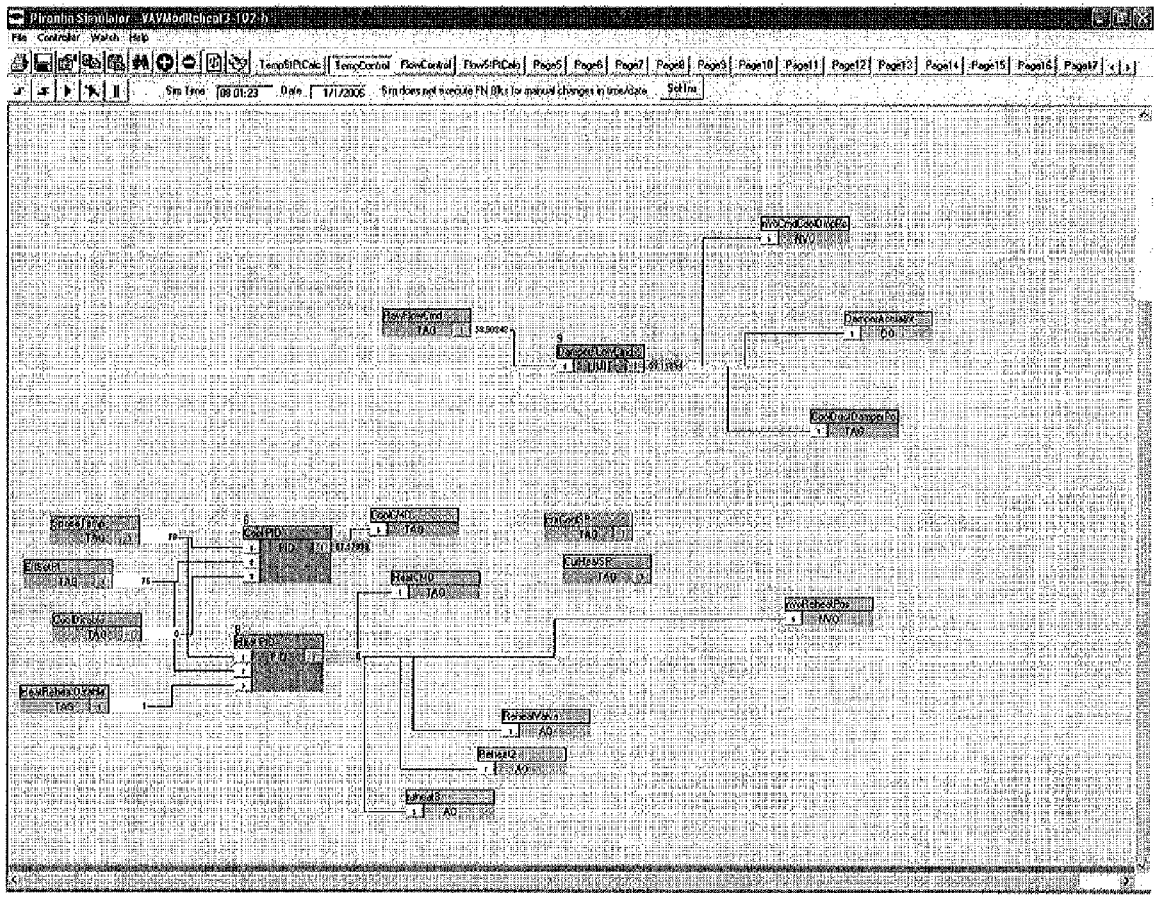

PID (Heat and Cool PID)

PID (Proportional Integral Derivative)

This function is a Proportional Integral Derivative controller (PID).
Err = Sensor − Set Point
Kp = 100/Proportional Band
Ti = Integral Time (seconds)
Td = Derivative Time (sec)
Bias = proportional offset (%)

$$\text{Output (\%)} = \text{bias} + Kp*Err + Kp/Ti \int_0^t (Err)dt + Kp*Td*dErr/dt$$

When Disable/Initialize input is TRUE, The Output and the integral are set to 0 and the block stops running. If Direct/Reverse is set to reverse, then Err term is set to −Err.
When Err < Dead band, Err is set to zero until Dead band Delay time has elapsed and Err is still in the dead band.
To prevent integral wind up, the integral portion of the total error output is limited to 100%.

From iteration to iteration, the Function Block keeps track of the old proportional error, integral error, and dead band timer. On power up/reset these are cleared.

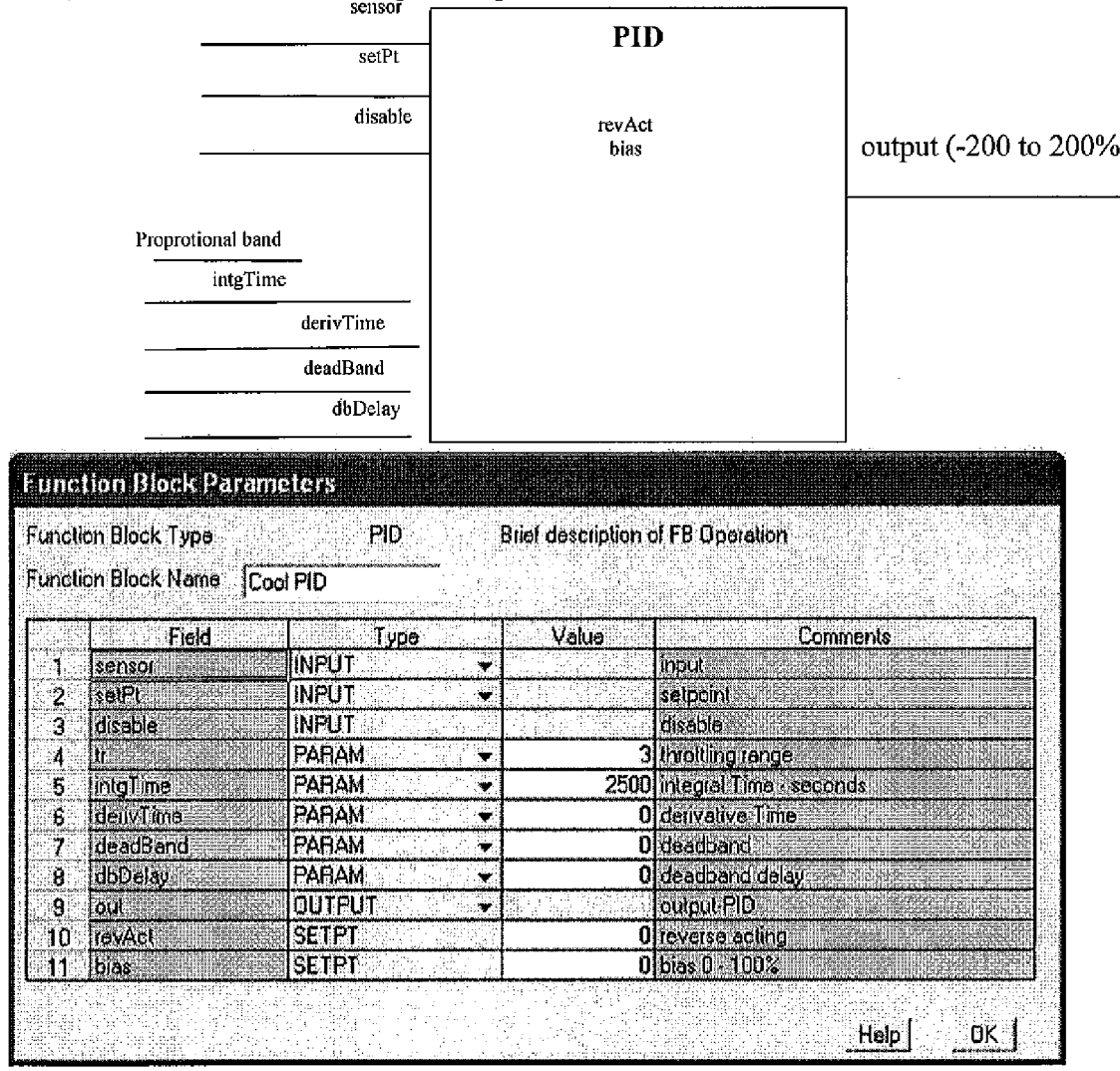

Output range -200 to +200 %

$$\text{Output (\%)} = \text{bias} + Kp*\text{Err} + Kp/Ti \int_0^t (Err)dt + Kp*Td*dErr/dt$$

Configuration

1. The user specifies revAct: 0 = Direct acting, 1 = reverse acting.

| | | | |
|---|---|---|---|
| In1 | sensor | IN_PAR | input |
| In2 | setPt | IN_PAR | setpoint |
| In3 | disable | IN_ONLY | disable |
| Param1 | tr | PAR_IN | throttling range |
| Param2 | intgTime | PAR_IN | integral Time - seconds |
| Param3 | derivTime | PAR_IN | derivative Time |
| Param4 | deadBand | PAR_IN | deadband |

| | | | |
|---|---|---|---|
| Param5 | dbDelay | PAR_IN | deadband delay |
| Out1 | out | OUT_FLT | output-PID |
| paramByte1 | revAct | Ubyte | reverse acting |
| paramByte2 | bias | ubyte | bias 0 - 100% |

2. The user specifies the bias: 0 to 100%.

Explanation:
Cool PID takes input 1 cooling sensor value = 78, input 2 setpt = 76, and pid disable = false=0 and generates the industry accepted PID output in percent. The value is allowed to go over 100% to allow overdriving controls options. The Cooling signal output 1 is now 67%. Similarly, the Heating PID is disabled because the pid disable is true=1 and therefore the disabled pid output = 0.

Limit

This function limits the input to between the low and high limits.

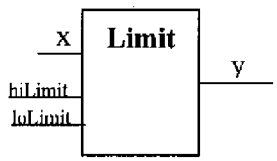

Output y = Limit (x, low limit, hi limit)

Configuration
1. None

| | | | |
|---|---|---|---|
| In1 | x | IN_PAR | input |
| Parm1 | hiLimit | IN_PAR | high Limit |
| Param2 | loLimit | IN_PAR | low Limit |
| Out1 | y | OUT_FLT | output-Limit |

| | Field | Type | Value | Comments |
|---|---|---|---|---|
| 1 | k | INPUT | | input |
| 2 | hiLimit | PARAM | 100 | high Limit |
| 3 | loLimit | PARAM | 0 | low Limit |
| 4 | y | OUTPUT | | output Limit |
| 5 | Not Used | | | |
| 6 | Not Used | | | |
| 7 | Not Used | | | |
| 8 | Not Used | | | |
| 9 | Not Used | | | |

Function Block Type: LIMIT
Function Block Name: DamperFLowCmd

Explanation:

In this case, Hi limit=100 and low limit=0 are configured as parameters (a fixed value as opposed to an input with connectable input values). The Raw flow command is limited from 0 to 100% for display and commend purposes.

FlowControl P3

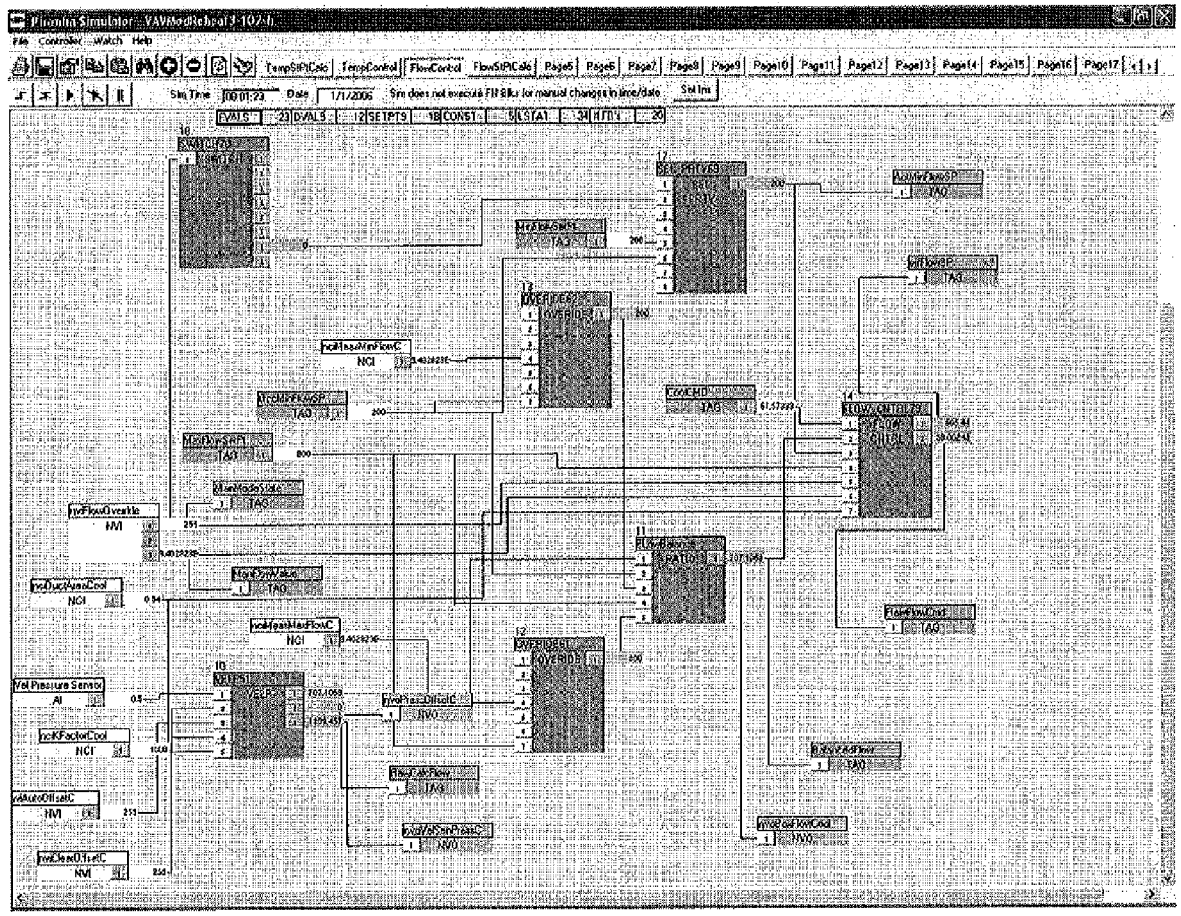

Switch- explanation:
nviFlowOverride is defined as follows:

nviManOverride.state= hvac_overid_t ;
    enumerations are defined as follows: off=0, position=1,FlowValue=2,
    FlowPercent=3,Open=4,Close=5,minimum=6,maximum=7,nul=255.
nviManOverride.percent = percent value
nviManOverride.flow = flow value in liters/second
In this case if the balancing sets the nviFlowOverride.state to minimum=7, then output7 (which is the output #6 if the first output is ouput 0)of Switch70=1 or enable. Otherwise the output7=0 as is the case in this example.

![Edit Input Network Variable Configuration dialog showing NV Name nviFlowOverride, Network Variable Class nvi (Dynamic Data), Fail Detect True, Number of Data Fields in NV 3, Select structured SNVT SNVT_hvac_overi, with fields: state (Unit-less, VAL-ubyte, VAL-ubyte), percent (Percentage, SNVT_lev_percent, %), flow (Unit-less, VAL-uint16, VAL-float)]

SelPriority

*Priority Select*

This function allows 1 to 4 inputs in any combination to be individually enabled to override the default. The output is the input with its highest priority enable TRUE.

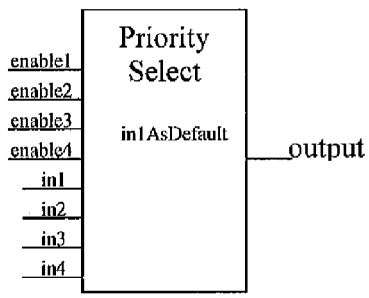

Configuration

1. The user specifies if input 1 should be used as the default (Yes/No). If none of the enable

| In1 | enable1 | IN_ONLY | enable 1 |
| In2 | enable2 | IN_ONLY | enable 2 |
| In3 | enable3 | IN_ONLY | enable 3 |
| In4 | enable4 | IN_ONLY | enable 4 |
| In5 | in1 | IN_PAR | Input 1 |
| In6 | in2 | IN_PAR | Input 2 |
| In7 | in3 | IN_PAR | input 3 |
| In8 | in4 | IN_PAR | Input 4 |
| Out1 | out | OUT_FLT | output-Select priority |
| Param byte | In1AsDefault | byte | yes/no | inputs are true and input 1 is configured to be the default, then the output is set to input 1. If none of the enable inputs are true and input 1 is not the default, then the output is set to Invalid

Function Block Parameters

Function Block Type: SEL_PRTY — Brief description of FB Operation
Function Block Name: SEL_PRTY69

| # | Field | Type | Value | Comments |
|---|---|---|---|---|
| 1 | enable1 | INPUT | | enable 1 |
| 2 | enable2 | INPUT | | enable 2 |
| 3 | enable3 | INPUT | | enable 3 |
| 4 | enable4 | INPUT | | enable 4 |
| 5 | in1 | INPUT | | input 1 |
| 6 | in2 | INPUT | | input 2 |
| 7 | in3 | INPUT | | input 3 |
| 8 | in4 | INPUT | | input 4 |
| 9 | out | OUTPUT | | output-Select priority |
| 10 | In1AsDefault | SETPT | 1 | yes/no |

Explanation:

In this case input 2 from switch 70 is false so then we use the input1 value of MinFlowSP of 200. If in another case input 2 enable2 is true from switch 70 indicating minimum manual flow mode then the out would use input2 which is connected to OccMinFlowSP.

Override

| In1 | priority1val | IN_PAR | priority 1 value |
| In2 | priority2val | IN_PAR | priority 2 value |
| In3 | priority3val | IN_PAR | priority 3 value |
| In4 | priority4val | IN_PAR | priority 4 value |
| In5 | priority5val | IN_PAR | priority 5 value |

| | | | |
|---|---|---|---|
| In6 | priority6val | IN_PAR | priority 6 value |
| In7 | cntrlInput | IN_PAR | controller input |
| Paramter1 | defaultValue | PAR_IN | default value |
| Out1 | effOutput | OUT_FLT | output-Override |

Explanation:
In this Example input4 priority4 value is set to invalid (3.402823E+38) so the value used is the cntrlInput value of 800 cfm from the MaxFlowSetPt. Therefore output1 = effOutput = 800 cfm for the max flow setpoint. If nciMeasMaxFlowC is set to a value for balancing, that number will be used.

Velp

*Flow Velocity (from Pressure)*

This function computes the flow and velocity based on the measured pressure and the K factor.

$$flow = K\sqrt{\Delta P - offset}$$

and $$vel = \frac{flow}{Area}$$

Where:
K=Flow coefficient (K-Factor) representing the actual flow in ft^3/min corresponding to a velocity pressure sensor output of 1" w.g.
$\Delta P$=flow sensor output pressure in inches water gauge (inW).
Offset=a correction pressure (inW) to adjust for zero.
Flow=airflow in ft^3/min (CFM)
vel=flow velocity in ft/min
Area = duct area in ft^2.

K-Factor is often used in terminal unit controls to calculate actual airflow.

Setting the autoSetOffset to a non-zero number results in the current pressure being stored as an offset that will be subtracted from the current pressure. The Offset can be cleared by setting the clear offset to a non-zero number.
If the pressure is within 0.002425 inW of zero (approximately 50 fpm) then set the output flow and velocity to 0.

Consistent units must be used. For example, if p is 1.02 inches water column, and if the offset is .02 inches water column, K is 1015, and the area is 0.54 square feet (10 inch diameter), then the flow will be 1015 feet per minute, and velocity will be 1879 feet per minute.

From iteration to iteration, the Function Block keeps track of the last state of the auto set offset. On power up/reset this is set to TRUE so that auto offset cannot be executed on a reset or power up.

The following is a VELP function explanation. From iteration to iteration, the function block keeps track of the last state of the auto set offset. On power up/reset, this is set to TRUE so that the auto offset cannot be executed on a reset or power up.

```
if(press != FL_INVALID)
{
        if(autoSetOffset)
        {
                offset=press
                store offset
        }
        if (kfactor != FL_INVALID)
                {
                if(press - offset<0)  flow = sqrt(offset -press)*kfactor;
                else   flow = sqrt(press - offset)*kfactor;
                //if close to zero then set output = 0
                //value of pressure for 50 fpm calculation:
                //v=k*sqrt(p)
                //assume k=1015 and v = 50 fpm, then sqrt(p)=0.04926, and p=0.002425
                if (press<0.002425 & press > -0.002425) flow = 0.0;
                if (area = FL_INVALID || area <= 0.0)
                        vel = FL_INVALID;
                else
                        vel = flow/area;
                }
        else
                {
                vel = FL_INVALID;
                flow = FL_INVALID;
                }
        }
        else
        {
                vel = FL_INVALID;
                FLOW = FL_INVALID;
        }
//Check to see if the offset value should be cleared
        if (clearOffset)       offset=0.0;
//save last state of auto set offset
        lastSetOffset = autoSetOffset;
```

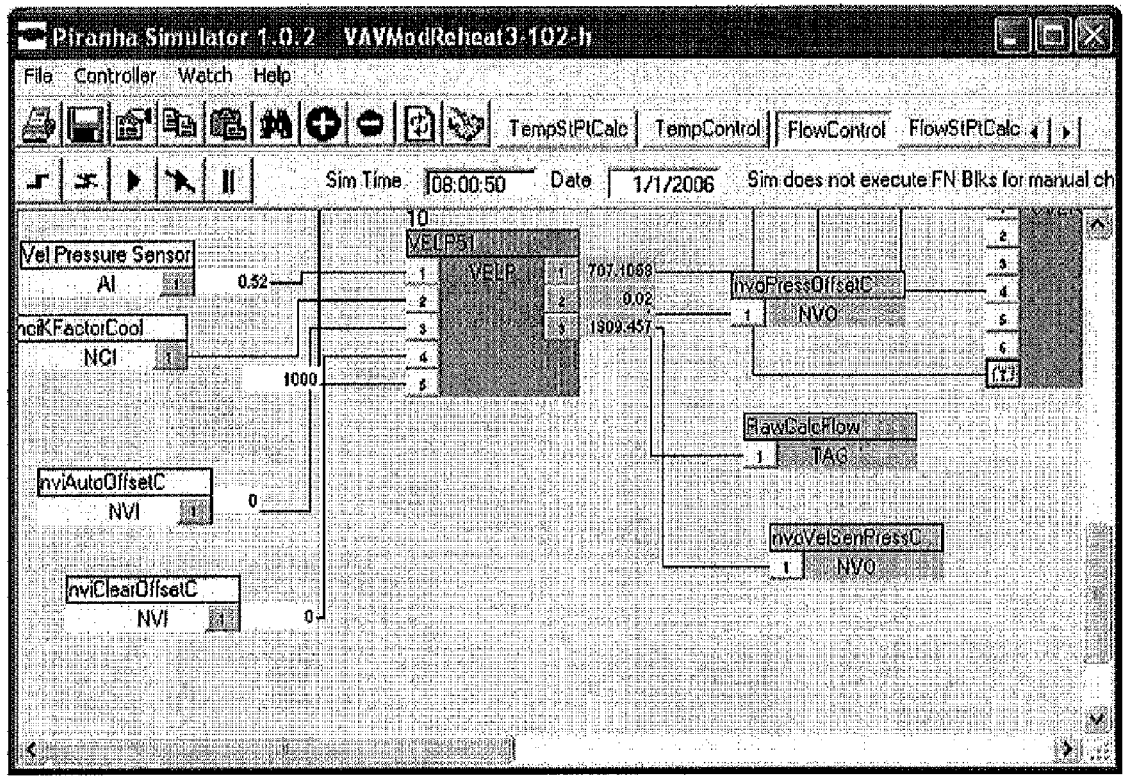

Explanation:
In this Example above, Vel Pressure sensor is 0.5 inw. Which is set to input1 press. Input 2 Kfactor is linked to nciKFactorCool which is set to 1000. Input3 is the nviAutoOffsetC which is set to 1 to set the zero offset that is stored in output 2. Since nviAutoOffsetC is set to 0, then no zero operation is being performed. nviClearOffsetC is set to 0 which clears the offset so the offset is stored as 0.02 in output 2. After the calculation of the pressure to flow equation, the output flow is 707.1068 cfm and the flow is 1309.457 feet per minute (FPM). The duct area is acquired from nciDuctAreaCool and is set to 0.54 square feet = 10 inch diameter round duct.

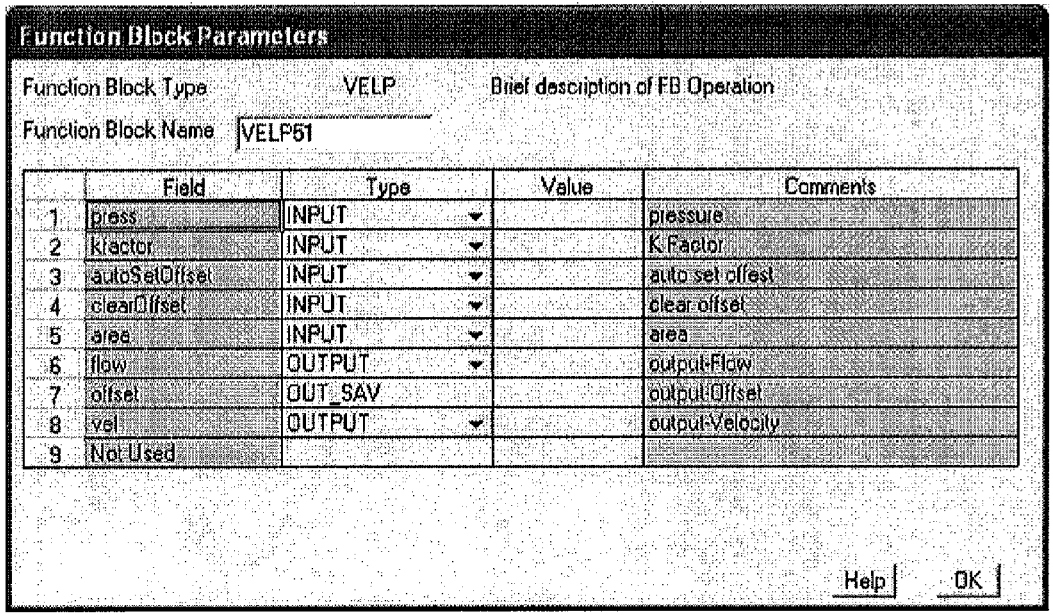

| | | | |
|---|---|---|---|
| In1 | press | IN_PAR | pressure |
| In2 | kfactor | PAR_IN | K Factor |
| In3 | autoSetOffset | IN_PAR | auto set offest |
| In4 | clearOffset | IN_PAR | clear offset |
| In5 | area | PAR_IN | area |
| Out1 | flow | OUT_FLT | output-Flow |
| Out2 | offset | OUT_FLT_SAV | output-Offset |
| Out3 | vel | OUT_FLT | output-Velocity |

Explanation:
In this Example above,Vel Pressure sensor is 0.5 inw. Which is set to input1 press. Input 2 Kfactor is linked to nciKFactorCool which is set to 1000. Input3 is the nviAutoOffsetC which is set to 1 to set the zero offset that is stored in output 2. Since nviAutoOffsetC is set to 0, then no zero operation is being performed. nviClearOffsetC is set to 0 which clears the offset so the offset is stored as 0.02 in output 2. After the calculation of the pressure to flow equation, the output flow is 707.1068 cfm and the flow is 1309.457 feet per minute (FPM). The duct area is acquired from nciDuctAreaCool and is set to 0.54 square feet = 10 inch diameter round duct.

*Ratio*

This function converts the input X to the output Y based on the line defined by x1, y1 and x2,y2. $Y = y1 + (((x - x1) * (y2 - y1)) / (x2 - x1))$. If (x,x1,x2,y1, or y2 = INVALID) then y = invalid. Operation enumerations are: UNLIMITED=0, VAV_FLOW_BAL=1, ENDPT_LIMITED=2.
For VAV_FLOW_BAL to work correctly, (X2, Y2) must be greater than (X1, Y1), and both points must be in the first quadrant as shown in the figure below. If not, results will be as specified by the pseudo code.
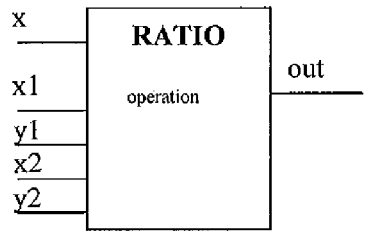
The operation selection determines how the output is computed:
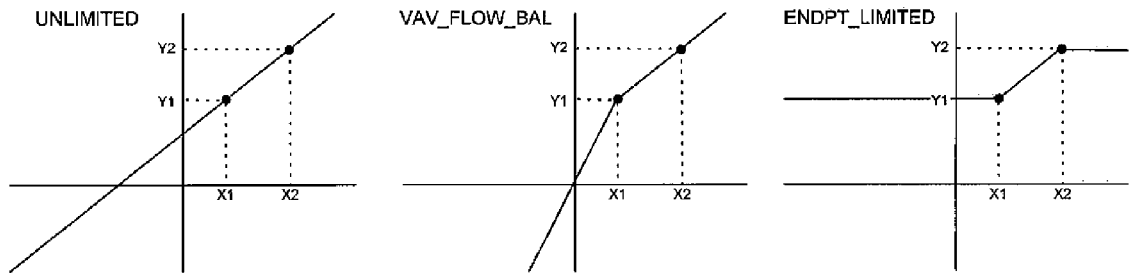
Configuration
1. The user specifies the Operation. UNLIMITED=0, VAV_FLOW_BAL=1, ENDPT_LIMITED=2.

Function Block Parameters

| Function Block Type: | RATIO | Brief description of FB Operation: |
| --- | --- | --- |
| Function Block Name: | FLowBalance | |

| | Field | Type | Value | Comments |
| --- | --- | --- | --- | --- |
| 1 | x | INPUT | | x |
| 2 | x1 | INPUT | | in x1 |
| 3 | y1 | INPUT | | in y1 |
| 4 | x2 | INPUT | | in x2 |
| 5 | y2 | INPUT | | in y2 |
| 6 | out | OUTPUT | | output-Ratio |
| 7 | Not Used | | | |
| 8 | Not Used | | | |
| 9 | Not Used | | | |
| 10 | operation | SETPT | 1 | 0=unlimited, 1=vavFlowBal, 2=endpt Limit |

| | | | |
| --- | --- | --- | --- |
| In1 | x | IN_PAR | x |
| In2 | x1 | IN_PAR | in x1 |
| In3 | y1 | IN_PAR | in y1 |
| In4 | x2 | IN_PAR | in x2 |
| In5 | y2 | IN_PAR | in y2 |
| Out1 | out | OUT_FLT | output-Ratio |
| Param1 | operation | RatioOp | 0=unlimited, 1=vavFlowBal, 2=endpt Limited |

Explanation:
In this Example input 1 = x=707.1068 cfm from the velp which is the flow value in cfm, x1=OccMinFlowSp=200, y1=OccMinFlowMeasSP or nciMeaseMinFlowC if it is available from the override 62, y2 is the MaxFlowSetpt or nciMeasMaxFlowC if it is available from override 61. the output is calculated to be 707 cfm.

FlowStPtCalc Page 4

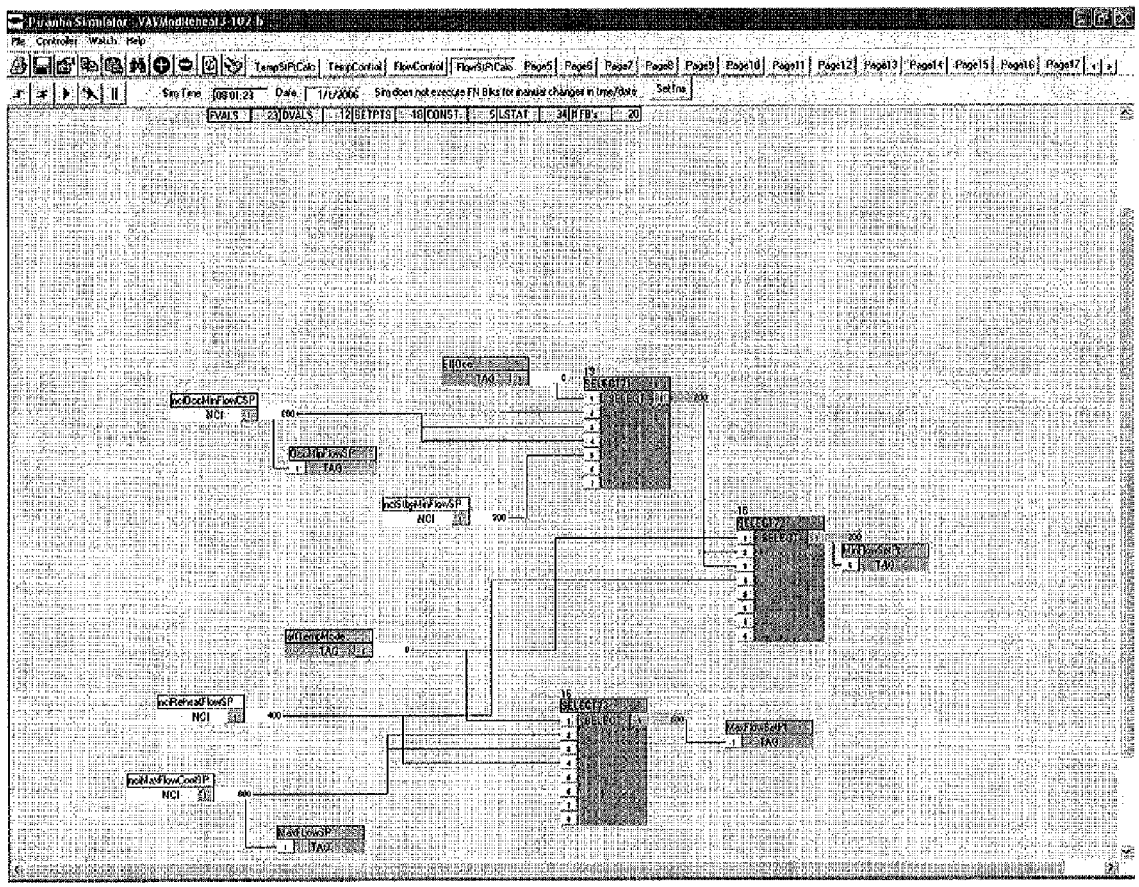

Select

*Select*

This function selects one of the 6 input values to be transferred to the output. The input selected depends on the values of x and the offset. The default input allows multiple Select function blocks to be tied together by chaining the output of one block to the default input of the next. When Select function blocks are chained, all chained blocks receive the same input, but different offsets, so they examine different ranges of the input value. When [x-offset] selects one of the 6 inputs, the output equals the value on input[x-offset]. Otherwise, the output equals the value on the default input. If nothing is connected, the output is invalid

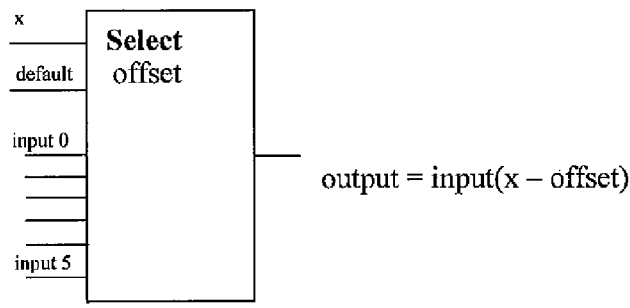
output = input(x − offset)
Configuration
1. The user specifies the offset from 0 to 255.
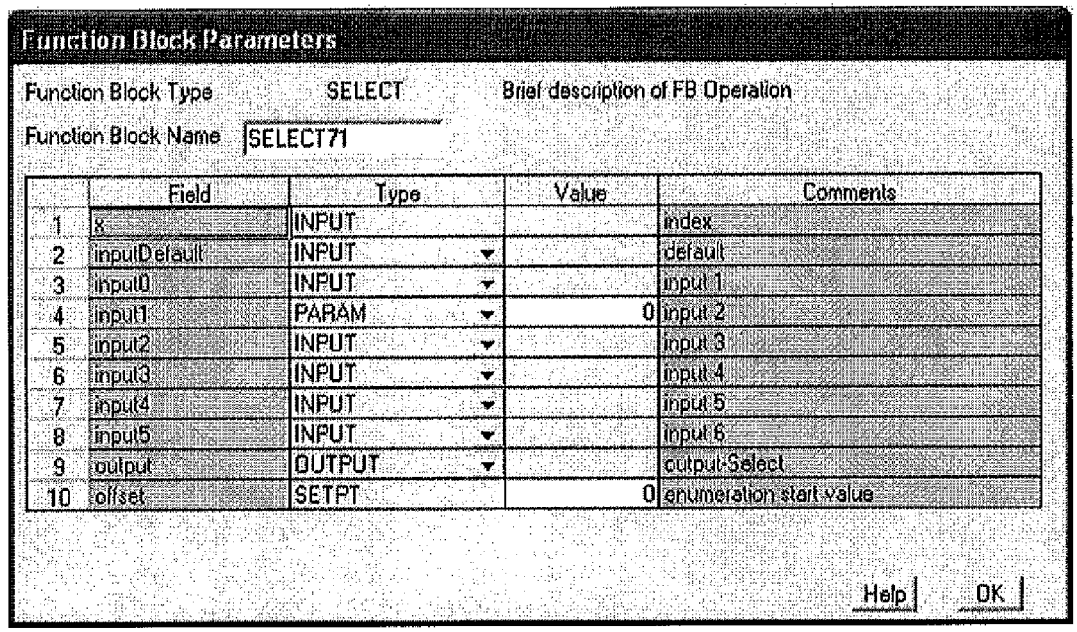
| Input1 | x | IN_ONLY | index |
| In2 | inputDefault | IN_PAR | default |
| In3 | input0 | IN_PAR | input 1 |
| Param1 | input1 | IN_PAR | input 2 |
| In4 | input2 | IN_PAR | input 3 |
| In5 | input3 | IN_PAR | input 4 |
| In6 | input4 | IN_PAR | input 5 |
| In7 | input5 | IN_PAR | input 6 |
| Out1 | output | OUT_FLT | output-Select |
| config | offset | ubyte | enumeration start value |

Function Block Parameters

Function Block Type: SELECT — Brief description of FB Operation
Function Block Name: SELECT72

| | Field | Type | Value | Comments |
|---|---|---|---|---|
| 1 | x | INPUT | | index |
| 2 | inputDefault | INPUT | | default |
| 3 | input0 | INPUT | | input 1 |
| 4 | input1 | INPUT | | input 2 |
| 5 | input2 | INPUT | | input 3 |
| 6 | input3 | INPUT | | input 4 |
| 7 | input4 | INPUT | | input 5 |
| 8 | input5 | INPUT | | input 6 |
| 9 | output | OUTPUT | | output-Select |
| 10 | offset | SETPT | 0 | enumeration start value |

| | | | | | |
|---|---|---|---|---|---|
| Input1 | x | IN_ONLY | index | | Explanation: |
| In2 | inputDefault | IN_PAR | default | | Select |
| In3 | input0 | IN_PAR | input 1 | | picks |
| In4 | input1 | IN_PAR | input 2 | 5 | the |
| In5 | input2 | IN_PAR | input 3 | | correct |
| In6 | input3 | IN_PAR | input 4 | | |
| In7 | input4 | IN_PAR | input 5 | | |
| In8 | input5 | IN_PAR | input 6 | | |
| Out1 | output | OUT_FLT | output-Select | 10 | |
| config | offset | ubyte | enumeration start value | | | minFlowSetpoint or MaxFlow setpoint based on effective occ.

FlowControl

*Damper Flow Control*

This function is a Variable Air Volume (VAV) Damper Flow Controller. Traditionally this is the second half of a pressure independent VAV box cascade control strategy where typically the input would come from the output of a PID block controlling space temperature.

This function calculates an effective flow control set point (effFlowSetPt) and outputs a 0-100% command to drive a VAV box damper. The commanded flow set point (in percent) from a temperature control signal is mapped into the effective flow set point such that 0% maps to the min flow set point and 100% maps to the max flow set point. The sensedFlowVol input is the volumetric flow into the box, if it is invalid (sensor fails) the damper will be driven in a "pressure dependant" mode where the output = 100%*(minSP/maxSP)+ (1-minSP/maxSP)*cmdPercent. If either flow MinSP, MaxSP is invalid, the output = 20% + .8*cmdPercent.

The Units parameter sets the units being used for the flow sensor, set points, and duct area where $0 = $ cfm(flow) and $ft^2$ (area), $1 = $ L/s(flow) and $m^2$(area), $2 = m^3/hr$(flow) and $m^2$(area). The cmdFlowPercent input is the input in percent from the temperature control logic. DuctArea is the duct area in units per the Units parameter selection. DuctArea is required for the control algorithm. The control loop is implemented in air velocity in order to simplify loop tuning. The motorSpeed parameter is the time the actuator being used takes to travel a full 90 deg stroke in seconds (this is used to automatically adjust the control gains). The manFlowOverride input allows the flow set point to be selectively overridden based the following codes: (taken from snvt_hvac_overid)

0 and all others not listed = no override (normal operation)
2 = effFlowSetPt is set to the ManFlowValue input
6 = effFlowSetPt is set to the minFlowSetPt input
7 = effFlowSetPt is set to the maxFlowSetPt input Manual flow override is particularly useful when trying to make the box easy to be balanced.

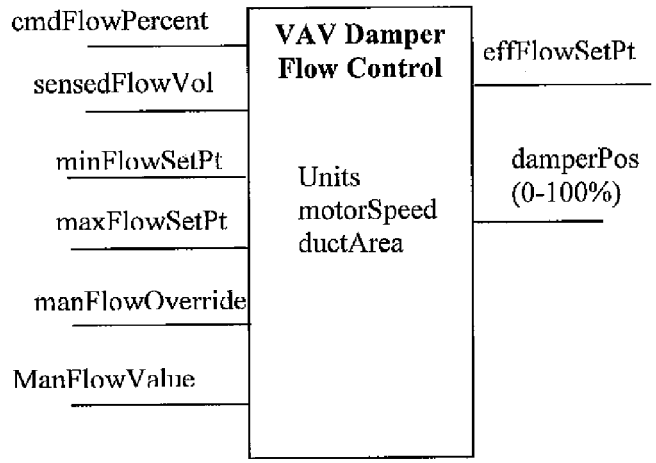

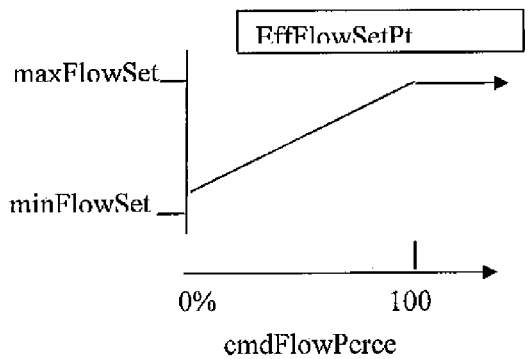

Configuration
1. The user specifies the units from 0 to 2. 0 = flow (cfm), area(ft2); 1 = flow (Lps), area (m2); 2 = flow (cmh), area (m**2). Default is zero (0).
2. The user specifies the motor speed from 1 to 255 seconds per 90 degrees. Default is 90.

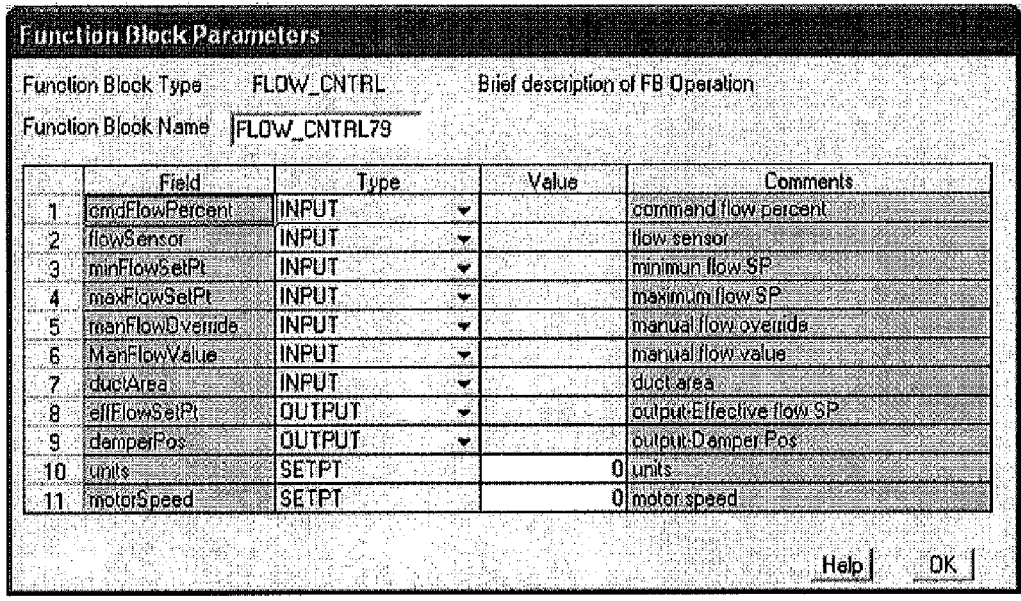

| | | | |
|---|---|---|---|
| In1 | cmdFlowPercent | IN_PAR | command flow percent |
| In2 | flowSensor | IN_PAR | flow sensor |
| In3 | minFlowSetPt | IN_PAR | minimun flow SP |
| In4 | maxFlowSetPt | IN_PAR | maximum flow SP |
| In5 | manFlowOverride | IN_PAR | manual flow override |
| In6 | ManFlowValue | IN_PAR | manual flow value |
| In7 | ductArea | PAR_IN | duct area |
| Out1 | effFlowSetPt | OUT_FLT | output-Effective flow SP |
| Out2 | damperPos | OUT_FLT | output-Damper Pos |
| Parambyte1 | units | Ubyte | units |
| Parambyte2 | motorSpeed | ubyte | motor speed |

Explanation:
Flow control controls a damper position based on a flow sensor input and a setpoint bounded by min and max flow and other parameters.

Example Analog Function Blocks-

*Minimum*

This function calculates the minimum of 8 inputs. The output is set to the smallest input.

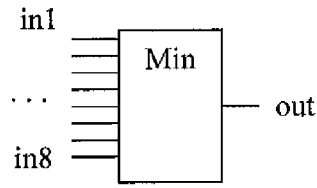

*Maximum*

This function calculates the maximum of 8 inputs. The output is set to the largest input.

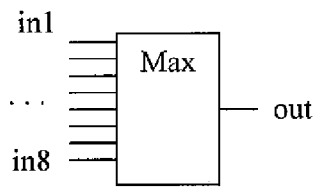

*Average*

This function calculates the average of 8 inputs. The output is set to the average of the inputs.

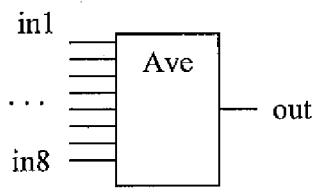

*Compare*

This function compares two inputs to each other. Input1 is compared to input2 as EQUAL, LESS_THAN or GREATER_THAN. There is an optional on and off hysteresis. Note it is possible to create invalid numbers by combining large values of input 2 and on and off hysteresis. The behavior is dependant on the operation selected, value of input 1, and the compiler.

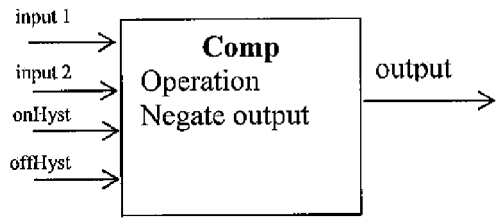

Compare Less Than
Output is set TRUE if input1 < input2 - onHyst.
Output is set FALSE if input1 >= input2 + offHyst.
Output does not change if (input2 - onHyst) <= input1 < (input2 +offHyst)

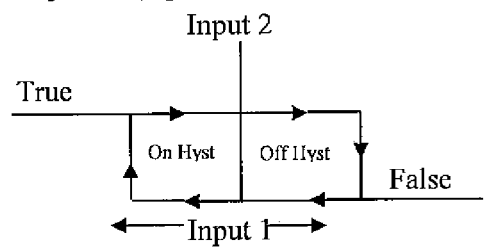

Compare Greater Than
Output is set TRUE if input1 > input2 + onHyst.
Output is set FALSE if input1 <= input2 - offHyst.
Output does not change if input1 <= input2 + onHyst && input1 > input2 - offHyst.

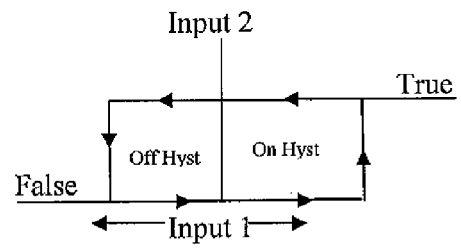

Compare Equal To
The output is set TRUE if: ( (in1 <= in2+OffHyst) && (in1 >= in2-OnHyst) )

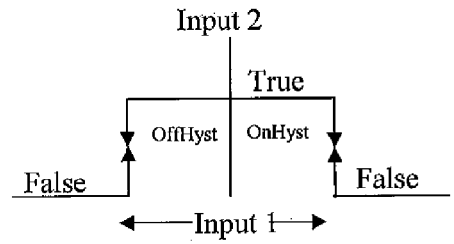

Regardless of the compare function type, there is an optional negate of the output. When negout is TRUE, the output is negated after performing the logic as specified above. The sense of the hysteresis settings does not change. When negation is selected, the old output (from the previous cycle) is determined by negating the current value of the output.

*Analog Latch*

This function latches the Y output to the value on the X input when the latch input transitions from FALSE to TRUE. The output is held at this value until the next FALSE to TRUE transition. At each FALSE to TRUE transition the Y output is latched to the current X input. If both the X and latch inputs are unconnected, the output Y will be zero (0). If the input is invalid, the output will transition to invalid when the latch input goes from FALSE to TRUE. The latch input can be negated to cause a TRUE to FALSE transition to latch X to Y. From iteration to iteration of the Function Block, the Analog Latch keeps track of the last state of the latch input so that it knows when a FALSE to TRUE transition occurs. On power up/reset the last latch value is set to FALSE, regardless of the negation configuration.

*Priority Select*

This function allows 1 to 4 inputs in any combination to be individually enabled to override the default. The output is the input with its highest priority enable TRUE. If no enables are TRUE, the output is set to the default.

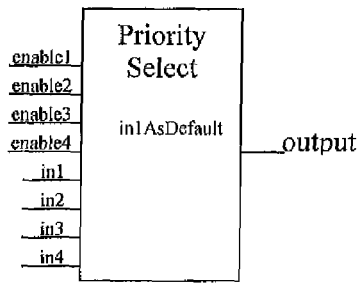

Hysteretic Relay

This function takes analog input in and sets the output TRUE at OnVal and FALSE at OffVal while honoring min on and off times. From iteration to iteration, the Function Block keeps track of the current minimum on or off time. On power up/reset this timer is cleared.

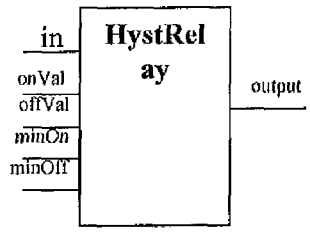

Switch

This function takes an enumerated type input and subtracts a user defined offset to determine which output to set TRUE, holding all others FALSE. The valid range of the input minus the offset is 0-7. The output [0-7] is TRUE if input − offset = X, otherwise it is FALSE.

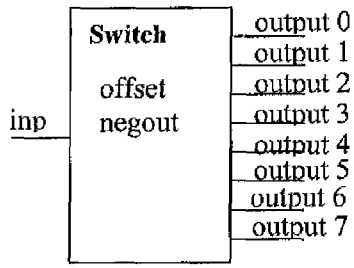

Select

This function selects one of the 6 input values to be transferred to the output. The input selected depends on the values of x and the offset. The default input allows multiple Select function blocks to be tied together by chaining the output of one block to the default input of the next. When Select function blocks are chained, all chained blocks receive the same input, but different offsets, so they examine different ranges of the input value. When [x-offset] selects one of the 6 inputs, the output equals the value on input[x-offset]. Otherwise, the output equals the value on the default input. If nothing is connected, the output is invalid

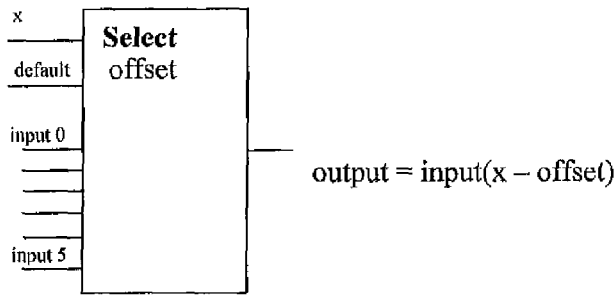

output = input(x − offset)

Example Logic Function Blocks

AND/NAND

This function is a 6 input AND or NAND. Each input may be individually inverted (NOT). Unconnected or invalid inputs default to TRUE, without negation, so as to have no effect on the result. From iteration to iteration, the Function Block keeps track of the last computed output value and the current true or false delay time. On power up/reset these are cleared.

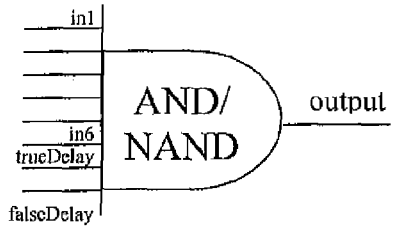

OR/NOR

This function is a 6 input OR or NOR. Each input may be individually inverted (NOT)). Unconnected or invalid inputs default to FALSE, without negation, so as to have no effect on the result. From iteration to iteration, the Function Block keeps track of the last computed output value and the current true or false delay time. On power up/reset these are cleared.

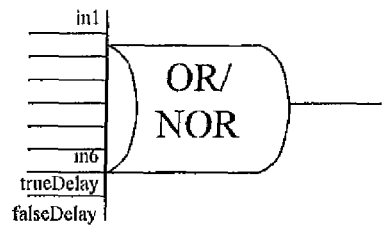

Exclusive OR/NOR

This function is a 6 input XOR or XNOR. Each input may be individually inverted (NOT). Unconnected or invalid inputs default to FALSE, without negation, so as to have no effect on the result. From iteration to iteration, the Function Block keeps track of the last computed output value and the current true or false delay time. On power up/reset these are cleared.

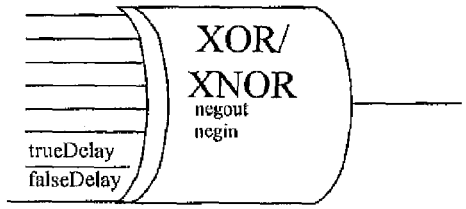

One Shot

This function is a one shot. When x transitions from FALSE to TRUE, y will be set to TRUE (1) for OnTime seconds. OnTime is limited to 0-65535 seconds. An OnTime of zero will keep the output OFF no matter what changes occur at the X input. Both the X input and Y output have an option to be negated. From iteration to iteration, the Function Block keeps track of the last input and the on time. On power up/reset these are cleared.

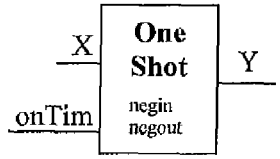

Example Math Function Blocks

Math functions operate on and produce single precision floating point numbers. In the absence of any other restrictions, if the result overflows the range of a single precision floating point number (approx -3.4e38 to 3.4e38) the result returned is invalid.

Add

This function adds the values on inputs. If the result overflows the range of a single precision floating point number (approx -3.4e38 to 3.4e38) the result returned is invalid.

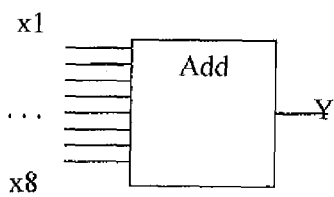

Subtract

This function subtracts one input from the other. Y = x1 – x2. If the result overflows the range of a single precision floating point number (approx -3.4e38 to 3.4e38) the result returned is invalid.

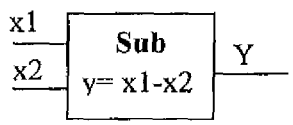

Multiply

This function multiplies one input with the other. y = x1 * x2. If the result overflows the range of a single precision floating point number (approx -3.4e38 to 3.4e38) the result returned is invalid.

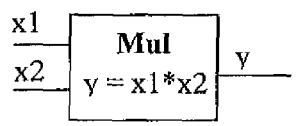

Divide

This function divides one input by the other. Y = x1 / X2. Division by 0 result in invalid output. If the result overflows the range of a single precision floating point number (approx -3.4e38 to 3.4e38) the result returned is invalid

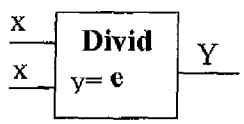

Square Root

This function takes the square root of the input. Y = √X. The behavior of a negative X input is controlled by the parameter negInvalid.

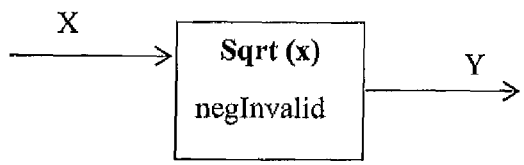

Exponential (a.k.a. Power)

This function raises y to the power of x. x and y are floating point numbers. The application designer is limited to two of these function blocks per device. Unassigned inputs are treated as 0. Invalid inputs result in an invalid output. The negInvalid input determines whether the operation should proceed with a negative base and non-integer exponent, operating on the absolute value of the base, or return invalid.

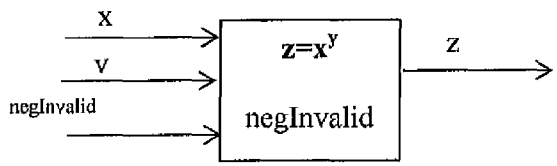

Digital Filter

This function digitally filters the input. $Y_{new} = Y_{old} + (X - Y_{old})*(1-\exp(-t/Tau))$. Where t = 1 sec and Tau is in seconds. The output can be initialized to zero (zeroInit=TRUE) or the first valid input value (zeroInit=FALSE). From iteration to iteration, the Function Block keeps track of the tau multiplier (1-exp(-t/Tau)). On power up/reset this is recalculated.

Enthalpy

This function computes the enthalpy (BTU/LB) based on the temperature (°F) and relative humidity (%). inputs. Relative humidity (rh) is limited to 0 to 100%. Temperature is in °F and is limited to 0-120°F.

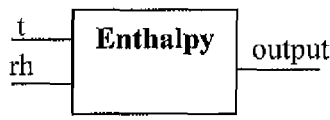

Ratio

This function converts the input X to the output Y based on the line defined by x1, y1 and x2, y2.
Y =y1 + (((x - x1) * (y2 - y1)) / (x2 - x1)). If (x,x1,x2,y1, or y2 = INVALID) then y = invalid.
Operation enumerations are: UNLIMITED=0, VAV_FLOW_BAL=1, ENDPT_LIMITED=2.
For VAV_FLOW_BAL to work correctly, (X2, Y2) must be greater than (X1, Y1), and both points must be in the first quadrant as shown in the figure below. If not, results will be as specified by the pseudo code.

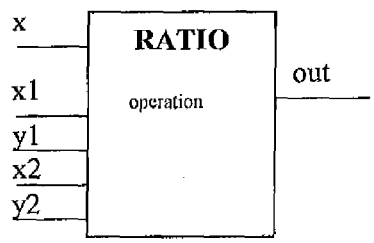

The operation selection determines how the output is computed:

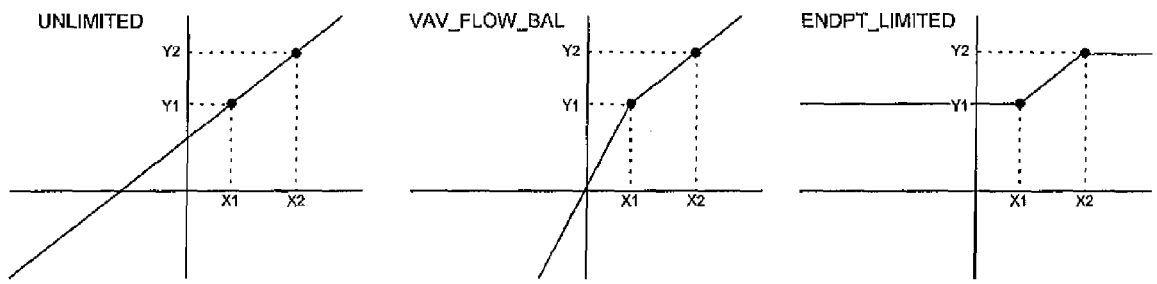

Limit

This function limits the input to between the low and high limits.

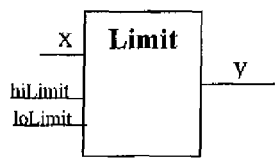

Reset

This function computes the reset value based on the relation of the input to the reset parameters.

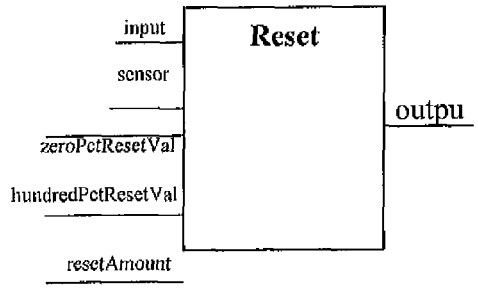

```
// reset sensor value between the zeroPctResetVal and the hundredPctResetVal
//
// restAmt___|          _____Max
//           |         /
//           |        /
//           |       /
//           |      /
//           |     /
//           |    /
//           |   /
//           |  /
// 0 reset __|/_____> sensor
//           |         |
//     zeroPctResetVal  hundredPctResetVal
```

Flow Velocity (from Pressure)

This function computes the flow and velocity based on the measured pressure and the K factor.

$$flow = K\sqrt{\Delta P - offset}$$

and $$vel = \frac{flow}{Area}$$

Where:

K=Flow coefficient (K-Factor) representing the actual flow in ft^3/min corresponding to a velocity pressure sensor output of 1" w.g.
ΔP=flow sensor output pressure in inches water gauge (inW).
Offset=a correction pressure (inW) to adjust for zero.
Flow=airflow in ft^3/min (CFM)
vel=flow velocity in ft/min
Area = duct area in ft^2.

K-Factor is often used in terminal unit controls to calculate actual airflow.

Setting the autoSetOffset to a non-zero number results in the current pressure being stored as an offset that will be subtracted from the current pressure. The Offset can be cleared by setting the clear offset to a non-zero number. If the pressure is within 0.002425 inW of zero (approximately 50 fpm) then set the output flow and velocity to 0.

Consistent units should be used. For example, if p is 1.02 inches water column, and if the offset is .02 inches water column, K is 1015, and the area is 0.54 square feet (10 inch diameter), then the flow will be 1015 feet per minute, and velocity will be 1879 feet per minute.

From iteration to iteration, the Function Block keeps track of the last state of the auto set offset. On power up/reset this is set to TRUE so that auto offset cannot be executed on a reset or power up.

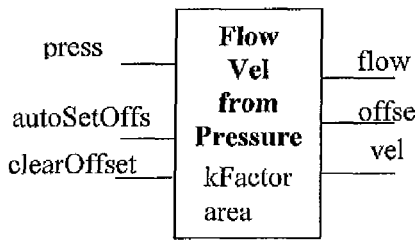

Example Control Function Blocks

All Control function blocks may have a default initialization behavior that will occur during power up. PID and others have an initialization input so that they can initialize under function block control.

*PID (Proportional Integral Derivative)*

This function is a Proportional Integral Derivative controller (PID).
Err = Sensor – Set Point
Kp = (Proportional Band)/100
Ti = Integral Time (seconds)
Td = Derivative Time (sec)
Bias = proportional offset (%)

$$\text{Output (\%)} = \text{bias} + Kp*Err + Kp/Ti \int_0^t (Err)dt + Kp*Td*dErr/dt$$

When Disable/Initialize input is TRUE, The Output and the integral are set to 0 and the block stops running. If Direct/Reverse is set to reverse, then Err term is set to –Err.
When Err < Dead band, Err is set to zero until Dead band Delay time has elapsed and Err is still in the dead band. To prevent integral wind up, the integral portion of the total error output is limited to 100%.

From iteration to iteration, the Function Block keeps track of the old proportional error, integral error, and dead band timer. On power up/reset these are cleared.

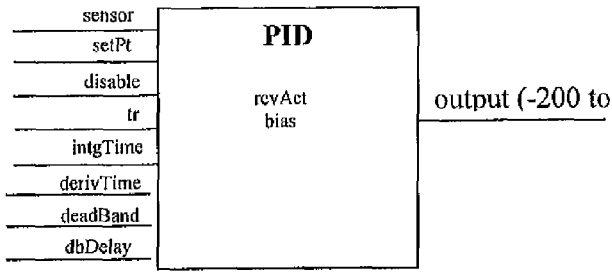

AIA (Adaptive Integral Action)

This function is an Adaptive Integral Action controller (AIA). In some cases, this can be used in place of PID. This control works better than PID when delays in the process being controlled cause integral wind-up resulting in under or overshoot that leads to instability. Err = Sensor − Set Point. If Direct/Reverse is set to reverse, then Err term is set to −Err. Tr(throttling range) is Error value that results in an Output change of the maximum value (MaxAOchange) from one step to the next. MaxAOchange is the maximum amount (%) that Output will change for a single cycle of the control (1 sec). This is typically set to 100%/ (actuator speed(sec/full stroke)). Deadband is the absolute value that Error must be greater than before the output will change.
EffErr = Err − dead band
If Err > 0 , ErrSign = 1 else ErrSign = −1
If |Err| < dead band, then AbsErr = 0.
Otherwise( |Err| > dead band), AbsErr = |Err| - deadband
Output = output + ErrSign*NonLin(AbsErr,ThrottlingRange,MaxAOchange,MinAOchange) .

From iteration to iteration, the Function Block keeps track of the old proportional error. On power up/reset this is cleared.

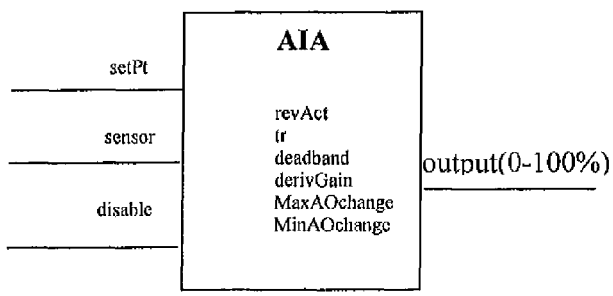

Stager/Thermostat Cycler

This function is a generic stage driver or a Thermostat Stage Cycler dependant on the value of the CPH parameter (cph=0 means stager functionality, and cph=1-60 gives thermostat cycler functionality).

The Cycler function is the traditional anticipator cycling algorithm used in Honeywell thermostats. Input is ether P or PI space temperature error in % (0-100). Standard (recommended) settings are cph=3 for cooling, cph = 6 for heating, anticAuth = 100%, hyst = 100%/maxstages/2. Also note that for multiple stage cyclers, the PID block feeding this function block should have an appropriately large throttling range to achieve smooth behavior.

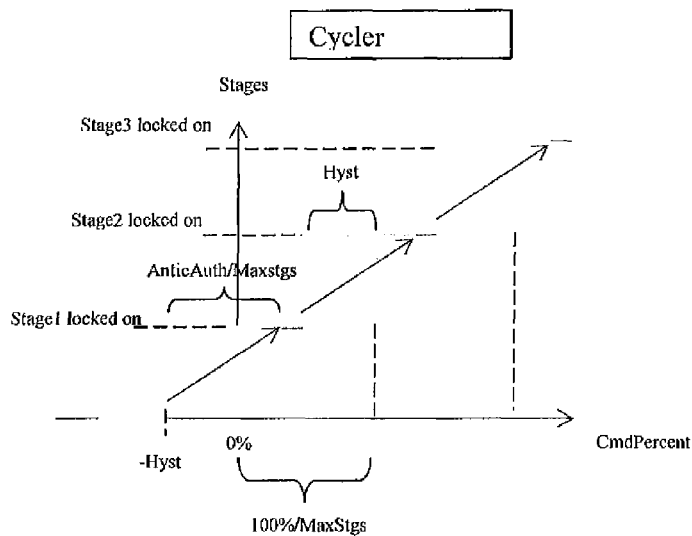

The Stager Function takes a 0-100% (typically PID error) input and determines how many stages to turn on. The 0-100% input range is divided evenly between how many stages are configured in MaxStages. The first stage is turned on at CmdPercent > 0 and off at CmdPercent < - Hyst. As shown in fig 18.1 below the general criterion for turning on stage N is:

$$\text{CmdPercent} > (N-1)*100\%/\text{MaxStages}.$$
For turning off stage N the criterion is:
$$\text{CmdPercent} < (N-1)*100\%/\text{MaxStages} - \text{Hyst}.$$

From iteration to iteration, the Function Block keeps track of the on timer, off timer, anticipator, and CPH multiplier. On power up/reset, the off timer and anticipator are cleared, the on timer is set equal to the inter-stage on time and the CPH multiplier is recalculated.

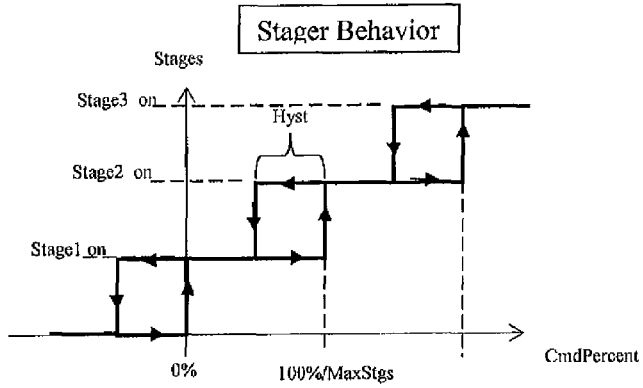

When override is true, active stages are shed (turned off) based on min on and interstage timers regardless of the CmdPercent input. Output is number of stages active (0-MaxStages) which can be sent to the StageDriver function block. Configuration parameters include:
- MaxStages is the maximum stages available to turn on.
- CPH (non-zero) is max cycle rate in Cycles Per Hour when input is halfway between stages available and AnticAuth is at default value (100%). CPH = 0 means the Stager logic is performed and has no other effect.
- Hyst is the switching differential around the switch points in % error. (Range: 0 < Hyst < 100/Maxstgs.)
- AnticAuth (cycler only (CPH != 0)) is the anticipator authority, which allows adjustment of the cycling behavior. It represents the max amount of "fake" error in % that is input into the switching logic when MaxStages are turned on. (Range 0 < AnticAuth < 200.)
- MinOnTime is minimum time a stage must be on once it is turned on.
- MinOffTime is minimum time a stage must be off once it is turned off.
- InterstageOn is minimum time before the next stage can be turned on after the previous one is turned on.
- InterstageOff is minimum time before the next stage can be turned off after the previous one is turned off.

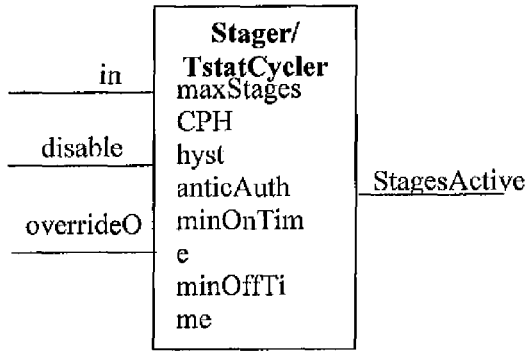

*StageDriver*

The StageDriverMaster function takes input number of stages active and determines which stages to energize or de-energize based on the lead/lag strategy chosen. StageDriver works with StageDriverAdd to distribute additional stages above those provided in StageDriver. StageDriver also maintains a nonvolatile runtime total and digital stage status information for each stage.

*Stage Driver Add*

The StageDriverAdd function takes input command from StageDriver and determines which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

*Rate Limit*

This function creates an output that follows the input but prevents the output from changing faster that the specified rates depending on direction.

The value StartInterval (sec) limits the output after the rate limit function is enabled (disable input set to 0) and the StartInteval time is still in process. Ratelimit uses the startVal input as the default output during disable.

If the rate limit function is disabled (disable input set to 1) the output will be set to StartVal.

After rateLimit is enabled (disable set to 0) then the StartInterval timer will count down from the StartInterval number of seconds and during this time the output will be rate limited..

When the timer is expired (and ratelimit is enabled) the out value will be exactly what the in is set to and there will no longer be rate limiting.

If the StartInterval seconds is set to 0 (and ratelimit is enabled), then the output will be Ratelimited.

During Ratelimit the output will move at a maximum allowed rate toward the new input value each second.

UpRate controls the rate in a more positive direction, and DownRate controls the rate in a more negative direction. UpRate set to zero means the uprate limit is not enforced. DownRate set to zero means the downrate limit is not enforced..

Out is set to StartVal before rate limiting is enabled (disable set to 0).

From iteration to iteration, the Function Block keeps track of the start timer On power/up/reset, this is set to the StartInterval.

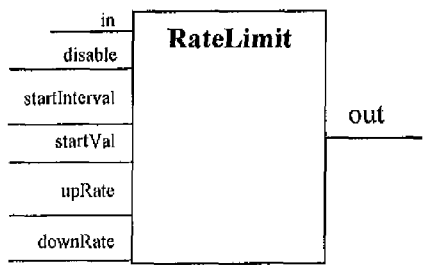

*VAV Damper Flow Control*

This function is a Variable Air Volume (VAV) Damper Flow Controller. Traditionally this is the second half of a pressure independent VAV box cascade control strategy where typically the input would come from the output of a PID block controlling space temperature. This function calculates an effective flow control set point (effFlowSetPt) and outputs a 0-100% command to drive a VAV box damper. The commanded flow set point (in percent) from a temperature control signal is mapped into the effective flow set point such that 0% maps to the min flow set point and 100%% maps to the max flow set point. The sensedFlowVol input is the volumetric flow into the box, if it is invalid (sensor fails) the damper will be driven in a "pressure dependant" mode mapping cmdFlowPercent directly to the output. The Units parameter sets the units being used for the flow sensor, set points, and duct area where 0 = cfm(flow) and $ft^2$ (area), 1 = L/s(flow) and $m^2$(area), 2 = $m^3$/hr(flow) and $m^2$(area). The cmdFlowPercent input is the input in percent from the temperature control logic. DuctArea is the duct area in units per the Units parameter selection. The motorSpeed parameter is the time the actuator being used takes to travel a full 90 deg stroke in seconds (this is used to automatically adjust the control gains). The manFlowOverride input allows the flow set point to be selectively overridden based the following codes: (taken from snvt_hvac_overid)

0 and all others not listed = no override (normal operation)
    2 = effFlowSetPt is set to the ManFlowValue input
    6 = effFlowSetPt is set to the minFlowSetPt input
    7 = effFlowSetPt is set to the maxFlowSetPt input Manual flow override is particularly useful when trying to make the box easy to be balanced.
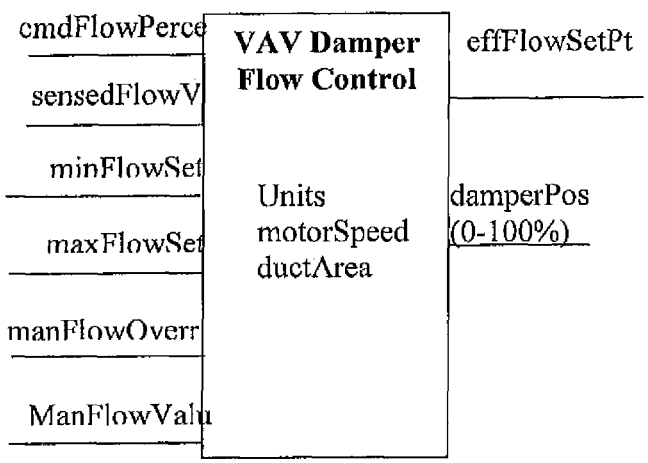
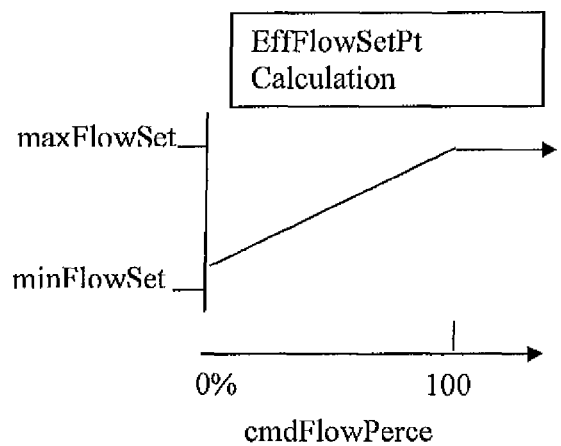

Example Zone Control Function Blocks

Occupancy Arbitrator

This function computes the current Effective Occupancy Current State and the Manual Override State.

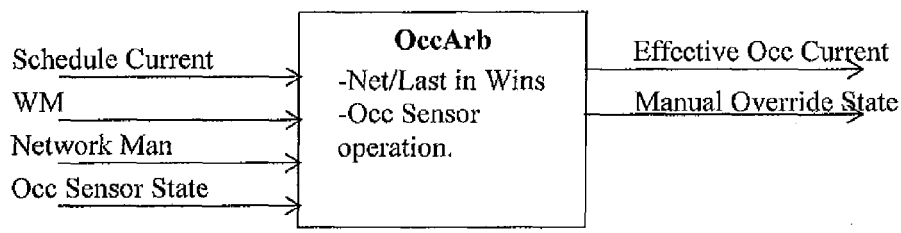

General Setpoint Calculator

This function does generic setpoint calculation, including reset. It uses the 3 configuration parameters, effective occupancy, current state, and reset input to calculate the effective setpoint.

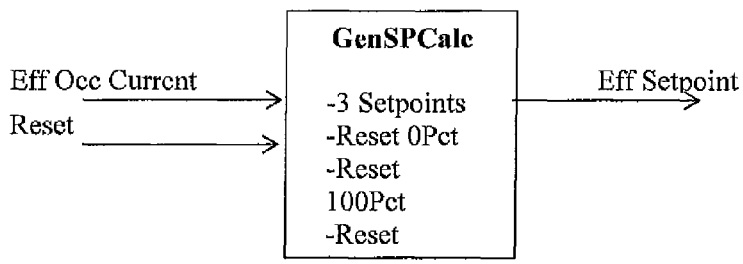

Temperature Setpoint Calculator

This function calculates the current Effective Heat setpoint and Effective Cool setpoint based on the current schedule information, occupancy override, and intelligent recovery information.

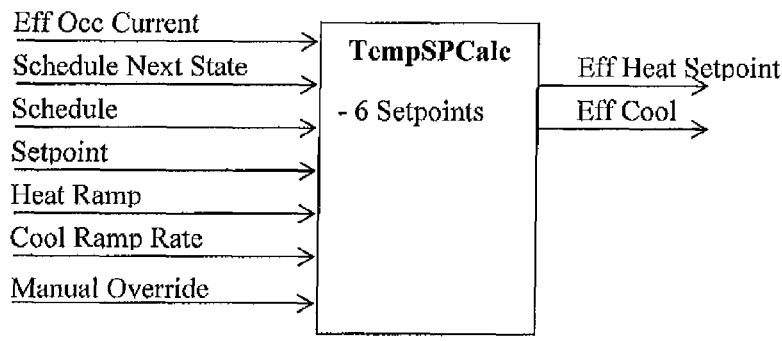

Set Temperature Mode

This function automatically calculates the effective temperature control mode based on the control type, system switch setting, network mode command, temperature set points, supply temperature and space temperature. From iteration to iteration, the Function Block keeps track of the previous application mode and the effective temperature mode. On power up/reset these are cleared.

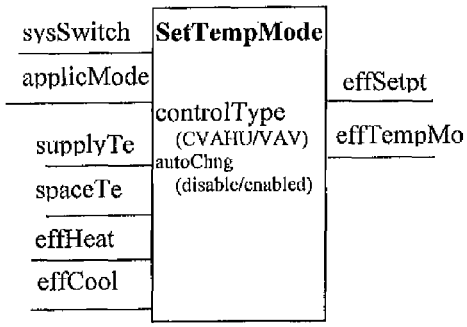

effTempMode indicates the current Mode determined by input states and arbitrated by control logic. SetTempMode does not generate all the possible Modes available. The valid enumerated values have the following meanings:

| effTempMode | Meaning |
|---|---|
| COOL=0 | Cool air is being supplied to the node via the central air supply and cooling energy is being supplied to the controlled space. |
| REHEAT=1 | Cool air is being supplied to the node via the central air supply. The air is being reheated by a local Heat source. |
| HEAT=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

Example Data Function Blocks

Override

This function sets the output to the highest priority input that is not invalid. The Highest priority input is priority1Value and the Lowest priority input is cntrlInput. If All inputs are invalid or Unconnected, then the output is set to defaultValue. This function block corresponds to the BACnet priority array implementation with the replacement of the BACnet "NULL" state with "invalid".

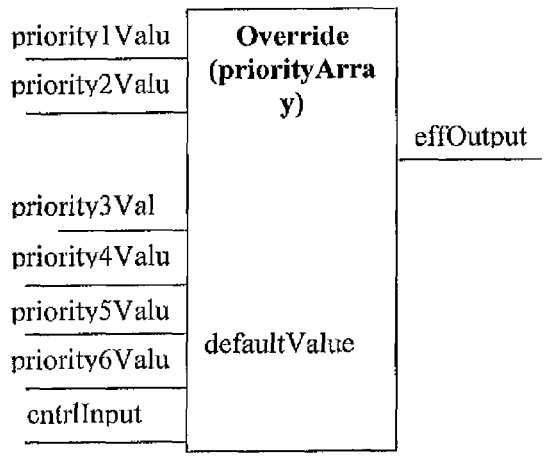

Run Time Accumulate

This function accumulates runtime whenever the input is TRUE (non zero) and the enable is TRUE. If Preset is TRUE, then runtime is set equal to the Preset Value. Runtime is provided in 4 outputs of seconds, minutes, hours and days. From iteration to iteration, the Function Block keeps track of the run time seconds. On power up/reset this is cleared.

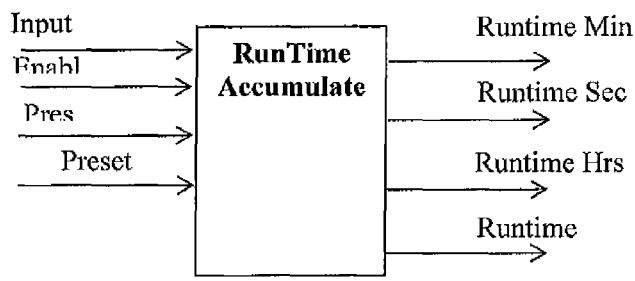

Counter

This function counts leading edge transitions of the input. If the enable is TRUE and the input transitions from FALSE to TRUE, then count is incremented or decremented by the count Value.

Positive values on count value increment the count. Negative values decrement the count. If preset is TRUE, then count is set to the Preset Value. From iteration to iteration, the Function Block keeps track of the previous state of the input so that it can detect a transition. On power up/reset this is cleared.

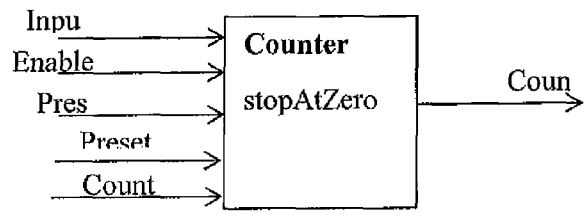

*Alarm*

This function creates an alarm based on the value of the input compared to the high and low limits. The user may create up to 32 alarm Function Blocks that will map into nvoError. From iteration to iteration, the Function Block keeps track of the alarm status and delay timer. On power up/reset these are cleared.

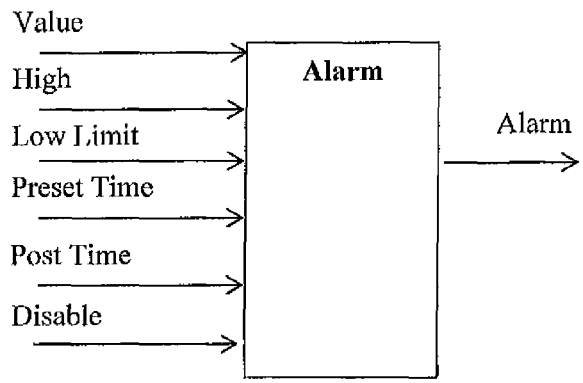

FUNCTION BLOCK TABLE

| FBID | FBName | FieldType | Description | IOCfg |
|---|---|---|---|---|
| 7 | AND | 01LoopType | type | |
| 7 | AND | 02LoopStaticID | spare | |
| 7 | AND | 03Variable1 | in1 | IN_ONLY |
| 7 | AND | 04Variable2 | in2 | IN_ONLY |
| 7 | AND | 05Variable3 | in3 | IN_ONLY |
| 7 | AND | 06Variable4 | in4 | IN_ONLY |
| 7 | AND | 07Variable5 | in5 | IN_ONLY |

| FBID | FBName | FieldType | Description | IOCfg |
|---|---|---|---|---|
| 7 | AND | 08Variable6 | in6 | IN_ONLY |
| 7 | AND | 09Variable7 | trueDelay | PAR_IN |
| 7 | AND | 10Variable8 | falseDelay | PAR_IN |
| 7 | AND | 11Variable9 | out | OUT_DIG |
| 7 | AND | 12EndByte1 | negin | |
| 7 | AND | 13EndByte2 | negout | |
| 9 | OR | 01LoopType | type | |
| 9 | OR | 02LoopStaticID | spare | |
| 9 | OR | 03Variable1 | in1 | IN_ONLY |
| 9 | OR | 04Variable2 | in2 | IN_ONLY |
| 9 | OR | 05Variable3 | in3 | IN_ONLY |
| 9 | OR | 06Variable4 | in4 | IN_ONLY |
| 9 | OR | 07Variable5 | in5 | IN_ONLY |
| 9 | OR | 08Variable6 | in6 | IN_ONLY |
| 9 | OR | 09Variable7 | trueDelay | PAR_IN |
| 9 | OR | 10Variable8 | falseDelay | PAR_IN |
| 9 | OR | 11Variable9 | out | OUT_DIG |
| 9 | OR | 12EndByte1 | negin | |
| 9 | OR | 13EndByte2 | negout | |

| FBID | FBName | FieldType | Description | IOCfg |
|---|---|---|---|---|
| 11 | XOR | 01LoopType | type | |
| 11 | XOR | 02LoopStaticID | spare | |
| 11 | XOR | 03Variable1 | in1 | IN_ONLY |
| 11 | XOR | 04Variable2 | in2 | IN_ONLY |
| 11 | XOR | 05Variable3 | in3 | IN_ONLY |
| 11 | XOR | 06Variable4 | in4 | IN_ONLY |
| 11 | XOR | 07Variable5 | in5 | IN_ONLY |
| 11 | XOR | 08Variable6 | in6 | IN_ONLY |
| 11 | XOR | 09Variable7 | trueDelay | PAR_IN |
| 11 | XOR | 10Variable8 | falseDelay | PAR_IN |
| 11 | XOR | 11Variable9 | out | OUT_DIG |
| 11 | XOR | 12EndByte1 | negin | |
| 11 | XOR | 13EndByte2 | negout | |
| 13 | ONESHOT | 01LoopType | type | |
| 13 | ONESHOT | 02LoopStaticID | spare | |
| 13 | ONESHOT | 03Variable1 | in | IN_ONLY |
| 13 | ONESHOT | 04Variable2 | onTime | PAR_IN |
| 13 | ONESHOT | 05Variable3 | out | OUT_DIG |
| 13 | ONESHOT | 06Variable4 | unused1 | UNUSED |
| 13 | ONESHOT | 07Variable5 | unused2 | UNUSED |
| 13 | ONESHOT | 08Variable6 | unused3 | UNUSED |
| 13 | ONESHOT | 09Variable7 | unused4 | UNUSED |
| 13 | ONESHOT | 10Variable8 | unused5 | UNUSED |
| 13 | ONESHOT | 11Variable9 | unused6 | UNUSED |
| 13 | ONESHOT | 12EndByte1 | negin | |
| 13 | ONESHOT | 13EndByte2 | negout | |

| FBID | FBName | FieldType | Description | IOCfg |
|---|---|---|---|---|
| 20 | MIN | 01LoopType | type | |

| | | | | |
|---|---|---|---|---|
| 20 | MIN | 02LoopStaticID | spare | |
| 20 | MIN | 03Variable1 | in1 | IN_PAR |
| 20 | MIN | 04Variable2 | in2 | IN_PAR |
| 20 | MIN | 05Variable3 | in3 | IN_PAR |
| 20 | MIN | 06Variable4 | in4 | IN_PAR |
| 20 | MIN | 07Variable5 | in5 | IN_PAR |
| 20 | MIN | 08Variable6 | in6 | IN_PAR |
| 20 | MIN | 09Variable7 | in7 | IN_PAR |
| 20 | MIN | 10Variable8 | in8 | IN_PAR |
| 20 | MIN | 11Variable9 | out | OUT_FLT |
| 20 | MIN | 12EndByte1 | | |
| 20 | MIN | 13EndByte2 | | |
| 21 | MAX | 01LoopType | type | |
| 21 | MAX | 02LoopStaticID | spare | |
| 21 | MAX | 03Variable1 | in1 | IN_PAR |
| 21 | MAX | 04Variable2 | in2 | IN_PAR |
| 21 | MAX | 05Variable3 | in3 | IN_PAR |
| 21 | MAX | 06Variable4 | in4 | IN_PAR |
| 21 | MAX | 07Variable5 | in5 | IN_PAR |
| 21 | MAX | 08Variable6 | in6 | IN_PAR |
| 21 | MAX | 09Variable7 | in7 | IN_PAR |
| 21 | MAX | 10Variable8 | in8 | IN_PAR |
| 21 | MAX | 11Variable9 | out | OUT_FLT |
| 21 | MAX | 12EndByte1 | | |
| 21 | MAX | 13EndByte2 | | |
| FBID | FBName | FieldType | Description | IOCfg |
| 22 | AVE | 01LoopType | type | |
| 22 | AVE | 02LoopStaticID | spare | |
| 22 | AVE | 03Variable1 | in1 | IN_PAR |
| 22 | AVE | 04Variable2 | in2 | IN_PAR |
| 22 | AVE | 05Variable3 | in3 | IN_PAR |
| 22 | AVE | 06Variable4 | in4 | IN_PAR |
| 22 | AVE | 07Variable5 | in5 | IN_PAR |
| 22 | AVE | 08Variable6 | in6 | IN_PAR |
| 22 | AVE | 09Variable7 | in7 | IN_PAR |
| 22 | AVE | 10Variable8 | in8 | IN_PAR |
| 22 | AVE | 11Variable9 | out | OUT_FLT |
| 22 | AVE | 12EndByte1 | | |
| 22 | AVE | 13EndByte2 | | |
| 23 | COMP | 01LoopType | type | |
| 23 | COMP | 02LoopStaticID | spare | |
| 23 | COMP | 03Variable1 | in1 | IN_PAR |
| 23 | COMP | 04Variable2 | in2 | IN_PAR |
| 23 | COMP | 05Variable3 | onHyst | PAR_IN |
| 23 | COMP | 06Variable4 | offHyst | PAR_IN |
| 23 | COMP | 07Variable5 | out | OUT_DIG |
| 23 | COMP | 08Variable6 | unused1 | UNUSED |
| 23 | COMP | 09Variable7 | unused2 | UNUSED |
| 23 | COMP | 10Variable8 | unused3 | UNUSED |

| | | | | |
|---|---|---|---|---|
| 23 | COMP | 11Variable9 | unused4 | UNUSED |
| 23 | COMP | 12EndByte1 | operation | |
| 23 | COMP | 13EndByte2 | negout | |

| FBID | FBName | FieldType | Description | IOCfg |
|---|---|---|---|---|
| 26 | ANA_LATCH | 01LoopType | type | |
| 26 | ANA_LATCH | 02LoopStaticID | spare | |
| 26 | ANA_LATCH | 03Variable1 | in | IN_PAR |
| 26 | ANA_LATCH | 04Variable2 | latch | IN_PAR |
| 26 | ANA_LATCH | 05Variable3 | out | OUT_FLT |
| 26 | ANA_LATCH | 06Variable4 | unused1 | UNUSED |
| 26 | ANA_LATCH | 07Variable5 | unused2 | UNUSED |
| 26 | ANA_LATCH | 08Variable6 | unused3 | UNUSED |
| 26 | ANA_LATCH | 09Variable7 | unused4 | UNUSED |
| 26 | ANA_LATCH | 10Variable8 | unused5 | UNUSED |
| 26 | ANA_LATCH | 11Variable9 | unused6 | UNUSED |
| 26 | ANA_LATCH | 12EndByte1 | negin | |
| 26 | ANA_LATCH | 13EndByte2 | | |
| 27 | SEL_PRTY | 01LoopType | type | |
| 27 | SEL_PRTY | 02LoopStaticID | spare | |
| 27 | SEL_PRTY | 03Variable1 | enable1 | IN_ONLY |
| 27 | SEL_PRTY | 04Variable2 | enable2 | IN_ONLY |
| 27 | SEL_PRTY | 05Variable3 | enable3 | IN_ONLY |
| 27 | SEL_PRTY | 06Variable4 | enable4 | IN_ONLY |
| 27 | SEL_PRTY | 07Variable5 | In1 | IN_PAR |
| 27 | SEL_PRTY | 08Variable6 | in2 | IN_PAR |
| 27 | SEL_PRTY | 09Variable7 | in3 | IN_PAR |
| 27 | SEL_PRTY | 10Variable8 | in4 | IN_PAR |
| 27 | SEL_PRTY | 11Variable9 | out | OUT_FLT |
| 27 | SEL_PRTY | 12EndByte1 | In1AsDefault | |
| 27 | SEL_PRTY | 13EndByte2 | | |

| FBID | FBName | FieldType | Description | IOCfg |
|---|---|---|---|---|
| 28 | HYSTREL | 01LoopType | type | |
| 28 | HYSTREL | 02LoopStaticID | spare | |
| 28 | HYSTREL | 03Variable1 | in | IN_PAR |
| 28 | HYSTREL | 04Variable2 | onVal | PAR_IN |
| 28 | HYSTREL | 05Variable3 | offVal | PAR_IN |
| 28 | HYSTREL | 06Variable4 | minOn | PAR_IN |
| 28 | HYSTREL | 07Variable5 | minOff | PAR_IN |
| 28 | HYSTREL | 08Variable6 | stgOut | OUT_DIG |
| 28 | HYSTREL | 09Variable7 | unused1 | UNUSED |
| 28 | HYSTREL | 10Variable8 | unused2 | UNUSED |
| 28 | HYSTREL | 11Variable9 | unused3 | UNUSED |
| 28 | HYSTREL | 12EndByte1 | | |
| 28 | HYSTREL | 13EndByte2 | | |
| 29 | SWITCH | 01LoopType | type | |
| 29 | SWITCH | 02LoopStaticID | spare | |
| 29 | SWITCH | 03Variable1 | sensor | IN_ONLY |
| 29 | SWITCH | 04Variable2 | out0 | OUT_DIG |

| FBID | FBName | FieldType | Description | IOCfg |
|---|---|---|---|---|
| 29 | SWITCH | 05Variable3 | out1 | OUT_DIG |
| 29 | SWITCH | 06Variable4 | out2 | OUT_DIG |
| 29 | SWITCH | 07Variable5 | out3 | OUT_DIG |
| 29 | SWITCH | 08Variable6 | out4 | OUT_DIG |
| 29 | SWITCH | 09Variable7 | out5 | OUT_DIG |
| 29 | SWITCH | 10Variable8 | out6 | OUT_DIG |
| 29 | SWITCH | 11Variable9 | out7 | OUT_DIG |
| 29 | SWITCH | 12EndByte1 | offset | |
| 29 | SWITCH | 13EndByte2 | negout | |
| FBID | FBName | FieldType | Description | IOCfg |
| 30 | SELECT | 01LoopType | type | |
| 30 | SELECT | 02LoopStaticID | spare | |
| 30 | SELECT | 03Variable1 | x | IN_ONLY |
| 30 | SELECT | 04Variable2 | inputDefault | IN_PAR |
| 30 | SELECT | 05Variable3 | input0 | IN_PAR |
| 30 | SELECT | 06Variable4 | input1 | IN_PAR |
| 30 | SELECT | 07Variable5 | input2 | IN_PAR |
| 30 | SELECT | 08Variable6 | input3 | IN_PAR |
| 30 | SELECT | 09Variable7 | input4 | IN_PAR |
| 30 | SELECT | 10Variable8 | input5 | IN_PAR |
| 30 | SELECT | 11Variable9 | output | OUT_FLT |
| 30 | SELECT | 12EndByte1 | offset | |
| 30 | SELECT | 13EndByte2 | | |
| 31 | ENCODE | 01LoopType | type | |
| 31 | ENCODE | 02LoopStaticID | out9 | |
| 31 | ENCODE | 03Variable1 | inEnum | IN_ONLY |
| 31 | ENCODE | 04Variable2 | disable | IN_PAR |
| 31 | ENCODE | 05Variable3 | in123 | PARAM |
| 31 | ENCODE | 06Variable4 | in456 | PARAM |
| 31 | ENCODE | 07Variable5 | in789 | PARAM |
| 31 | ENCODE | 08Variable6 | out123 | PARAM |
| 31 | ENCODE | 09Variable7 | out456 | PARAM |
| 31 | ENCODE | 10Variable8 | out | OUT_DIG |
| 31 | ENCODE | 11Variable9 | fire | OUT_DIG |
| 31 | ENCODE | 12EndByte1 | out7 | |
| 31 | ENCODE | 13EndByte2 | out8 | |
| FBID | FBName | FieldType | Description | IOCfg |
| 40 | ADD | 01LoopType | type | |
| 40 | ADD | 02LoopStaticID | spare | |
| 40 | ADD | 03Variable1 | x1 | IN_PAR |
| 40 | ADD | 04Variable2 | x2 | IN_PAR |
| 40 | ADD | 05Variable3 | x3 | IN_PAR |
| 40 | ADD | 06Variable4 | x4 | IN_PAR |
| 40 | ADD | 07Variable5 | x5 | IN_PAR |
| 40 | ADD | 08Variable6 | x6 | IN_PAR |
| 40 | ADD | 09Variable7 | x7 | IN_PAR |
| 40 | ADD | 10Variable8 | x8 | IN_PAR |
| 40 | ADD | 11Variable9 | y | OUT_FLT |

| FBID | FBName | FieldType | Description | IOCfg |
|---|---|---|---|---|
| 40 | ADD | 12EndByte1 | | |
| 40 | ADD | 13EndByte2 | | |
| 41 | SUB | 01LoopType | type | |
| 41 | SUB | 02LoopStaticID | spare | |
| 41 | SUB | 03Variable1 | x1 | IN_PAR |
| 41 | SUB | 04Variable2 | x2 | IN_PAR |
| 41 | SUB | 05Variable3 | unused1 | UNUSED |
| 41 | SUB | 06Variable4 | unused2 | UNUSED |
| 41 | SUB | 07Variable5 | unused3 | UNUSED |
| 41 | SUB | 08Variable6 | unused4 | UNUSED |
| 41 | SUB | 09Variable7 | unused5 | UNUSED |
| 41 | SUB | 10Variable8 | unused6 | UNUSED |
| 41 | SUB | 11Variable9 | y | OUT_FLT |
| 41 | SUB | 12EndByte1 | | |
| 41 | SUB | 13EndByte2 | | |

| FBID | FBName | FieldType | Description | IOCfg |
|---|---|---|---|---|
| 42 | MUL | 01LoopType | type | |
| 42 | MUL | 02LoopStaticID | spare | |
| 42 | MUL | 03Variable1 | x1 | IN_PAR |
| 42 | MUL | 04Variable2 | x2 | IN_PAR |
| 42 | MUL | 05Variable3 | unused1 | UNUSED |
| 42 | MUL | 06Variable4 | unused2 | UNUSED |
| 42 | MUL | 07Variable5 | unused3 | UNUSED |
| 42 | MUL | 08Variable6 | unused4 | UNUSED |
| 42 | MUL | 09Variable7 | unused5 | UNUSED |
| 42 | MUL | 10Variable8 | unused6 | UNUSED |
| 42 | MUL | 11Variable9 | y | OUT_FLT |
| 42 | MUL | 12EndByte1 | | |
| 42 | MUL | 13EndByte2 | | |
| 43 | DIV | 01LoopType | type | |
| 43 | DIV | 02LoopStaticID | spare | |
| 43 | DIV | 03Variable1 | x1 | IN_PAR |
| 43 | DIV | 04Variable2 | x2 | IN_PAR |
| 43 | DIV | 05Variable3 | unused1 | UNUSED |
| 43 | DIV | 06Variable4 | unused2 | UNUSED |
| 43 | DIV | 07Variable5 | unused3 | UNUSED |
| 43 | DIV | 08Variable6 | unused4 | UNUSED |
| 43 | DIV | 09Variable7 | unused5 | UNUSED |
| 43 | DIV | 10Variable8 | unused6 | UNUSED |
| 43 | DIV | 11Variable9 | y | OUT_FLT |
| 43 | DIV | 12EndByte1 | | |
| 43 | DIV | 13EndByte2 | | |

| FBID | FBName | FieldType | Description | IOCfg |
|---|---|---|---|---|
| 44 | SQRT | 01LoopType | type | |
| 44 | SQRT | 02LoopStaticID | spare | |
| 44 | SQRT | 03Variable1 | x1 | IN_ONLY |
| 44 | SQRT | 04Variable2 | negInvalid | PAR_IN |
| 44 | SQRT | 05Variable3 | unused1 | UNUSED |

| | | | | |
|---|---|---|---|---|
| 44 | SQRT | 06Variable4 | unused2 | UNUSED |
| 44 | SQRT | 07Variable5 | unused3 | UNUSED |
| 44 | SQRT | 08Variable6 | unused4 | UNUSED |
| 44 | SQRT | 09Variable7 | unused5 | UNUSED |
| 44 | SQRT | 10Variable8 | unused6 | UNUSED |
| 44 | SQRT | 11Variable9 | y | OUT_FLT |
| 44 | SQRT | 12EndByte1 | | |
| 44 | SQRT | 13EndByte2 | | |
| 45 | POW | 01LoopType | | |
| 45 | POW | 02LoopStaticID | spare | |
| 45 | POW | 03Variable1 | x | IN_ONLY |
| 45 | POW | 04Variable2 | y | IN_PAR |
| 45 | POW | 05Variable3 | negInvalid | PAR_IN |
| 45 | POW | 06Variable4 | z | OUT_FLT |
| 45 | POW | 07Variable5 | unused1 | UNUSED |
| 45 | POW | 08Variable6 | unused2 | UNUSED |
| 45 | POW | 09Variable7 | unused3 | UNUSED |
| 45 | POW | 10Variable8 | unused4 | UNUSED |
| 45 | POW | 11Variable9 | unused5 | UNUSED |
| 45 | POW | 12EndByte1 | | |
| 45 | POW | 13EndByte2 | | |

| FBID | FBName | FieldType | Description | IOCfg |
|---|---|---|---|---|
| 47 | DIG_FILT | 01LoopType | type | |
| 47 | DIG_FILT | 02LoopStaticID | spare | |
| 47 | DIG_FILT | 03Variable1 | x | IN_PAR |
| 47 | DIG_FILT | 04Variable2 | tau | PARAM |
| 47 | DIG_FILT | 05Variable3 | out | OUT_FLT |
| 47 | DIG_FILT | 06Variable4 | unused1 | UNUSED |
| 47 | DIG_FILT | 07Variable5 | unused2 | UNUSED |
| 47 | DIG_FILT | 08Variable6 | unused3 | UNUSED |
| 47 | DIG_FILT | 09Variable7 | unused4 | UNUSED |
| 47 | DIG_FILT | 10Variable8 | unused5 | UNUSED |
| 47 | DIG_FILT | 11Variable9 | unused6 | UNUSED |
| 47 | DIG_FILT | 12EndByte1 | zeroInit | |
| 47 | DIG_FILT | 13EndByte2 | | |
| 48 | ENTH | 01LoopType | type | |
| 48 | ENTH | 02LoopStaticID | spare | |
| 48 | ENTH | 03Variable1 | temp | IN_ONLY |
| 48 | ENTH | 04Variable2 | relhum | IN_ONLY |
| 48 | ENTH | 05Variable3 | enthout | OUT_FLT |
| 48 | ENTH | 06Variable4 | unused1 | UNUSED |
| 48 | ENTH | 07Variable5 | unused2 | UNUSED |
| 48 | ENTH | 08Variable6 | unused3 | UNUSED |
| 48 | ENTH | 09Variable7 | unused4 | UNUSED |
| 48 | ENTH | 10Variable8 | unused5 | UNUSED |
| 48 | ENTH | 11Variable9 | unused6 | UNUSED |
| 48 | ENTH | 12EndByte1 | | |
| 48 | ENTH | 13EndByte2 | | |

| FBID | FBName | FieldType | Description | IOCfg |
|---|---|---|---|---|
| 49 | RATIO | 01LoopType | type | |
| 49 | RATIO | 02LoopStaticID | spare | |
| 49 | RATIO | 03Variable1 | x | IN_PAR |
| 49 | RATIO | 04Variable2 | x1 | IN_PAR |
| 49 | RATIO | 05Variable3 | y1 | IN_PAR |
| 49 | RATIO | 06Variable4 | x2 | IN_PAR |
| 49 | RATIO | 07Variable5 | y2 | IN_PAR |
| 49 | RATIO | 08Variable6 | out | OUT_FLT |
| 49 | RATIO | 09Variable7 | unused1 | UNUSED |
| 49 | RATIO | 10Variable8 | unused2 | UNUSED |
| 49 | RATIO | 11Variable9 | unused3 | UNUSED |
| 49 | RATIO | 12EndByte1 | operation | |
| 49 | RATIO | 13EndByte2 | | |
| 50 | LIMIT | 01LoopType | type | |
| 50 | LIMIT | 02LoopStaticID | spare | |
| 50 | LIMIT | 03Variable1 | x | IN_PAR |
| 50 | LIMIT | 04Variable2 | hiLimit | IN_PAR |
| 50 | LIMIT | 05Variable3 | loLimit | IN_PAR |
| 50 | LIMIT | 06Variable4 | y | OUT_FLT |
| 50 | LIMIT | 07Variable5 | unused1 | UNUSED |
| 50 | LIMIT | 08Variable6 | unused2 | UNUSED |
| 50 | LIMIT | 09Variable7 | unused3 | UNUSED |
| 50 | LIMIT | 10Variable8 | unused4 | UNUSED |
| 50 | LIMIT | 11Variable9 | unused5 | UNUSED |
| 50 | LIMIT | 12EndByte1 | | |
| 50 | LIMIT | 13EndByte2 | | |

| FBID | FBName | FieldType | Description | IOCfg |
|---|---|---|---|---|
| 51 | RESET | 01LoopType | type | |
| 51 | RESET | 02LoopStaticID | spare | |
| 51 | RESET | 03Variable1 | input | IN_PAR |
| 51 | RESET | 04Variable2 | sensor | IN_PAR |
| 51 | RESET | 05Variable3 | zeroPctResetVal | PAR_IN |
| 51 | RESET | 06Variable4 | hundredPctResetVal | PAR_IN |
| 51 | RESET | 07Variable5 | resetAmount | PAR_IN |
| 51 | RESET | 08Variable6 | output | OUT_FLT |
| 51 | RESET | 09Variable7 | unused1 | UNUSED |
| 51 | RESET | 10Variable8 | unused2 | UNUSED |
| 51 | RESET | 11Variable9 | unused3 | UNUSED |
| 51 | RESET | 12EndByte1 | | |
| 51 | RESET | 13EndByte2 | | |
| 52 | VELP | 01LoopType | type | |
| 52 | VELP | 02LoopStaticID | spare | |
| 52 | VELP | 03Variable1 | press | IN_PAR |
| 52 | VELP | 04Variable2 | kfactor | PAR_IN |
| 52 | VELP | 05Variable3 | autoSetOffset | IN_PAR |
| 52 | VELP | 06Variable4 | clearOffset | IN_PAR |
| 52 | VELP | 07Variable5 | area | PAR_IN |
| 52 | VELP | 08Variable6 | flow | OUT_FLT |

| | | | | |
|---|---|---|---|---|
| 52 | VELP | 09Variable7 | offset | OUT_FLT_SAV |
| 52 | VELP | 10Variable8 | vel | OUT_FLT |
| 52 | VELP | 11Variable9 | unused1 | UNUSED |
| 52 | VELP | 12EndByte1 | | |
| 52 | VELP | 13EndByte2 | | |

| FBID | FBName | FieldType | Description | IOCfg |
|---|---|---|---|---|
| 60 | PID | 01LoopType | type | |
| 60 | PID | 02LoopStaticID | spare | |
| 60 | PID | 03Variable1 | sensor | IN_PAR |
| 60 | PID | 04Variable2 | setPt | IN_PAR |
| 60 | PID | 05Variable3 | disable | IN_ONLY |
| 60 | PID | 06Variable4 | tr | PAR_IN |
| 60 | PID | 07Variable5 | intgTime | PAR_IN |
| 60 | PID | 08Variable6 | derivTime | PAR_IN |
| 60 | PID | 09Variable7 | deadBand | PAR_IN |
| 60 | PID | 10Variable8 | dbDelay | PAR_IN |
| 60 | PID | 11Variable9 | out | OUT_FLT |
| 60 | PID | 12EndByte1 | revAct | |
| 60 | PID | 13EndByte2 | bias | |
| 61 | AIA | 01LoopType | type | |
| 61 | AIA | 02LoopStaticID | spare | |
| 61 | AIA | 03Variable1 | sensor | IN_PAR |
| 61 | AIA | 04Variable2 | setpt | IN_PAR |
| 61 | AIA | 05Variable3 | disable | IN_ONLY |
| 61 | AIA | 06Variable4 | tr | PAR_IN |
| 61 | AIA | 07Variable5 | deadBand | PAR_IN |
| 61 | AIA | 08Variable6 | maxAOChange | PAR_IN |
| 61 | AIA | 09Variable7 | derivGain | PAR_IN |
| 61 | AIA | 10Variable8 | minAOChange | PAR_IN |
| 61 | AIA | 11Variable9 | output | OUT_FLT |
| 61 | AIA | 12EndByte1 | revAct | |
| 61 | AIA | 13EndByte2 | | |

| FBID | FBName | FieldType | Description | IOCfg |
|---|---|---|---|---|
| 62 | CYCLER | 01LoopType | type | |
| 62 | CYCLER | 02LoopStaticID | anticAuth | |
| 62 | CYCLER | 03Variable1 | in | IN_PAR |
| 62 | CYCLER | 04Variable2 | maxStgs | PAR_IN |
| 62 | CYCLER | 05Variable3 | minOn | PAR_IN |
| 62 | CYCLER | 06Variable4 | minOff | PAR_IN |
| 62 | CYCLER | 07Variable5 | intstgOn | PAR_IN |
| 62 | CYCLER | 08Variable6 | intstgOff | PAR_IN |
| 62 | CYCLER | 09Variable7 | overrideOff | IN_ONLY |
| 62 | CYCLER | 10Variable8 | disable | IN_ONLY |
| 62 | CYCLER | 11Variable9 | stgsAct | OUT_DIG |
| 62 | CYCLER | 12EndByte1 | cph | |
| 62 | CYCLER | 13EndByte2 | hyst | |
| 63 | STAGER | 01LoopType | type | |
| 63 | STAGER | 02LoopStaticID | anticAuth | |

| FBID | FBName | FieldType | Description | IOCfg |
|---|---|---|---|---|
| 63 | STAGER | 03Variable1 | in | IN_PAR |
| 63 | STAGER | 04Variable2 | maxStgs | PAR_IN |
| 63 | STAGER | 05Variable3 | minOn | PAR_IN |
| 63 | STAGER | 06Variable4 | minOff | PAR_IN |
| 63 | STAGER | 07Variable5 | intstgOn | PAR_IN |
| 63 | STAGER | 08Variable6 | intstgOff | PAR_IN |
| 63 | STAGER | 09Variable7 | overrideOff | IN_ONLY |
| 63 | STAGER | 10Variable8 | disable | IN_ONLY |
| 63 | STAGER | 11Variable9 | stgsAct | OUT_DIG |
| 63 | STAGER | 12EndByte1 | cph | |
| 63 | STAGER | 13EndByte2 | hyst | |

| FBID | FBName | FieldType | Description | IOCfg |
|---|---|---|---|---|
| 64 | STAGEDRIV | 01LoopType | type | |
| 64 | STAGEDRIV | 02LoopStaticID | spare | |
| 64 | STAGEDRIV | 03Variable1 | nStgActive | IN_ONLY |
| 64 | STAGEDRIV | 04Variable2 | runtimeReset | IN_ONLY |
| 64 | STAGEDRIV | 05Variable3 | stage1 | OUT_DIG |
| 64 | STAGEDRIV | 06Variable4 | stage2 | OUT_DIG |
| 64 | STAGEDRIV | 07Variable5 | stage3 | OUT_DIG |
| 64 | STAGEDRIV | 08Variable6 | stage4 | OUT_DIG |
| 64 | STAGEDRIV | 09Variable7 | stage5 | OUT_DIG |
| 64 | STAGEDRIV | 10Variable8 | stgStatusOut | OUT_FLT |
| 64 | STAGEDRIV | 11Variable9 | offsets | OUT_FLT_SAV |
| 64 | STAGEDRIV | 12EndByte1 | leadLag | |
| 64 | STAGEDRIV | 13EndByte2 | maxStgs | |
| 65 | RATE_LIM | 01LoopType | type | |
| 65 | RATE_LIM | 02LoopStaticID | spare | |
| 65 | RATE_LIM | 03Variable1 | in | IN_ONLY |
| 65 | RATE_LIM | 04Variable2 | disable | IN_PAR |
| 65 | RATE_LIM | 05Variable3 | startVal | PAR_IN |
| 65 | RATE_LIM | 06Variable4 | upRate | PAR_IN |
| 65 | RATE_LIM | 07Variable5 | downRate | PAR_IN |
| 65 | RATE_LIM | 08Variable6 | startInterval | PAR_IN |
| 65 | RATE_LIM | 09Variable7 | out | OUT_FLT |
| 65 | RATE_LIM | 10Variable8 | unused1 | UNUSED |
| 65 | RATE_LIM | 11Variable9 | unused2 | UNUSED |
| 65 | RATE_LIM | 12EndByte1 | | |
| 65 | RATE_LIM | 13EndByte2 | | |

| FBID | FBName | FieldType | Description | IOCfg |
|---|---|---|---|---|
| 66 | FLOW_CNTRL | 01LoopType | type | |
| 66 | FLOW_CNTRL | 02LoopStaticID | spare | |
| 66 | FLOW_CNTRL | 03Variable1 | cmdFlowPercent | IN_PAR |
| 66 | FLOW_CNTRL | 04Variable2 | flowSensor | IN_PAR |
| 66 | FLOW_CNTRL | 05Variable3 | minFlowSetPt | IN_PAR |
| 66 | FLOW_CNTRL | 06Variable4 | maxFlowSetPt | IN_PAR |
| 66 | FLOW_CNTRL | 07Variable5 | manFlowOverride | IN_PAR |
| 66 | FLOW_CNTRL | 08Variable6 | ManFlowValue | IN_PAR |
| 66 | FLOW_CNTRL | 09Variable7 | ductArea | PAR_IN |

| | | | | |
|---|---|---|---|---|
| 66 | FLOW_CNTRL | 10Variable8 | effFlowSetPt | OUT_FLT |
| 66 | FLOW_CNTRL | 11Variable9 | damperPos | OUT_FLT |
| 66 | FLOW_CNTRL | 12EndByte1 | units | |
| 66 | FLOW_CNTRL | 13EndByte2 | motorSpeed | |
| 80 | OVERIDE | 01LoopType | type | |
| 80 | OVERIDE | 02LoopStaticID | spare | |
| 80 | OVERIDE | 03Variable1 | priority1val | IN_PAR |
| 80 | OVERIDE | 04Variable2 | priority2val | IN_PAR |
| 80 | OVERIDE | 05Variable3 | priority3val | IN_PAR |
| 80 | OVERIDE | 06Variable4 | priority4val | IN_PAR |
| 80 | OVERIDE | 07Variable5 | priority5val | IN_PAR |
| 80 | OVERIDE | 08Variable6 | priority6val | IN_PAR |
| 80 | OVERIDE | 09Variable7 | cntrlInput | IN_PAR |
| 80 | OVERIDE | 10Variable8 | defaultValue | PAR_IN |
| 80 | OVERIDE | 11Variable9 | effOutput | OUT_FLT |
| 80 | OVERIDE | 12EndByte1 | | |
| 80 | OVERIDE | 13EndByte2 | | |

| FBID | FBName | FieldType | Description | IOCfg |
|---|---|---|---|---|
| 81 | RUNT_ACCM | 01LoopType | type | |
| 81 | RUNT_ACCM | 02LoopStaticID | spare | |
| 81 | RUNT_ACCM | 03Variable1 | input | IN_PAR |
| 81 | RUNT_ACCM | 04Variable2 | enable | IN_PAR |
| 81 | RUNT_ACCM | 05Variable3 | preset | IN_PAR |
| 81 | RUNT_ACCM | 06Variable4 | presetValue | PAR_IN |
| 81 | RUNT_ACCM | 07Variable5 | runtimeMin | OUT_FLT_SAV |
| 81 | RUNT_ACCM | 08Variable6 | runtimeSec | OUT_FLT |
| 81 | RUNT_ACCM | 09Variable7 | runtimeHrs | OUT_FLT |
| 81 | RUNT_ACCM | 10Variable8 | runtimeDays | OUT_FLT |
| 81 | RUNT_ACCM | 11Variable9 | unused1 | UNUSED |
| 81 | RUNT_ACCM | 12EndByte1 | | |
| 81 | RUNT_ACCM | 13EndByte2 | | |
| 82 | COUNTER | 01LoopType | type | |
| 82 | COUNTER | 02LoopStaticID | spare | |
| 82 | COUNTER | 03Variable1 | input | IN_PAR |
| 82 | COUNTER | 04Variable2 | enable | IN_PAR |
| 82 | COUNTER | 05Variable3 | preset | IN_PAR |
| 82 | COUNTER | 06Variable4 | presetValue | PAR_IN |
| 82 | COUNTER | 07Variable5 | countValue | PAR_IN |
| 82 | COUNTER | 08Variable6 | stopAtZero | PAR_IN |
| 82 | COUNTER | 09Variable7 | counts | OUT_FLT_SAV |
| 82 | COUNTER | 10Variable8 | unused1 | UNUSED |
| 82 | COUNTER | 11Variable9 | unused2 | UNUSED |
| 82 | COUNTER | 12EndByte1 | | |
| 82 | COUNTER | 13EndByte2 | | |

| FBID | FBName | FieldType | Description | IOCfg |
|---|---|---|---|---|
| 83 | ALARM | 01LoopType | type | |
| 83 | ALARM | 02LoopStaticID | spare | |
| 83 | ALARM | 03Variable1 | value | IN_ONLY |

| FBID | FBName | FieldType | Description | IOCfg |
|---|---|---|---|---|
| 83 | ALARM | 04Variable2 | highLimit | PAR_IN |
| 83 | ALARM | 05Variable3 | lowLimit | PAR_IN |
| 83 | ALARM | 06Variable4 | presetTime | PAR_IN |
| 83 | ALARM | 07Variable5 | postTime | PAR_IN |
| 83 | ALARM | 08Variable6 | disable | IN_ONLY |
| 83 | ALARM | 09Variable7 | alarmStatus | OUT_DIG |
| 83 | ALARM | 10Variable8 | unused1 | UNUSED |
| 83 | ALARM | 11Variable9 | unused2 | UNUSED |
| 83 | ALARM | 12EndByte1 | alarmID | |
| 83 | ALARM | 13EndByte2 | | |
| 100 | OCC_ARB | 01LoopType | type | |
| 100 | OCC_ARB | 02LoopStaticID | spare | |
| 100 | OCC_ARB | 03Variable1 | schedCurrentState | IN_ONLY |
| 100 | OCC_ARB | 04Variable2 | wmOverride | IN_ONLY |
| 100 | OCC_ARB | 05Variable3 | networkManOcc | IN_ONLY |
| 100 | OCC_ARB | 06Variable4 | occSensorState | IN_ONLY |
| 100 | OCC_ARB | 07Variable5 | effOccCurrentState | OUT_DIG |
| 100 | OCC_ARB | 08Variable6 | manOverrideState | OUT_FLT_SAV |
| 100 | OCC_ARB | 09Variable7 | unused1 | UNUSED |
| 100 | OCC_ARB | 10Variable8 | unused2 | UNUSED |
| 100 | OCC_ARB | 11Variable9 | unused3 | UNUSED |
| 100 | OCC_ARB | 12EndByte1 | netLastInWins | |
| 100 | OCC_ARB | 13EndByte2 | occSensorOper | |

| FBID | FBName | FieldType | Description | IOCfg |
|---|---|---|---|---|
| 101 | GEN_SPCALC | 01LoopType | type | |
| 101 | GEN_SPCALC | 02LoopStaticID | spare | |
| 101 | GEN_SPCALC | 03Variable1 | effOccCurrentState | IN_ONLY |
| 101 | GEN_SPCALC | 04Variable2 | resetInput | IN_PAR |
| 101 | GEN_SPCALC | 05Variable3 | reset0Pct | PAR_IN |
| 101 | GEN_SPCALC | 06Variable4 | reset100Pct | PAR_IN |
| 101 | GEN_SPCALC | 07Variable5 | resetAmount | PAR_IN |
| 101 | GEN_SPCALC | 08Variable6 | occSetPt | PAR_IN |
| 101 | GEN_SPCALC | 09Variable7 | stbySetPt | PAR_IN |
| 101 | GEN_SPCALC | 10Variable8 | unoccSetPt | PAR_IN |
| 101 | GEN_SPCALC | 11Variable9 | effSetPt | OUT_FLT |
| 101 | GEN_SPCALC | 12EndByte1 | | |
| 101 | GEN_SPCALC | 13EndByte2 | | |
| 102 | TEMP_SPCALC | 01LoopType | type | |
| 102 | TEMP_SPCALC | 02LoopStaticID | spare | |
| 102 | TEMP_SPCALC | 03Variable1 | effOccCurrentState | IN_ONLY |
| 102 | TEMP_SPCALC | 04Variable2 | schedNextState | IN_ONLY |
| 102 | TEMP_SPCALC | 05Variable3 | schedTuncos | IN_ONLY |
| 102 | TEMP_SPCALC | 06Variable4 | setpoint | IN_ONLY |
| 102 | TEMP_SPCALC | 07Variable5 | heatRampRate | IN_PAR |
| 102 | TEMP_SPCALC | 08Variable6 | coolRampRate | IN_PAR |
| 102 | TEMP_SPCALC | 09Variable7 | manOverrideState | IN_ONLY |
| 102 | TEMP_SPCALC | 10Variable8 | effHeatSP | OUT_FLT |
| 102 | TEMP_SPCALC | 11Variable9 | effCoolSP | OUT_FLT |
| 102 | TEMP_SPCALC | 12EndByte1 | | |

| FBID | FBName | FieldType | Description | IOCfg |
|---|---|---|---|---|
| 102 | TEMP_SPCALC | 13EndByte2 | | |
| FBID | FBName | FieldType | Description | IOCfg |
| 103 | TEMP_MODE | 01LoopType | type | |
| 103 | TEMP_MODE | 02LoopStaticID | spare | |
| 103 | TEMP_MODE | 03Variable1 | sysSwitch | IN_ONLY |
| 103 | TEMP_MODE | 04Variable2 | cmdMode | IN_ONLY |
| 103 | TEMP_MODE | 05Variable3 | supplyTemp | IN_ONLY |
| 103 | TEMP_MODE | 06Variable4 | spaceTemp | IN_ONLY |
| 103 | TEMP_MODE | 07Variable5 | effHeatSP | IN_ONLY |
| 103 | TEMP_MODE | 08Variable6 | effCoolSP | IN_ONLY |
| 103 | TEMP_MODE | 09Variable7 | allowAutoChange | IN_PAR |
| 103 | TEMP_MODE | 10Variable8 | effSetpt | OUT_FLT |
| 103 | TEMP_MODE | 11Variable9 | effTempMode | OUT_FLT_SAV |
| 103 | TEMP_MODE | 12EndByte1 | controlType | |
| 103 | TEMP_MODE | 13EndByte2 | | |
| 104 | STAGEDRIV_ADD | 01LoopType | type | |
| 104 | STAGEDRIV_ADD | 02LoopStaticID | spare | |
| 104 | STAGEDRIV_ADD | 03Variable1 | stgStatusIn | IN_ONLY |
| 104 | STAGEDRIV_ADD | 04Variable2 | stage1 | OUT_DIG |
| 104 | STAGEDRIV_ADD | 05Variable3 | stage2 | OUT_DIG |
| 104 | STAGEDRIV_ADD | 06Variable4 | stage3 | OUT_DIG |
| 104 | STAGEDRIV_ADD | 07Variable5 | stage4 | OUT_DIG |
| 104 | STAGEDRIV_ADD | 08Variable6 | stage5 | OUT_DIG |
| 104 | STAGEDRIV_ADD | 09Variable7 | stage6 | OUT_DIG |
| 104 | STAGEDRIV_ADD | 10Variable8 | stage7 | OUT_DIG |
| 104 | STAGEDRIV_ADD | 11Variable9 | stage8 | OUT_DIG |
| 104 | STAGEDRIV_ADD | 12EndByte1 | firstStgNum | |
| 104 | STAGEDRIV_ADD | 13EndByte2 | | |
| FBID | FBName | FieldType | Description | IOCfg |
| 129 | SCHED_SP | 01LoopType | type | |
| 129 | SCHED_SP | 02LoopStaticID | spare | |
| 129 | SCHED_SP | 03Variable1 | SchedOcc | OUT_DIG |
| 129 | SCHED_SP | 04Variable2 | NextSchedOcc | OUT_DIG |
| 129 | SCHED_SP | 05Variable3 | TUNCOS | OUT_FLT |
| 129 | SCHED_SP | 06Variable4 | unused1 | UNUSED |
| 129 | SCHED_SP | 07Variable5 | unused2 | UNUSED |
| 129 | SCHED_SP | 08Variable6 | unused3 | UNUSED |
| 129 | SCHED_SP | 09Variable7 | unused4 | UNUSED |
| 129 | SCHED_SP | 10Variable8 | unused5 | UNUSED |
| 129 | SCHED_SP | 11Variable9 | unused6 | UNUSED |
| 129 | SCHED_SP | 12EndByte1 | | |
| 129 | SCHED_SP | 13EndByte2 | | |
| 130 | WALL_MOD | 01LoopType | type | |
| 130 | WALL_MOD | 02LoopStaticID | spare | |
| 130 | WALL_MOD | 03Variable1 | spaceTempIn | IN_ONLY |
| 130 | WALL_MOD | 04Variable2 | setPointIn | IN_ONLY |
| 130 | WALL_MOD | 05Variable3 | overide | IN_ONLY |
| 130 | WALL_MOD | 06Variable4 | EffOverride | IN_ONLY |

| | | | | | |
|---|---|---|---|---|---|
| 130 | WALL_MOD | 07Variable5 | spaceTempOut | | OUT_FLT |
| 130 | WALL_MOD | 08Variable6 | setPointout | | OUT_FLT |
| 130 | WALL_MOD | 09Variable7 | WMOverride | | OUT_DIG |
| 130 | WALL_MOD | 10Variable8 | LED | | OUT_DIG |
| 130 | WALL_MOD | 11Variable9 | unused1 | | UNUSED |
| 130 | WALL_MOD | 12EndByte1 | | | |
| 130 | WALL_MOD | 13EndByte2 | | | |

| FBID | FBName | ByteCfg | ByteOffset | Negate | Comments |
|---|---|---|---|---|---|
| 7 | AND | | 0 | | Loop Type |
| 7 | AND | UNUSED | 1 | | |
| 7 | AND | | 2 | y | input 1 |
| 7 | AND | | 4 | y | input 2 |
| 7 | AND | | 6 | y | input 3 |
| 7 | AND | | 8 | y | input 4 |
| 7 | AND | | 10 | y | input 5 |
| 7 | AND | | 12 | y | input 6 |
| 7 | AND | | 14 | n | true delay - seconds |
| 7 | AND | | 16 | n | false delay - seconds |
| 7 | AND | | 18 | y | output-AND |
| 7 | AND | NEGBITIN | 20 | | individual input bit negation |
| 7 | AND | NEGBITOUT | 21 | | output bit negation |
| 9 | OR | | 0 | | Loop Type |
| 9 | OR | UNUSED | 1 | | |
| 9 | OR | | 2 | y | input 1 |
| 9 | OR | | 4 | y | input 2 |
| 9 | OR | | 6 | y | input 3 |
| 9 | OR | | 8 | y | input 4 |
| 9 | OR | | 10 | y | input 5 |
| 9 | OR | | 12 | y | input 6 |
| 9 | OR | | 14 | n | true delay - seconds |
| 9 | OR | | 16 | n | false delay - seconds |
| 9 | OR | | 18 | y | output-OR |
| 9 | OR | NEGBITIN | 20 | | individual input bit negation |
| 9 | OR | NEGBITOUT | 21 | | output bit negation |

| FBID | FBName | ByteCfg | ByteOffset | Negate | Comments |
|---|---|---|---|---|---|
| 11 | XOR | | 0 | | Loop Type |
| 11 | XOR | UNUSED | 1 | | |
| 11 | XOR | | 2 | y | input 1 |
| 11 | XOR | | 4 | y | input 2 |
| 11 | XOR | | 6 | y | input 3 |
| 11 | XOR | | 8 | y | input 4 |
| 11 | XOR | | 10 | y | input 5 |
| 11 | XOR | | 12 | y | input 6 |
| 11 | XOR | | 14 | n | true delay - seconds |
| 11 | XOR | | 16 | n | false delay - seconds |

| FBID | FBName | ByteCfg | ByteOffset | Negate | Comments |
|---|---|---|---|---|---|
| 11 | XOR | | 18 | y | output-XOR |
| 11 | XOR | NEGBITIN | 20 | | individual input bit negation |
| 11 | XOR | NEGBITOUT | 21 | | output bit negation |
| 13 | ONESHOT | | 0 | | Loop Type |
| 13 | ONESHOT | UNUSED | 1 | | |
| 13 | ONESHOT | | 2 | y | input |
| 13 | ONESHOT | | 4 | n | on time |
| 13 | ONESHOT | | 6 | y | output-One shot |
| 13 | ONESHOT | | 8 | | |
| 13 | ONESHOT | | 10 | | |
| 13 | ONESHOT | | 12 | | |
| 13 | ONESHOT | | 14 | | |
| 13 | ONESHOT | | 16 | | |
| 13 | ONESHOT | | 18 | | |
| 13 | ONESHOT | NEGBITIN | 20 | | input bit negation |
| 13 | ONESHOT | NEGBITOUT | 21 | | output bit negation |

| FBID | FBName | ByteCfg | ByteOffset | Negate | Comments |
|---|---|---|---|---|---|
| 20 | MIN | | 0 | | Loop Type |
| 20 | MIN | UNUSED | 1 | | |
| 20 | MIN | | 2 | | input 1 |
| 20 | MIN | | 4 | | input 2 |
| 20 | MIN | | 6 | | input 3 |
| 20 | MIN | | 8 | | input 4 |
| 20 | MIN | | 10 | | input 5 |
| 20 | MIN | | 12 | | input 6 |
| 20 | MIN | | 14 | | input 7 |
| 20 | MIN | | 16 | | input 8 |
| 20 | MIN | | 18 | | output- Minimum |
| 20 | MIN | UNUSED | 20 | | |
| 20 | MIN | UNUSED | 21 | | |
| 21 | MAX | | 0 | | Loop Type |
| 21 | MAX | UNUSED | 1 | | |
| 21 | MAX | | 2 | | input 1 |
| 21 | MAX | | 4 | | input 2 |
| 21 | MAX | | 6 | | input 3 |
| 21 | MAX | | 8 | | input 4 |
| 21 | MAX | | 10 | | input 5 |
| 21 | MAX | | 12 | | input 6 |
| 21 | MAX | | 14 | | input 7 |
| 21 | MAX | | 16 | | input 8 |
| 21 | MAX | | 18 | | output-Maximum |
| 21 | MAX | UNUSED | 20 | | |
| 21 | MAX | UNUSED | 21 | | |

| FBID | FBName | ByteCfg | ByteOffset | Negate | Comments |
|---|---|---|---|---|---|
| 22 | AVE | | 0 | | Loop Type |
| 22 | AVE | UNUSED | 1 | | |
| 22 | AVE | | 2 | | input 1 |
| 22 | AVE | | 4 | | input 2 |

| | | | | | |
|---|---|---|---|---|---|
| 22 | AVE | | 6 | | input 3 |
| 22 | AVE | | 8 | | input 4 |
| 22 | AVE | | 10 | | input 5 |
| 22 | AVE | | 12 | | input 6 |
| 22 | AVE | | 14 | | input 7 |
| 22 | AVE | | 16 | | input 8 |
| 22 | AVE | | 18 | | output-Average |
| 22 | AVE | UNUSED | 20 | | |
| 22 | AVE | UNUSED | 21 | | |
| 23 | COMP | | 0 | | Loop Type |
| 23 | COMP | UNUSED | 1 | | |
| 23 | COMP | | 2 | n | input 1 |
| 23 | COMP | | 4 | n | input 2 |
| 23 | COMP | | 6 | | On Hysteresis |
| 23 | COMP | | 8 | | Off Hysteresis |
| 23 | COMP | | 10 | y | output-Comparator |
| 23 | COMP | | 12 | | |
| 23 | COMP | | 14 | | |
| 23 | COMP | | 16 | | |
| 23 | COMP | | 18 | | |
| 23 | COMP | UBYTE | 20 | | 0=EQ; 1=LT; 2=GT |
| 23 | COMP | NEGBITOUT | 21 | | output bit negation |

| FBID | FBName | ByteCfg | ByteOffset | Negate | Comments |
|---|---|---|---|---|---|
| 26 | ANA_LATCH | | 0 | | Loop Type |
| 26 | ANA_LATCH | UNUSED | 1 | | |
| 26 | ANA_LATCH | | 2 | n | input |
| 26 | ANA_LATCH | | 4 | y | latch |
| 26 | ANA_LATCH | | 6 | n | output-Latch |
| 26 | ANA_LATCH | | 8 | | |
| 26 | ANA_LATCH | | 10 | | |
| 26 | ANA_LATCH | | 12 | | |
| 26 | ANA_LATCH | | 14 | | |
| 26 | ANA_LATCH | | 16 | | |
| 26 | ANA_LATCH | | 18 | | |
| 26 | ANA_LATCH | NEGBITIN | 20 | | input bit negation |
| 26 | ANA_LATCH | UNUSED | 21 | | |
| 27 | SEL_PRTY | | 0 | | Loop Type |
| 27 | SEL_PRTY | UNUSED | 1 | | |
| 27 | SEL_PRTY | | 2 | | enable 1 |
| 27 | SEL_PRTY | | 4 | | enable 2 |
| 27 | SEL_PRTY | | 6 | | enable 3 |
| 27 | SEL_PRTY | | 8 | | enable 4 |
| 27 | SEL_PRTY | | 10 | | input 1 |
| 27 | SEL_PRTY | | 12 | | input 2 |
| 27 | SEL_PRTY | | 14 | | input 3 |
| 27 | SEL_PRTY | | 16 | | input 4 |
| 27 | SEL_PRTY | | 18 | | output-Select priority |
| 27 | SEL_PRTY | UBYTE | 20 | | yes/no |
| 27 | SEL_PRTY | UNUSED | 21 | | |

| FBID | FBName | ByteCfg | ByteOffset | Negate | Comments |
|---|---|---|---|---|---|
| 28 | HYSTREL | | 0 | | Loop Type |
| 28 | HYSTREL | UNUSED | 1 | | |
| 28 | HYSTREL | | 2 | | input |
| 28 | HYSTREL | | 4 | | on Value |
| 28 | HYSTREL | | 6 | | off Value |
| 28 | HYSTREL | | 8 | | Minimum On - seconds |
| 28 | HYSTREL | | 10 | | Minimum Off - seconds |
| 28 | HYSTREL | | 12 | | output-Stage |
| 28 | HYSTREL | | 14 | | |
| 28 | HYSTREL | | 16 | | |
| 28 | HYSTREL | | 18 | | |
| 28 | HYSTREL | UNUSED | 20 | | |
| 28 | HYSTREL | UNUSED | 21 | | |
| 29 | SWITCH | | 0 | | Loop Type |
| 29 | SWITCH | UNUSED | 1 | | |
| 29 | SWITCH | | 2 | | input |
| 29 | SWITCH | | 4 | y | output 1 |
| 29 | SWITCH | | 6 | y | output 2 |
| 29 | SWITCH | | 8 | y | output 3 |
| 29 | SWITCH | | 10 | y | output 4 |
| 29 | SWITCH | | 12 | y | output 5 |
| 29 | SWITCH | | 14 | y | output 6 |
| 29 | SWITCH | | 16 | y | output 7 |
| 29 | SWITCH | | 18 | y | output 8 |
| 29 | SWITCH | UBYTE | 20 | | offset |
| 29 | SWITCH | NEGBITOUT | 21 | | individual output bit negation |

| FBID | FBName | ByteCfg | ByteOffset | Negate | Comments |
|---|---|---|---|---|---|
| 30 | SELECT | | 0 | | Loop Type |
| 30 | SELECT | UNUSED | 1 | | |
| 30 | SELECT | | 2 | | index |
| 30 | SELECT | | 4 | | default |
| 30 | SELECT | | 6 | | input 1 |
| 30 | SELECT | | 8 | | input 2 |
| 30 | SELECT | | 10 | | input 3 |
| 30 | SELECT | | 12 | | input 4 |
| 30 | SELECT | | 14 | | input 5 |
| 30 | SELECT | | 16 | | input 6 |
| 30 | SELECT | | 18 | | output-Select |
| 30 | SELECT | UBYTE | 20 | | enumeration start value |
| 30 | SELECT | UNUSED | 21 | | |
| 31 | ENCODE | | 0 | | Loop Type |
| 31 | ENCODE | UBYTE | 1 | | out9 |
| 31 | ENCODE | | 2 | | InEnum |
| 31 | ENCODE | | 4 | | disable |
| 31 | ENCODE | | 6 | | input 1,2,3 |
| 31 | ENCODE | | 8 | | input 4,5,6 |
| 31 | ENCODE | | 10 | | input 7,8,9 |

| FBID | FBName | ByteCfg | ByteOffset | Negate | Comments |
|---|---|---|---|---|---|
| 31 | ENCODE | | 12 | | out 1,2,3 |
| 31 | ENCODE | | 14 | | out 4,5,6 |
| 31 | ENCODE | | 16 | | out |
| 31 | ENCODE | | 18 | | fire |
| 31 | ENCODE | UBYTE | 20 | | out 7 |
| 31 | ENCODE | UBYTE | 21 | | out 8 |

| FBID | FBName | ByteCfg | ByteOffset | Negate | Comments |
|---|---|---|---|---|---|
| 40 | ADD | | 0 | | Loop Type |
| 40 | ADD | UNUSED | 1 | | |
| 40 | ADD | | 2 | | x1 |
| 40 | ADD | | 4 | | x2 |
| 40 | ADD | | 6 | | x3 |
| 40 | ADD | | 8 | | x4 |
| 40 | ADD | | 10 | | x5 |
| 40 | ADD | | 12 | | x6 |
| 40 | ADD | | 14 | | x7 |
| 40 | ADD | | 16 | | x8 |
| 40 | ADD | | 18 | | output-Add |
| 40 | ADD | UNUSED | 20 | | |
| 40 | ADD | UNUSED | 21 | | |
| 41 | SUB | | 0 | | Loop Type |
| 41 | SUB | UNUSED | 1 | | |
| 41 | SUB | | 2 | | x1 |
| 41 | SUB | | 4 | | x2 |
| 41 | SUB | | 6 | | |
| 41 | SUB | | 8 | | |
| 41 | SUB | | 10 | | |
| 41 | SUB | | 12 | | |
| 41 | SUB | | 14 | | |
| 41 | SUB | | 16 | | |
| 41 | SUB | | 18 | | output-Subtract x1-x2 |
| 41 | SUB | UNUSED | 20 | | |
| 41 | SUB | UNUSED | 21 | | |

| FBID | FBName | ByteCfg | ByteOffset | Negate | Comments |
|---|---|---|---|---|---|
| 42 | MUL | | 0 | | Loop Type |
| 42 | MUL | UNUSED | 1 | | |
| 42 | MUL | | 2 | | x1 |
| 42 | MUL | | 4 | | x2 |
| 42 | MUL | | 6 | | |
| 42 | MUL | | 8 | | |
| 42 | MUL | | 10 | | |
| 42 | MUL | | 12 | | |
| 42 | MUL | | 14 | | |
| 42 | MUL | | 16 | | |
| 42 | MUL | | 18 | | output-Multiply |
| 42 | MUL | UNUSED | 20 | | |
| 42 | MUL | UNUSED | 21 | | |
| 43 | DIV | | 0 | | Loop Type |

| FBID | FBName | ByteCfg | ByteOffset | Negate | Comments |
|---|---|---|---|---|---|
| 43 | DIV | UNUSED | 1 | | |
| 43 | DIV | | 2 | | x1 Numerator |
| 43 | DIV | | 4 | | x2 Denominator |
| 43 | DIV | | 6 | | |
| 43 | DIV | | 8 | | |
| 43 | DIV | | 10 | | |
| 43 | DIV | | 12 | | |
| 43 | DIV | | 14 | | |
| 43 | DIV | | 16 | | |
| 43 | DIV | | 18 | | output-Divide |
| 43 | DIV | UNUSED | 20 | | |
| 43 | DIV | UNUSED | 21 | | |
| FBID | FBName | ByteCfg | ByteOffset | Negate | Comments |
| 44 | SQRT | | 0 | | Loop Type |
| 44 | SQRT | UNUSED | 1 | | |
| 44 | SQRT | | 2 | | x1 |
| 44 | SQRT | | 4 | | 0=sqrt of abs value; 1=invalid if negative |
| 44 | SQRT | | 6 | | |
| 44 | SQRT | | 8 | | |
| 44 | SQRT | | 10 | | |
| 44 | SQRT | | 12 | | |
| 44 | SQRT | | 14 | | |
| 44 | SQRT | | 16 | | |
| 44 | SQRT | | 18 | | output-Square root |
| 44 | SQRT | UNUSED | 20 | | |
| 44 | SQRT | UNUSED | 21 | | |
| 45 | POW | | 0 | | |
| 45 | POW | UNUSED | 1 | | |
| 45 | POW | | 2 | | base |
| 45 | POW | | 4 | | exponent |
| 45 | POW | | 6 | | 0=use abs of x; 1=invalid if x is negative |
| 45 | POW | | 8 | | output-Exponential |
| 45 | POW | | 10 | | |
| 45 | POW | | 12 | | |
| 45 | POW | | 14 | | |
| 45 | POW | | 16 | | |
| 45 | POW | | 18 | | |
| 45 | POW | UNUSED | 20 | | |
| 45 | POW | UNUSED | 21 | | |
| FBID | FBName | ByteCfg | ByteOffset | Negate | Comments |
| 47 | DIG_FILT | | 0 | | Loop Type |
| 47 | DIG_FILT | UNUSED | 1 | | |
| 47 | DIG_FILT | | 2 | | x |
| 47 | DIG_FILT | | 4 | | tau - seconds |
| 47 | DIG_FILT | | 6 | | output-Filtered |
| 47 | DIG_FILT | | 8 | | |

| | | | | |
|---|---|---|---|---|
| 47 | DIG_FILT | | 10 | |
| 47 | DIG_FILT | | 12 | |
| 47 | DIG_FILT | | 14 | |
| 47 | DIG_FILT | | 16 | |
| 47 | DIG_FILT | | 18 | |
| 47 | DIG_FILT | UBYTE | 20 | 0=init filt to 1st value; 1=init filt to 0.0 |
| 47 | DIG_FILT | UNUSED | 21 | |
| 48 | ENTH | | 0 | Loop Type |
| 48 | ENTH | UNUSED | 1 | |
| 48 | ENTH | | 2 | temp |
| 48 | ENTH | | 4 | relative humidity |
| 48 | ENTH | | 6 | output-Enthalpy |
| 48 | ENTH | | 8 | |
| 48 | ENTH | | 10 | |
| 48 | ENTH | | 12 | |
| 48 | ENTH | | 14 | |
| 48 | ENTH | | 16 | |
| 48 | ENTH | | 18 | |
| 48 | ENTH | UNUSED | 20 | |
| 48 | ENTH | UNUSED | 21 | |

| FBID | FBName | ByteCfg | ByteOffset | Negate | Comments |
|---|---|---|---|---|---|
| 49 | RATIO | | 0 | | Loop Type |
| 49 | RATIO | UNUSED | 1 | | |
| 49 | RATIO | | 2 | | x |
| 49 | RATIO | | 4 | | in x1 |
| 49 | RATIO | | 6 | | in y1 |
| 49 | RATIO | | 8 | | in x2 |
| 49 | RATIO | | 10 | | in y2 |
| 49 | RATIO | | 12 | | output-Ratio |
| 49 | RATIO | | 14 | | |
| 49 | RATIO | | 16 | | |
| 49 | RATIO | | 18 | | |
| 49 | RATIO | RatioOp | 20 | | 0=unlimited, 1=vavFlowBal, 2=endpt Limited |
| 49 | RATIO | UNUSED | 21 | | |
| 50 | LIMIT | | 0 | | Loop Type |
| 50 | LIMIT | UNUSED | 1 | | |
| 50 | LIMIT | | 2 | | input |
| 50 | LIMIT | | 4 | | high Limit |
| 50 | LIMIT | | 6 | | low Limit |
| 50 | LIMIT | | 8 | | output-Limit |
| 50 | LIMIT | | 10 | | |
| 50 | LIMIT | | 12 | | |
| 50 | LIMIT | | 14 | | |
| 50 | LIMIT | | 16 | | |
| 50 | LIMIT | | 18 | | |
| 50 | LIMIT | UNUSED | 20 | | |
| 50 | LIMIT | UNUSED | 21 | | |

| FBID | FBName | ByteCfg | ByteOffset | Negate | Comments |
|---|---|---|---|---|---|
| 51 | RESET | | 0 | | Loop Type |
| 51 | RESET | UNUSED | 1 | | |
| 51 | RESET | | 2 | | input |
| 51 | RESET | | 4 | | sensor |
| 51 | RESET | | 6 | | zeroPctResetVal |
| 51 | RESET | | 8 | | hundredPctResetVal |
| 51 | RESET | | 10 | | resetAmount |
| 51 | RESET | | 12 | | output-Reset |
| 51 | RESET | | 14 | | |
| 51 | RESET | | 16 | | |
| 51 | RESET | | 18 | | |
| 51 | RESET | UNUSED | 20 | | |
| 51 | RESET | UNUSED | 21 | | |
| 52 | VELP | | 0 | | Loop Type |
| 52 | VELP | UNUSED | 1 | | |
| 52 | VELP | | 2 | | pressure |
| 52 | VELP | | 4 | | K Factor |
| 52 | VELP | | 6 | | auto set offest |
| 52 | VELP | | 8 | | clear offset |
| 52 | VELP | | 10 | | area |
| 52 | VELP | | 12 | | output-Flow |
| 52 | VELP | | 14 | | output-Offset |
| 52 | VELP | | 16 | | output-Velocity |
| 52 | VELP | | 18 | | |
| 52 | VELP | UNUSED | 20 | | |
| 52 | VELP | UNUSED | 21 | | |

| FBID | FBName | ByteCfg | ByteOffset | Negate | Comments |
|---|---|---|---|---|---|
| 60 | PID | | 0 | | Loop Type |
| 60 | PID | UNUSED | 1 | | |
| 60 | PID | | 2 | | input |
| 60 | PID | | 4 | | setpoint |
| 60 | PID | | 6 | | disable |
| 60 | PID | | 8 | | throttling range |
| 60 | PID | | 10 | | integral Time - seconds |
| 60 | PID | | 12 | | derivative Time |
| 60 | PID | | 14 | | deadband |
| 60 | PID | | 16 | | deadband delay |
| 60 | PID | | 18 | | output-PID |
| 60 | PID | UBYTE | 20 | | reverse acting |
| 60 | PID | UBYTE | 21 | | bias 0 - 100% |
| 61 | AIA | | 0 | | Loop Type |
| 61 | AIA | UNUSED | 1 | | |
| 61 | AIA | | 2 | | sensor |
| 61 | AIA | | 4 | | setpoint |
| 61 | AIA | | 6 | | disable Integral |
| 61 | AIA | | 8 | | throttling range |
| 61 | AIA | | 10 | | deadband |

| FBID | FBName | ByteCfg | ByteOffset | Negate | Comments |
|---|---|---|---|---|---|
| 61 | AIA | | 12 | | maximum analog ouput change |
| 61 | AIA | | 14 | | derivative Gain |
| 61 | AIA | | 16 | | minimun analog output change |
| 61 | AIA | | 18 | | output-AIA |
| 61 | AIA | UBYTE | 20 | | 0=direct; 1=reverse |
| 61 | AIA | UNUSED | 21 | | delay |

| FBID | FBName | ByteCfg | ByteOffset | Negate | Comments |
|---|---|---|---|---|---|
| 62 | CYCLER | | 0 | | Loop Type |
| 62 | CYCLER | UBYTE | 1 | | anticipator auth (0-200%) |
| 62 | CYCLER | | 2 | | input (from PID) |
| 62 | CYCLER | | 4 | | maximum stages |
| 62 | CYCLER | | 6 | | minimum On time - seconds |
| 62 | CYCLER | | 8 | | minimum Off time - seconds |
| 62 | CYCLER | | 10 | | interstage Delay On time - seconds |
| 62 | CYCLER | | 12 | | interstage Delay Off time - seconds |
| 62 | CYCLER | | 14 | | override Off |
| 62 | CYCLER | | 16 | | disable |
| 62 | CYCLER | | 18 | | output-Number of stages |
| 62 | CYCLER | UBYTE | 20 | | cycles per Hour |
| 62 | CYCLER | UBYTE | 21 | | Hysteresis - note Antcipator = 4 * hyst |
| 63 | STAGER | | 0 | | Loop Type |
| 63 | STAGER | UBYTE | 1 | | anticipator Auth (0-200%) |
| 63 | STAGER | | 2 | | input (from PID) |
| 63 | STAGER | | 4 | | maximum stages |
| 63 | STAGER | | 6 | | minimum On time - seconds |
| 63 | STAGER | | 8 | | minimum Off time - seconds |
| 63 | STAGER | | 10 | | interstage Delay On time - seconds |
| 63 | STAGER | | 12 | | Interstage Delay Off time - seconds |
| 63 | STAGER | | 14 | | override Off |
| 63 | STAGER | | 16 | | disable |
| 63 | STAGER | | 18 | | output-Number of stages |
| 63 | STAGER | UBYTE | 20 | | Must be Zero |
| 63 | STAGER | UBYTE | 21 | | Hysteresis - note Antcipator = 4 * hyst |

| FBID | FBName | ByteCfg | ByteOffset | Negate | Comments |
|---|---|---|---|---|---|
| 64 | STAGEDRIV | | 0 | | Loop Type |
| 64 | STAGEDRIV | UNUSED | 1 | | |
| 64 | STAGEDRIV | | 2 | | input (number of Stages active) |
| 64 | STAGEDRIV | | 4 | | runtime reset |
| 64 | STAGEDRIV | | 6 | | output-Stage 1 |
| 64 | STAGEDRIV | | 8 | | output-Stage 2 |
| 64 | STAGEDRIV | | 10 | | output-Stage 3 |

| FBID | FBName | ByteCfg | ByteOffset | Negate | Comments |
|---|---|---|---|---|---|
| 64 | STAGEDRIV | | 12 | | output-Stage 4 |
| 64 | STAGEDRIV | | 14 | | output-Stage 5 |
| 64 | STAGEDRIV | | 16 | | output-Stage status |
| 64 | STAGEDRIV | | 18 | | Internal Use Only |
| 64 | STAGEDRIV | UBYTE | 20 | | STD=0;FOFO=1;RUNEQ=2 |
| 64 | STAGEDRIV | UBYTE | 21 | | maximum number of stages |
| 65 | RATE_LIM | | 0 | | Loop Type |
| 65 | RATE_LIM | UNUSED | 1 | | |
| 65 | RATE_LIM | | 2 | | input |
| 65 | RATE_LIM | | 4 | | disable |
| 65 | RATE_LIM | | 6 | | start value |
| 65 | RATE_LIM | | 8 | | up rate (0 = not used) |
| 65 | RATE_LIM | | 10 | | down rate (0 = not used) |
| 65 | RATE_LIM | | 12 | | start interval (if 0 then always rate limit) |
| 65 | RATE_LIM | | 14 | | output-Rate limit |
| 65 | RATE_LIM | | 16 | | |
| 65 | RATE_LIM | | 18 | | |
| 65 | RATE_LIM | UNUSED | 20 | | |
| 65 | RATE_LIM | UNUSED | 21 | | |

| FBID | FBName | ByteCfg | ByteOffset | Negate | Comments |
|---|---|---|---|---|---|
| 66 | FLOW_CNTRL | | 0 | | Loop Type |
| 66 | FLOW_CNTRL | UNUSED | 1 | | |
| 66 | FLOW_CNTRL | | 2 | | command flow percent |
| 66 | FLOW_CNTRL | | 4 | | flow sensor |
| 66 | FLOW_CNTRL | | 6 | | minimun flow SP |
| 66 | FLOW_CNTRL | | 8 | | maximum flow SP |
| 66 | FLOW_CNTRL | | 10 | | manual flow override |
| 66 | FLOW_CNTRL | | 12 | | manual flow value |
| 66 | FLOW_CNTRL | | 14 | | duct area |
| 66 | FLOW_CNTRL | | 16 | | output-Effective flow SP |
| 66 | FLOW_CNTRL | | 18 | | output-Damper Pos |
| 66 | FLOW_CNTRL | UBYTE | 20 | | units |
| 66 | FLOW_CNTRL | UBYTE | 21 | | motor speed |
| 80 | OVERIDE | | 0 | | Loop Type |
| 80 | OVERIDE | UNUSED | 1 | | |
| 80 | OVERIDE | | 2 | | priority 1 value |
| 80 | OVERIDE | | 4 | | priority 2 value |
| 80 | OVERIDE | | 6 | | priority 3 value |
| 80 | OVERIDE | | 8 | | priority 4 value |
| 80 | OVERIDE | | 10 | | priority 5 value |
| 80 | OVERIDE | | 12 | | priority 6 value |
| 80 | OVERIDE | | 14 | | controller input |
| 80 | OVERIDE | | 16 | | default value |
| 80 | OVERIDE | | 18 | | output-Override |
| 80 | OVERIDE | UNUSED | 20 | | |
| 80 | OVERIDE | UNUSED | 21 | | |

| FBID | FBName | ByteCfg | ByteOffset | Negate | Comments |
|---|---|---|---|---|---|

| FBID | FBName | ByteCfg | ByteOffset | Negate | Comments |
|---|---|---|---|---|---|
| 81 | RUNT_ACCM | | 0 | | Loop Type |
| 81 | RUNT_ACCM | UNUSED | 1 | | |
| 81 | RUNT_ACCM | | 2 | | input |
| 81 | RUNT_ACCM | | 4 | | enable |
| 81 | RUNT_ACCM | | 6 | | preset |
| 81 | RUNT_ACCM | | 8 | | preset value |
| 81 | RUNT_ACCM | | 10 | | output-Runtime minutes |
| 81 | RUNT_ACCM | | 12 | | output-Runtime seconds |
| 81 | RUNT_ACCM | | 14 | | output-Runtime hours |
| 81 | RUNT_ACCM | | 16 | | output-Runtime days |
| 81 | RUNT_ACCM | | 18 | | |
| 81 | RUNT_ACCM | UNUSED | 20 | | |
| 81 | RUNT_ACCM | UNUSED | 21 | | |
| 82 | COUNTER | | 0 | | Loop Type |
| 82 | COUNTER | UNUSED | 1 | | |
| 82 | COUNTER | | 2 | | input |
| 82 | COUNTER | | 4 | | enable |
| 82 | COUNTER | | 6 | | preset |
| 82 | COUNTER | | 8 | | preset value |
| 82 | COUNTER | | 10 | | count value |
| 82 | COUNTER | | 12 | | 0=continue counting; 1=stop at zero |
| 82 | COUNTER | | 14 | | output-Count |
| 82 | COUNTER | | 16 | | |
| 82 | COUNTER | | 18 | | |
| 82 | COUNTER | UNUSED | 20 | | |
| 82 | COUNTER | UNUSED | 21 | | |

| FBID | FBName | ByteCfg | ByteOffset | Negate | Comments |
|---|---|---|---|---|---|
| 83 | ALARM | | 0 | | Loop Type |
| 83 | ALARM | UNUSED | 1 | | |
| 83 | ALARM | | 2 | | value |
| 83 | ALARM | | 4 | | high Limit |
| 83 | ALARM | | 6 | | low Limit |
| 83 | ALARM | | 8 | | preset Time |
| 83 | ALARM | | 10 | | post time |
| 83 | ALARM | | 12 | | disable |
| 83 | ALARM | | 14 | | output-Alarm Status |
| 83 | ALARM | | 16 | | |
| 83 | ALARM | | 18 | | |
| 83 | ALARM | AlarmID | 20 | | Val 48-79 nvoError bit position |
| 83 | ALARM | UNUSED | 21 | | |
| 100 | OCC_ARB | | 0 | | Loop Type |
| 100 | OCC_ARB | UNUSED | 1 | | |
| 100 | OCC_ARB | | 2 | | schedule current state |
| 100 | OCC_ARB | | 4 | | wall module override |
| 100 | OCC_ARB | | 6 | | network manual occ command |
| 100 | OCC_ARB | | 8 | | occ sensor |

| FBID | FBName | ByteCfg | ByteOffset | Negate | Comments |
|---|---|---|---|---|---|
| 100 | OCC_ARB | | 10 | | output-Effective current occ state |
| 100 | OCC_ARB | | 12 | | output-Man Override |
| 100 | OCC_ARB | | 14 | | |
| 100 | OCC_ARB | | 16 | | |
| 100 | OCC_ARB | | 18 | | |
| 100 | OCC_ARB | UBYTE | 20 | | 0=net wins; 1=last in wins |
| 100 | OCC_ARB | UBYTE | 21 | | 0=cr; 1=cc; 2=tenant |

| FBID | FBName | ByteCfg | ByteOffset | Negate | Comments |
|---|---|---|---|---|---|
| 101 | GEN_SPCALC | | 0 | | Loop Type |
| 101 | GEN_SPCALC | UNUSED | 1 | | |
| 101 | GEN_SPCALC | | 2 | | effective Occ current state |
| 101 | GEN_SPCALC | | 4 | | reset input |
| 101 | GEN_SPCALC | | 6 | | reset 0 % |
| 101 | GEN_SPCALC | | 8 | | reset 100% |
| 101 | GEN_SPCALC | | 10 | | reset amount |
| 101 | GEN_SPCALC | | 12 | | occupied setpoint |
| 101 | GEN_SPCALC | | 14 | | standby setpoint |
| 101 | GEN_SPCALC | | 16 | | unoccupied setpoint |
| 101 | GEN_SPCALC | | 18 | | output-Effective setpoint |
| 101 | GEN_SPCALC | UNUSED | 20 | | |
| 101 | GEN_SPCALC | UNUSED | 21 | | |
| 102 | TEMP_SPCALC | | 0 | | Loop Type |
| 102 | TEMP_SPCALC | UNUSED | 1 | | |
| 102 | TEMP_SPCALC | | 2 | | effective occ current state |
| 102 | TEMP_SPCALC | | 4 | | sched next state |
| 102 | TEMP_SPCALC | | 6 | | sched Time until next change of state |
| 102 | TEMP_SPCALC | | 8 | | setpoint (<10 = offset) |
| 102 | TEMP_SPCALC | | 10 | | heat ramp rate |
| 102 | TEMP_SPCALC | | 12 | | cool ramp rate |
| 102 | TEMP_SPCALC | | 14 | | man override state |
| 102 | TEMP_SPCALC | | 16 | | output-effective heat setpoint |
| 102 | TEMP_SPCALC | | 18 | | output-effective cool setpoint |
| 102 | TEMP_SPCALC | UNUSED | 20 | | |
| 102 | TEMP_SPCALC | UNUSED | 21 | | |

| FBID | FBName | ByteCfg | ByteOffset | Negate | Comments |
|---|---|---|---|---|---|
| 103 | TEMP_MODE | | 0 | | Loop Type |
| 103 | TEMP_MODE | UNUSED | 1 | | |
| 103 | TEMP_MODE | | 2 | | system switch |
| 103 | TEMP_MODE | | 4 | | command mode |
| 103 | TEMP_MODE | | 6 | | supply temp |
| 103 | TEMP_MODE | | 8 | | space temp |
| 103 | TEMP_MODE | | 10 | | effective heating setpoint |
| 103 | TEMP_MODE | | 12 | | effective cooling setpoint |
| 103 | TEMP_MODE | | 14 | | Auto changeover enable/disable |
| 103 | TEMP_MODE | | 16 | | output-Current effective setpoint |

| | | | | |
|---|---|---|---|---|
| 103 | TEMP_MODE | | 18 | output-Effective temperature mode |
| 103 | TEMP_MODE | UBYTE | 20 | control type (0=CVAHU; 1=VAV) |
| 103 | TEMP_MODE | UNUSED | 21 | |
| 104 | STAGEDRIV_ADD | | 0 | Loop Type |
| 104 | STAGEDRIV_ADD | UNUSED | 1 | |
| 104 | STAGEDRIV_ADD | | 2 | input |
| 104 | STAGEDRIV_ADD | | 4 | output-Stage 1 |
| 104 | STAGEDRIV_ADD | | 6 | output-Stage 2 |
| 104 | STAGEDRIV_ADD | | 8 | output-Stage 3 |
| 104 | STAGEDRIV_ADD | | 10 | output-Stage 4 |
| 104 | STAGEDRIV_ADD | | 12 | output-Stage 5 |
| 104 | STAGEDRIV_ADD | | 14 | output-Stage 6 |
| 104 | STAGEDRIV_ADD | | 16 | output-Stage 7 |
| 104 | STAGEDRIV_ADD | | 18 | output-Stage 8 |
| 104 | STAGEDRIV_ADD | UBYTE | 20 | first stage enumeration |
| 104 | STAGEDRIV_ADD | UNUSED | 21 | |

| FBID | FBName | ByteCfg | ByteOffset | Negate | Comments |
|---|---|---|---|---|---|
| 129 | SCHED_SP | | 0 | | Loop Type |
| 129 | SCHED_SP | UNUSED | 1 | | |
| 129 | SCHED_SP | | 2 | | output-Schedule current state |
| 129 | SCHED_SP | | 4 | | output-Schedule next state |
| 129 | SCHED_SP | | 6 | | output-Schedule time unitil next change of state |
| 129 | SCHED_SP | | 8 | | |
| 129 | SCHED_SP | | 10 | | |
| 129 | SCHED_SP | | 12 | | |
| 129 | SCHED_SP | | 14 | | |
| 129 | SCHED_SP | | 16 | | |
| 129 | SCHED_SP | | 18 | | |
| 129 | SCHED_SP | UNUSED | 20 | | |
| 129 | SCHED_SP | UNUSED | 21 | | |
| 130 | WALL_MOD | | 0 | | Loop Type |
| 130 | WALL_MOD | UNUSED | 1 | | |
| 130 | WALL_MOD | | 2 | | space temperature |
| 130 | WALL_MOD | | 4 | | setpoint |
| 130 | WALL_MOD | | 6 | | override |
| 130 | WALL_MOD | | 8 | | effective override state |

| | | | | |
|---|---|---|---|---|
| 130 | WALL_MOD | | 10 | output-Space temperature |
| 130 | WALL_MOD | | 12 | output-Setpoint |
| 130 | WALL_MOD | | 14 | output-Wall module override |
| 130 | WALL_MOD | | 16 | output-LED |
| 130 | WALL_MOD | | 18 | |
| 130 | WALL_MOD | UNUSED | 20 | |
| 130 | WALL_MOD | UNUSED | 21 | |

What is claimed is:

1. A function block design system for designing a control system for a building HVAC system comprising:
   a pre-configured function block engine in flash memory including a plurality of function blocks each having a pre-defined function;
   an operating system scheduler connected to the function block engine; and
   a block execution list module connected to the function block engine, the block execution list module configured to direct the order of execution of function blocks;
   wherein functions of the function block engine use a common pool of RAM to hold minimal static value storage; and
   wherein at least some of the function blocks are interconnected and combined into one block such that the control system is provided in one block.

2. The system for claim 1, wherein the function block engine is for providing at least one or more function blocks.

3. The system of claim 2, wherein the function blocks are interconnected in a manner to effect a controller system.

4. The system of claim 3, wherein the function block comprises:
   a function block order module;
   an input interface connected to the function block order module;
   an output interface converter connected to the function block order module; and
   wherein the function block order module is connected to the flash memory.

5. The system of claim 3, wherein:
   the controller system is testable with simulated inputs to one or more function blocks;
   outputs of the function blocks may be observed, graphed, saved and/or analyzed; and
   parameters and/or variables of the function blocks are selectable and/or adjustable.

6. A method for designing a control system comprising:
   storing a list of function blocks in a memory;
   interconnecting and combining at least some of the functions blocks; and
   executing the function blocks from the memory according to the list of function blocks in a custom order of execution; and
   wherein functions use a common pool of RAM to hold minimal static value storage;
   wherein executing a function block comprises:
   reading variables from the memory; and
   writing variables to the memory.

7. The method of claim 6, further comprising:
   providing each function block with a function block type, one or more parameters, and/or one or more references; and
   wherein at least some of the parameters and/or references include a pointer to the memory.

8. The method of claim 6, wherein the function blocks are configurable after storing.

9. A programmable controller for an HVAC system comprising:
   a memory;
   a function block engine having at least one program including one or more pre-configured function blocks configured to be interconnected and combined in a custom configuration, the function block engine being resident in the memory, wherein functions use a common pool of RAM to hold minimal static value storage;
   a block execution list identifying one or more function blocks, the block execution list being resident in the memory; and
   a parameter and/or variable storage space being resident in the memory; and
   wherein the function block engine program is executed from the memory and the function blocks reuse the pool of RAM not occupied by static value storage for temporary execution space.

10. The programmable controller of claim 9, wherein the block execution list is field programmable.

11. The programmable controller of claim 10, wherein at least some of the one or more function blocks implement one or more higher-level controller functions.

12. The programmable controller of claim 11, wherein the function block includes one or more parameters and/or one or more references.

13. The programmable controller of claim 12, wherein at least some of the one or more parameters and/or one or more references include a pointer to data stored in memory.

14. The programmable controller of claim 13, wherein the function block engine executes the function blocks in sequence according to the block execution list.

15. The programmable controller of claim 9, wherein the block execution list is programmable for a specific application.

16. The programmable controller of claim 9 wherein the memory is used for passing variables and parameters to and/or between the function blocks.

17. A design system comprising:
   a function block engine comprising a plurality of function blocks each having a pre-configured function situated in a medium, wherein functions use a common pool of RAM to hold minimal static value storage, wherein function blocks are selected from the plurality of function blocks according a specific design, and connections are made among the selected function blocks, according to the specific design;
   an operating system having access to the function block engine in the medium; and
   a user interface connected to the operating system.

18. The system of claim 17, wherein the user interface comprises:
   a display; and
   a mechanism for affecting images on the display.

19. The system of claim 18, wherein:
   if the operating system and the user interface are in an operational status relative to the function block engine, then the display shows a configure state of the function block engine;
   the function block engine comprises a plurality of function blocks;
   at least some of the plurality of function blocks are shown as icons on the display; and
   at least one or more icons may be selected and displayed as function blocks on the display.

20. The system of claim 19, wherein function blocks on the display are selected, configured and interconnected to effect a specific design.

21. The system of claim 20, wherein:
   the display is changed to show a simulated state of the function block engine;
   signals are selected as inputs to the specific design; and
   outputs of the specific design are displayed.

22. The system of claim 21, wherein the outputs are saved.

23. The system of claim 20, wherein the specific design is transferred as software to another device to implement the specific design.

* * * * *